US008632863B2

(12) United States Patent
Omatsu

(10) Patent No.: US 8,632,863 B2
(45) Date of Patent: Jan. 21, 2014

(54) POLYMER FILM, OPTICALLY-COMPENSATORY FILM, PROCESS FOR PRODUCING THE SAME, POLARIZING PLATE AND LIQUID-CRYSTAL DISPLAY DEVICE

(75) Inventor: Tadashi Omatsu, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 13/602,691

(22) Filed: Sep. 4, 2012

(65) Prior Publication Data

US 2012/0327343 A1   Dec. 27, 2012

Related U.S. Application Data

(63) Continuation of application No. 11/792,678, filed as application No. PCT/JP2006/001165 on Jan. 19, 2006, now abandoned.

(30) Foreign Application Priority Data

Jan. 21, 2005 (JP) ................................. 2005-014053

(51) Int. Cl.
  *G02F 1/1335* (2006.01)
  *G02B 1/08* (2006.01)

(52) U.S. Cl.
  USPC ............................. 428/1.33; 349/96; 349/122

(58) Field of Classification Search
  USPC .................... 428/1.33, 1.54; 349/117–122
  See application file for complete search history.

(56) References Cited

U.S. PATENT DOCUMENTS

| | | | | |
|---|---|---|---|---|
| 5,805,336 A * | 9/1998 | Dalzell et al. | ............ | 359/487.02 |
| 6,611,299 B1 * | 8/2003 | Fujii et al. | ........................ | 349/12 |
| 7,252,865 B2 | 8/2007 | Schunk et al. | | |
| 7,345,725 B2 | 3/2008 | Umeda et al. | | |
| 7,428,029 B2 | 9/2008 | Murakami et al. | | |
| 2002/0086163 A1 | 7/2002 | Shimizu et al. | | |
| 2003/0218709 A1 | 11/2003 | Ito et al. | | |
| 2004/0077752 A1 * | 4/2004 | Matsufuji et al. | ................ | 524/37 |
| 2004/0252264 A1 * | 12/2004 | Shimizu | ......................... | 349/117 |

FOREIGN PATENT DOCUMENTS

| | | |
|---|---|---|
| JP | 2000-356714 A | 12/2000 |
| JP | 2001-100039 A | 4/2001 |
| JP | 2001-163995 A | 6/2001 |
| JP | 2001-247717 A | 9/2001 |
| JP | 2001-318233 A | 11/2001 |
| JP | 2002-303722 A | 10/2002 |
| JP | 2002-328224 A | 11/2002 |
| JP | 2002-328233 A | 11/2002 |
| JP | 2003-315541 A | 11/2003 |
| JP | 2004-046097 A | 2/2004 |
| JP | 2004-078203 A | 3/2004 |
| JP | 2004-347778 A | 12/2004 |
| JP | 2005-017574 A | 1/2005 |
| JP | 2005-138375 A | 6/2005 |
| JP | 2005-154764 A | 6/2005 |
| JP | 2005-326713 A | 11/2005 |
| JP | 2005-338736 A | 12/2005 |
| JP | 2006-018245 A | 1/2006 |
| JP | 2006-030937 A | 2/2006 |
| WO | WO 2005111124 A1 * | 11/2005 ................. C08J 5/18 |

OTHER PUBLICATIONS

JPO Website Machine English Translation of JP 2005-272796, Kato et al., Oct. 6, 2005.*
International Search Report dated Mar. 14, 2006.
Written Opinion of the International Searching Authority dated Mar. 14, 2006.
Chinese Office Action with English Translation, Chinese Application No. 200680002815.7, issued May 6, 2010.
Office Action from the State Intellectual Property Office of the People's Republic of China issued in corresponding Chinese Patent Application No. 200680002815.7 dated Nov. 3, 2010, with an English translation.
Office Action from Japanese Patent Office issued in corresponding Japanese Patent Application No. 2005-014053 dated Jan. 11, 2011, with an English translation.
JPO Website Machine English Translation of JP 2001-100039, Murayama, Apr. 13, 2001.
JPO Website Machine English Translation of JP 2000-063560, Kuraki, Feb. 29, 2000.
JPO Website Machine English Translation of JP 2000-129014, Inamori et al., May 9, 2000.

* cited by examiner

*Primary Examiner* — Sophie Hon
(74) *Attorney, Agent, or Firm* — Buchanan Ingersoll & Rooney PC

(57) ABSTRACT

A polymer film that has: a ratio R (VT/VM) of a sound velocity in a transverse direction VT to a sound velocity in a machine direction VM of from 1.05 to 1.50; and an in-plane retardation Re(λ) and a thickness-direction retardation Rth (λ) satisfying formula (I): (I) 0≤Re(630)≤10, and |Rth(630)|≤25, wherein Re(λ) represents an in-plane retardation at a wavelength of λ (nm); and Rth(λ) represents a thickness-direction retardation at a wavelength of λ (nm).

19 Claims, No Drawings

POLYMER FILM, OPTICALLY-COMPENSATORY FILM, PROCESS FOR PRODUCING THE SAME, POLARIZING PLATE AND LIQUID-CRYSTAL DISPLAY DEVICE

This application is a continuation of U.S. application Ser. No. 11/792,678 filed on Jun. 8, 2007, now abandoned, which is a 371 national stage entry of PCT/JP2006/001165 filed on Jan. 19, 2006.

TECHNICAL FIELD

This invention relates to polymer film useful in liquid crystal display devices, an optically compensatory film using a polymer film, a process for producing the same, optical materials such as a polarizing plate and a liquid-crystal display device.

BACKGROUND ART

Because of being excellent in toughness and flame retardancy, cellulose acylate films have been employed in photographic supports and various optical materials. In recent years, in particular, cellulose acylate films are frequently employed as optically transparent films for liquid crystal display devices. Owing to the high optical transparency and high optical isotropy, cellulose acylate films are favorable as optical materials for devices with the use of polarization such as liquid crystal display devices. Therefore, cellulose acylate films have been employed as optically compensatory film supports whereby display in looking from an angle can be compensated (viewing angle compensation).

A polarizing plate, which is one of members constituting a liquid crystal display device, is constructed by bonding a polarization film-protecting film to at least one side of a polarization film. In general, a polarization film is obtained by dyeing a stretched polyvinyl alcohol (PVA)-based film with iodine or a dichroic dye. Such a polarization film-protecting film should be excellent in optical isotropy and the characteristics of a polarizing plate largely depend on the optical characteristics of the polarization film-protecting film. As the polarization film-protecting film, therefore, cellulose acylate films, in particular, triacetyl cellulose films which can be bonded directly to PVA are employed in may cases.

Before bonding a protecting film to a polarization film, the bonding face of the protecting film is subjected to a surface-treatment such as a hydrophilicating treatment in some cases so as to enhance the adhesiveness to the polarization film. As the hydrophilicating treatment, use is frequently made of an alkali saponification treatment and it has been also proposed to employ a plasma treatment, a corona treatment and so on therefor (see, for example, JP-A-2002-328224 and JP-A-2000-356714).

In liquid crystal display devices in these days, it is more strongly required to improve viewing angle characteristics. Thus, optically transparent films to be used as a polarization film-protecting film, an optically compensatory film support, etc. should have improved optical isotropy. To be optically isotropic, it is important to have a small retardation value represented by the product of the birefringence and thickness of an optical film. To improve the display in looking from an angle, it is particularly needed to lower not only the in-plane retardation value (Re) but also the thickness direction retardation value (Rth). More specifically speaking, it is needed that, in the case of evaluating the optical characteristics of an optically transparent film, Re measured in plane is a small value and Re shows no change even though the measurement angle is varied.

Although there have been cellulose acylate films having a small in-plane retardation Re, a cellulose acylate film having a small change in Re depending on angle, i.e., having a small Rth can be hardly produced. Thus, there have been proposed optically transparent films with little angle-dependent change in retardation with the use of a polycarbonate-based film or a thermoplastic cycloolefin film as a substitute for a cellulose acylate film (see, for example, JP-A-2001-318233 and JP-A-2002-328233; examples of commercially available products being ZEONOR (manufactured by ZEON CORPORATION) and ARTON (manufactured by JSR)). In the case of using as a polarization film-protecting film, however, these optically transparent films suffer from a problem in the bonding properties to PVA. Moreover, there still remains another problem that the optical characteristics in the entire film face are uneven. To overcome these problems, it is efficacious to further lower the optical anisotropy.

In producing a cellulose acylate film, it has been a practice to add a compound called a plasticizer to thereby improve the film-forming performance. Examples of the plasticizer include phosphoric acid triesters such as triphenyl phosphate and biphenyldiphenyl phosphate and phthalic acid esters and so on (see, for example, *Purasuchikku Zairyo Koza*, vol. 17, Nikkan Kogyo Shinbun, Ltd., *Senisokei Jushi*, p. 121 (1970)). It is known that some of these plasticizers have an effect of lowering the optical anisotropy of a cellulose acylate film. For example, specific fatty acid esters are disclosed (see, for example, JP-A-2001-247717). However, these known compounds can only insufficiently lower the optical anisotropy of a cellulose acylate film.

As a method of producing a biaxial optically compensatory film to be used in liquid crystal display devices in recent years, there has been proposed a method which comprises providing a thin layer having a high-molecular weight polymer as the main component on a supporting material and orienting the high-molecular weight polymer by either a stretching treatment, a shrinking treatment or both of them to thereby give an optical film having a desired retardation (see JP-A-2003-315541, JP-A-2001-344856, JP-A-2004-46097 and JP-A-2004-78203). In this method, the supporting material should have small Re and Rth after the stretching or shrinking treatment too. However, supporting materials proposed hitherto have large retardation after the stretching or shrinking treatment or polarizing plates constructed by using the thus obtained optically compensatory films as protecting films suffer from some problems in the bonding properties or durability.

DISCLOSURE OF THE INVENTION

To solve the above-described problems, there is required a film having a low optical anisotropy after a stretching or shrinking treatment. More specifically speaking, it is strongly required to develop an optically transparent and optically isotropic film which has an in-plane retardation (Re) of almost zero, shows little angle-dependent change in thickness direction retardation (Rth) (i.e., Rth being almost zero too) and, furthermore, can be adequately bonded to PVA.

In liquid-crystal display devices of recent years, it is also required to improve display colors. For this purpose, it is necessary in an optically-transparent film to be used as support of a polarization film-protecting film or an optically-compensatory film not only to lessen Re and Rth in the visible region of 400 to 800 nm in wavelength but also to lessen changes in Re and Rth depending on wavelength, i.e., wavelength dispersion.

As an additional problem, it is further required to provide an optically-compensatory film or a polarizing plate with the use of such a high-function polymer film having improved viewing angle characteristics and visibility at a high productivity and a low cost. More specifically speaking, it is proposed, for example, processes for producing optically-compensatory films by performing a stretching treatment or a shrinking treatment by the batch type method or the roll (roll to roll) method as described in the above JP-A-2003-315541, JP-A-2001-344856, JP-A-2004-46097 and JP-A-2004-78203. From the viewpoint of productivity, continuous production to give a polarizing plate by the roll method is preferred.

An object of the invention is to provide a polymer film which has a low optical anisotropy (i.e., being substantially optically isotropic), even optical characteristics without irregularities (preferably having a small wavelength dispersion in the optical anisotropy) and controlled bonding properties so that it is appropriately usable in image display devices such as liquid-crystal display devices.

Another object of the invention is to provide an optically-compensatory film using the above polymer film, a polarizing plate having excellent viewing angle characteristics and a liquid-crystal display device using the above polarizing plate.

Another object of the invention is to provide a process for producing the polymer film and the optically-compensatory film as described above.

As the results of intensive studies, the inventors have found out that the above problems can be solved by providing a polymer film that has a ratio R (VT/VM) of the sound velocity in the transverse direction VT to the sound velocity in the machine direction VM, and an in-plane retardation Re($\lambda$) and a thickness-direction retardation Rth($\lambda$) each being lowered as far as possible. They have further found out that the above problems can be solved by providing a polymer film wherein the ratio of the tensile modulus in the transverse direction to the tensile modulus in the machine direction is specified and the in-plane retardation Re($\lambda$) and the thickness-direction retardation Rth($\lambda$) are lowered as far as possible.

In the polymer film of the invention, the ratio R (VT/VM) of the sound velocity in the transverse direction VT to the sound velocity in the machine direction VM is from 1.05 to 1.50, preferably from 1.06 to 1.45 and more preferably from 1.07 to 1.40.

It is also preferable that the polymer film of the invention has a tensile modulus in the transverse direction of from 240 to 600 kgf/mm² (2.35 GPa to 5.88 GPa), preferably from 250 to 580 kgf/mm² (2.45 GPa to 5.68 GPa), a tensile modulus in the machine direction of from 230 to 480 kgf/mm² (2.25 GPa to 4.70 GPa), preferably from 240 to 470 kgf/mm² (2.35 GPa to 4.61 GPa), and a ratio of the former tensile modulus in the transverse direction to the latter tensile modulus in the machine direction (former/latter) of from 1.15 to 1.80, preferably from 1.16 to 1.60.

In the invention, a polymer film having low optical anisotropy (Re, Rth) has an in-plane retardation at a wavelength of 630 nm Re(630) of not more than 10 nm (0≤Re(630)≤10) and the absolute value of a thickness-direction retardation at a wavelength of 630 nm Rth(630) of not more than 25 nm (|Rth(630)|≤25 nm), more preferably 0≤Re(630)≤5 and |Rth(630)|≤20 nm and especially preferably 0≤Re(630)≤2 and |Rth(630)|≤15 nm.

In the case of using a polymer film, the sound velocity, tensile modulus and optical anisotropy of which do not fall within the ranges as specified above, for example, a protecting film for a polarizing plate, light leakage arises in the vertical or diagonal direction in light-shielding with a cross Nicol polarizing plate, which results in light leakage in the case where it is employed as a polarizing plate-protecting film to be used in a liquid crystal panel.

It has been further found out that bonding properties (pasting properties) to another member (for example, a polarization film) can be improved by controlling the surface energy of the polymer film.

As the results of intensive studies, the inventors have furthermore found out that the polymer film can be prevented from coloration with the passage of time by using a compound having an absorption in the ultraviolet region of 200 to 400 nm and, moreover, the wavelength dispersion of the polymer film can be thus regulated and the absolute value of the differences between Re and Rth at 400 nm and 700 nm, i.e., |Re(400)−Re(700)| and |Rth(400)−Rth(700)|.

In the invention, it is preferable that the differences in the absolute Re and Rth a described above are |Re(400)−Re(700)|≤10 and |Rth(400)−Rth(700)|≤35, more preferably |Re(400)−Re(700)|≤5 and |Rth(400)−Rth(700)|=25 and especially preferably |Re(400)−Re(700)|≤3 and |Rth(400)−Rth(700)|≤15.

It has been also confirmed that, in the case of using a cellulose acylate film as the polymer film, such a compound is highly compatible with cellulose acylate in the course of producing the cellulose acylate film so that there arises no clouding and the obtained film has a sufficient physical strength.

As the results of intensive studies, the inventors have furthermore found out that the above problems can be solved even by using a cellulose acylate film having a high degree of acyl substitution as the polymer film.

The inventors have furthermore found out that an optically-compensatory film having excellent viewing angle characteristics can be provided by forming an optically-anisotropic layer on the polymer film of the invention. It has been also found out that the polymer film and the optically-compensatory film of the invention are useful in polarizing plates and liquid-crystal display devices.

Accordingly, the present invention is as follows.

(1) A polymer film that has: a ratio R (VT/VM) of a sound velocity in a transverse direction VT to a sound velocity in a machine direction VM of from 1.05 to 1.50; and an in-plane retardation Re($\lambda$) and a thickness-direction retardation Rth($\lambda$) satisfying formula (I):

$$0 \le Re(630) \le 10, \text{ and } |Rth(630)| \le 25 \qquad (I)$$

wherein Re($\lambda$) represents an in-plane retardation at a wavelength of $\lambda$ (nm); and Rth($\lambda$) represents a thickness-direction retardation at a wavelength of $\lambda$ (nm).

(2) A polymer film that has: a tensile modulus in a transverse direction of from 240 to 600 kgf/mm² (2.35 GPa to 5.88 GPa); a tensile modulus in the machine direction of from 230 to 480 kgf/mm² (2.25 GPa to 4.70 GPa); a ratio of a tensile modulus in a transverse direction to a tensile modulus in a machine direction of from 1.15 to 1.80; and an in-plane retardation Re($\lambda$) and a thickness-direction retardation Rth($\lambda$) satisfying formula (I):

$$0 \le Re(630) \le 10, \text{ and } |Rth(630)| \le 25; \qquad (I)$$

wherein Re($\lambda$) represents an in-plane retardation at a wavelength of $\lambda$ (nm); and
Rth($\lambda$) represents a thickness-direction retardation at a wavelength of $\lambda$ (nm).

(3) The polymer film as described in (1) or (2) above, which has at least one surface having a surface energy of 50 mN/m or more but not more than 80 mN/m.

(4) The polymer film as described in (3) above, which has at least one surface-treated surface, wherein the at least one surface-treated surface has a surface energy of 30 mN/m or more but not more than 50 mN/m before a surface treatment, and has a surface energy of 50 mN/m or more but not more than 80 mN/m after a surface treatment.

(5) The polymer film as described in any of (1) to (4) above, which has an in-plane retardation Re(λ) and a thickness-direction retardation Rth(λ) satisfying formula (II):

$$|Re(400)-Re(700)| \leq 10, \text{ and } |Rth(400)-Rth(700)| \leq 35; \quad (II)$$

wherein Re(λ) represents an in-plane retardation at a wavelength of λ (nm); and

Rth(λ) represents a thickness-direction retardation at a wavelength of λ (nm).

(6) The polymer film as described in any of (1) to (5) above, which is a polymer film comprising at least a cellulose acylate and a compound having a molecular weight of not more than 3000.

(7) The polymer film as described in (6) above, wherein an acyl substituent in the cellulose acylate is substantially an acetyl group alone, a total degree of substitution thereof is from 2.80 to 2.99, and a mean degree of polymerization of the cellulose acylate is from 180 to 550.

(8) The polymer film as described in (6) above, wherein an acylate group in the cellulose acylate comprises at least one of acetate, propionate and butylate, and a total degree of substitution thereof is from 2.50 to 3.00.

(9) The polymer film as described in any of (1) to (8) above, which has a photoelasticity coefficient of not more than $25 \times 10^{-13}$ cm$^2$/dne ($2.5 \times 10^{-13}$ N/m$^2$).

(10) An optically-compensatory film comprising:

a polymer film as described in any of (1) to (9) above; and an optically-anisotropic layer formed on the polymer film, wherein the optically-anisotropic layer satisfies formulae: Re(630)=0 to 200 (nm), and |Rth(630)|=0 to 400 (nm).

(11) The optically-compensatory film as described in (10) above, wherein the optically-anisotropic layer comprises a polymer film.

(12) The optically-compensatory film as described in (11) above that is obtained by a method comprising:

spreading a polymer having been dissolved in a solvent and thus liquefied on a polymer film as described in any of (1) to (9) above, so as to obtain a laminate; and subjecting the thus obtained laminate to a stretching treatment, a shrinking treatment or both of them to thereby orient polymer molecules in the plane.

(13) The optically-compensatory film as described in (11) or (12) above, wherein the polymer film comprises at least one polymer selected from the group consisting of polyamide, polyimide, polyester, polyetherketone, polyaryl-ether ketone, polyamidimde and polyesterimide.

(14) A process for producing a polymer film as described in any of (1) to (9) above, which comprises stretching a film in a transverse direction.

(15) A process for producing a polymer film as described in any of (1) to (9) above, which comprises shrinking a film in a machine direction.

(16) A process for producing an optically-compensatory film as described in any of (10) to (13) above, which comprises:

spreading a polymer having been dissolved in a solvent and thus liquefied on a polymer film, so as to obtain a laminate; and stretching the thus obtained laminate in a transverse direction.

(17) A process for producing an optically-compensatory film as described in any of (10) to (13) above, which comprises:

spreading a polymer having been dissolved in a solvent and thus liquefied on a polymer film, so as to obtain a laminate; and shrinking the thus obtained laminate in a machine direction.

(18) A process for producing the optically-compensatory film as described in any of (10) to (13) above, which comprises:

layering a polymer having been dissolved in a solvent and thus liquefied on a polymer film by a co-casting method, so as to obtain a laminate; and stretching the thus obtained laminate in a transverse direction.

(19) A polarizing plate comprising at least one of a polymer film as described in any of (1) to (9) above and an optically-compensatory film as described in any of (10) to (13) above as a protecting film for a polarization film.

(20) The polarizing plate as described in (19) above, which has at least one layer selected from the group consisting of a hard coat layer, an antiglare layer and an antireflection layer provided on a surface of the polarizing plate.

(21) A liquid-crystal display device, which comprises at least one of a polymer film as described in any of (1) to (9) above, an optically-compensatory film as described in any of (10) to (13) above and a polarizing plate as described in (19) or (20) above.

(22) The liquid-crystal display device as described in (21) above, which is a VA or IPS liquid-crystal display device.

BEST MODE FOR CARRYING OUT THE INVENTION

Next, the polymer film of the invention will be illustrated in greater detail.

[Material of Polymer Film]

It is preferable that the polymer film of the invention is made of a polymer material being excellent in optical performance, transparency, mechanical strength, heat stability, moisture-blocking properties, isotropy and so on. Any material may be used so long as Re and Rth as described above satisfy the above formula (I). For example, use can be made of polycarbonate-based polymers, polyester-based polymers such as polyethylene terephthalate and polyethylene naphthalate, acrylic polymers such as polymethyl methacrylate, styrene-based polymers such as polystyrene and acrylonitrile-styrene copolymer (AS resin) and so on. Further examples include polyolefins such as polyethylene and polypropylene, olefin-based polymers such as ethylene-propylene copolymer, vinyl chloride-based polymers, amide-based polymers such as nylon and aromatic polyamide, imide-based polymers, sulfone-based polymers, polyether sulfone-based polymers, polyether ether ketone-based polymers, polyphenylene sulfide-based polymers, vinylidene chloride-based polymers, vinyl alcohol-based polymers, vinyl butyral-based polymers, arylate-based polymers, polyoxymethylene-based polymers, epoxy-based polymers and polymers prepared by mixing the above-described polymers. The polymer of the invention may be formed as a hardening layer made of an ultraviolet-hardening or heat-hardening resin.

As a material for forming the polymer film of the invention, it is preferable to use a thermoplastic norbornene-based resin. As examples of the thermoplastic norbornene-based resin, ZEONOR (manufactured by ZEON CORPORATION) and ARTON (manufactured by JSR)) can be cited.

As a material for forming the polymer film of the invention, it is also preferable to use a cellulose-based polymer (hereinafter referred to as cellulose acylate) typified by triacetyl cellulose which has been used as transparent protecting films in polarizing plates. Next, cellulose acylate film will be mainly illustrated as an example of the polymer film of the invention. However, it is obvious that technical matters thereof are also applicable to other polymer films.

[Starting Cotton Material for Synthesizing Cellulose Acylate]

Examples of the starting cellulose to be used for synthesizing the cellulose acylate in the invention include cotton linter and wood pulp (hardwood pulp and softwood pulp). Use can be made of cellulose acylate obtained from any cellulose material and a mixture is also usable in some cases. These starting cotton materials are described in detail in, for example, *Purasuchikku Zairyo Kozo* (17), *Senisokei Jushi* (Marusawa and Uda, The Nikkan Kogyo Shinbun, Ltd., 1970) and Japan Institute of Invention and Innovation Journal of Technical Disclosure No. 2001-1745, p. 7 to 8, though the material of the cellulose acylate film of the invention is not particularly restricted thereto.

[Degree of Substitution in Cellulose Acylate]

Now, the cellulose acylate which is produced starting with the cellulose material as described above will be illustrated. In the cellulose acylate in the invention, hydroxyl groups in cellulose have been acylated. As the substituents, use may be made of acetyl groups having from 2 to 22 carbon atoms. In the cellulose acylate to be used in the invention, the degree of substitution of hydroxyl groups in the cellulose is not particularly restricted. The substitution degree can be determined by measuring the degree of binding of acetic acid and/or fatty acids having from 3 to 22 carbon atoms substituting hydroxyl groups in cellulose and calculating. The measurement can be carried out in accordance with ASTM D-817-91.

As described above, the degree of substitution of hydroxyl groups in the cellulose is not particularly restricted in the cellulose acylate to be used in the invention. It is preferable that the degree of substitution of hydroxyl group by acyl group is from 2.50 to 3.00, more preferably from 2.75 to 3.00 and more preferably from 2.85 to 3.00.

Among the acetic acid and/or fatty acids having from 3 to 22 carbon atoms substituting hydroxyl groups in cellulose, the acyl group having from 2 to 22 carbon atoms may be an aliphatic group or an aromatic group without restriction. Either a single group or a mixture of two or more groups may be used. Use may be made of, for example, alkylcarbonyl esters, alkenylcarbonyl esters, aromatic carbonyl esters and aromatic alkylcarbonyl esters of cellulose each optionally having additional substituents. Preferable examples of the acyl group include acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl groups. Among them, acetyl, propionyl, butanoyl, dodecanoyl, octadecanoyl, t-butanoyl, oleoyl, benzoyl, naphthylcarbonyl cinnamoyl groups are preferable, and acetyl, propionyl and butanoyl groups are more preferable.

As the results of intensive studies, the inventors have found out that the optical isotropy of a cellulose acylate film can be lowered in the case where acylate groups substituting hydroxyl groups in the cellulose acylate comprise substantially at least two of acetyl, propionyl and butanoyl groups and the degree of substitution thereof is from 2.50 to 3.00. The degree of acyl substitution preferably is from 2.60 to 3.00, more preferably from 2.65 to 3.00. In the case where the acyl groups substituting hydroxyl groups in the cellulose are substantially acetyl group alone, the optical anisotropy of the film can be lowered. From the viewpoints of the compatibility with an additive and the solubility in an organic solvent employed, it is more preferable that the degree of substitution is from 2.80 to 2.99, more preferably from 2.85 to 2.95.

[Degree of Polymerization of Cellulose Acylate]

The degree of polymerization (expressed in viscosity-average degree of polymerization) of the cellulose acylate preferably used in the invention ranges from 180 to 700. In cellulose acetate, the degree of polymerization preferably ranges from 180 to 550, more preferably from 180 to 400 and especially preferably from 180 to 350. In the case where the degree of polymerization is too high, a dope solution of the cellulose acylate has a high viscosity and, in its turn, a film can be hardly formed by casting. An average degree of polymerization can be measured by the limiting viscosity method reported by Uda et al. (Kazuo Uda & Hideo Saito, *SEN-I GAKKAISHI*, Vol. 18, No. 1, p. 105-120, 1962). This method is reported in greater detail in JP-A-9-95538.

The molecular weight distribution of the cellulose acylate preferably used in the invention is evaluated by gel permeation chromatography. A smaller polydispersity index Mw/Mn (Mw: mass-average molecular weight, Mn: number-average molecular weight) and a narrower molecular weight distribution are preferred. More specifically speaking, Mw/Mn preferably ranges from 1.0 to 3.0, more preferably from 1.0 to 2.0 and most desirably from 1.0 to 1.6.

When low-molecular weight components are removed, the average molecular weight (degree of polymerization) is elevated but the viscosity becomes lower than common cellulose acylates, thereby becoming useful. Cellulose acylate containing less low-molecular weight components can be obtained by removing the low-molecular weight components from cellulose acylate synthesized by a conventional method. The low-molecular weight components can be removed by washing cellulose acylate with an appropriate organic solvent. In the case of producing cellulose acylate containing less low-molecular weight components, it is preferable to control the amount of the sulfuric acid catalyst in the acetylation to 0.5 to 25 parts by mass per 100 parts by mass of cellulose acylate. (In this specification, parts by mass and % by mass are equal to parts by weight and % by weight, respectively.) By controlling the amount of the sulfuric acid catalyst within the range as described above, it is possible to synthesize cellulose acylate favorable from the viewpoint of molecular weight distribution (i.e., having an even molecular weight distribution). In the production of cellulose acylate according to the invention, use is made of cellulose acylate having a water content ratio of preferably 2% by mass or less, more preferably 1% by mass or less and especially preferably 0.7% by mass or less. In general, cellulose acylate contains water and it is known that the water content ratio thereof ranges from 2.5 to 5% by mass. To regulate to this water content ratio of cellulose acylate in the invention, it is required to dry the cellulose acylate. The drying method is not particularly restricted, so long as the desired water content ratio can be established thereby. To obtain cellulose acylate usable in the invention, use can be made of the synthesis method described in detail in Japan Institute of Invention and Innovation Journal of Technical Disclosure No. 2001-1745 (2001.03.15, Japan Institute of Invention and Innovation), p. 7 to 12.

As the cellulose acylate to be used in the invention, use can be made of either a single cellulose acylate or a mixture of two or more cellulose acylates so long as these cellulose acylates fulfill the requirements in substituent, degree of substitution, degree of polymerization, molecular weight distribution and so on as described above.

[Additives to Cellulose Acylate]

To a cellulose acylate of the invention, it is possible to add various additives (for example, a compound capable of lowering optical anisotropy (also called optical anisotropy-lowering agent), a wavelength dispersion regulator, fine particles, a plasticizer, a UV-blocking agent, an antidegradant, a releasing agent, an optical characteristic-controlling agent, etc.). Now, these additives will be illustrated. These additives may be added in the step of preparing the dope (the step of preparing a cellulose acylate solution). Alternatively, a step of adding the additives may be provided in the final step of preparing the dope.

By controlling the amounts of these additives, it is possible to satisfy the requirement of the present invention:

$$0 \leq Re(630) \leq 10, \text{ and } |Rth(630)| \leq 25; \tag{I}$$

and a preferable condition thereof:

$$|Re(400)-Re(700)| \leq 10, \text{ and } |Rth(400)-Rth(700)| \leq 35. \tag{II}$$

It is preferable that (I) $0 \leq Re(630) \leq 5$ and $|Rth(630)| \leq 20$, more preferably $0 \leq Re(630) \leq 2$ and $|Rth(630)| \leq 15$. It is also preferable that (II) $|Re(400)-Re(700)| \leq 5$ and $|Rth(400)-Rth(700)| \leq 25$, more preferably $|Re(400)-Re(700)| \leq 3$ and $|Rth(400)-Rth(700)| \leq 15$.

In the formulae, $Re(\lambda)$ represents an in-plane retardation at a wavelength of $\lambda$ (nm); and $Rth(\lambda)$ represents a thickness-direction retardation at a wavelength of $\lambda$ (nm).

It is preferable that the cellulose acylate film of the invention contains at least one compound represented lowering the optical anisotropy (in particular, the thickness-direction retardation Rth) within such a range as satisfying the requirements as specified by the following formulae (II) and (iii):

$$(Rth(A)-Rth(0))/A \leq -1.0 \tag{ii}$$

$$0.01 \leq A \leq 30; \tag{iii}$$

wherein Rth(A) is Rth (nm) of a film containing A % of the compound capable of lowering Rth; Rth(0) is Rth (nm) of a film containing no compound capable of lowering Rth; and A is the mass (%) of the compound referring the mass of the polymer employed as the film material as to 100.

Concerning the above formulae (II) and (iii), it is preferable that:

$$(Rth(A)-Rth(0))/A \leq -2.0 \tag{ii}$$

$$0.05 \leq A \leq 25; \tag{iii}$$

still preferably:

$$(Rth(A)-Rth(0))/A \leq -3.0 \tag{ii}$$

$$0.01 \leq A \leq 20; \tag{iii}$$

[Structural Characteristic of Compound Capable of Lowering Optical Anisotropy of Cellulose Acylate Film]

Now, the compound capable of lowering optical anisotropy of a cellulose acylate film will be illustrated. As the results of intensive studies, the inventors sufficiently lowered the optical anisotropy by using a compound inhibiting the orientation of cellulose acylate in a film in plane and in the film thickness direction, thereby reducing Re and Rth close to zero. For this purpose, it is advantageous to employ a compound capable of lowering optical anisotropy which is sufficiently compatible with cellulose acylate and has neither a rod-like structure nor a planar structure by itself. In the case of having a plural number of planar functional groups such as aromatic groups, more specifically speaking, a nonplanar structure having these functional groups not on a single plane is advantageous.

(LogP Value)

To produce the cellulose acylate film of the invention, it is preferable to employ, from among the compounds which prevent cellulose acylate in the film from orientation in-plane and in the film thickness direction to thereby lower optical anisotropy, a compound having an octanol-water partition coefficient (log P value) of from 0 to 7. A compound having a log P value exceeding 7 has a poor compatibility with cellulose acylate and thus frequently results in clouding or blooming of the film. A compound having a log P value less than 0 has highly hydrophilic nature which sometimes worsens the water resistance of the cellulose acylate film. It is still preferable that the log P value ranges from 1 to 6, especially preferably from 1.5 to 5.

The octanol-water partition coefficient (log P value) can be measured by the flask shaking method in accordance with JIS Z7260-107 (2000). It is also possible to estimate the octanol-water partition coefficient (log P value) by using not practical measurement but a computational or empirical method. As the computational method, use may be preferably made of Crippen's fragmentation method (J. Chem. Inf. Comput. Sci., 27, 21 (1987)), Viswanadhan's fragmentation method (J. Chem. Inf. Comput. Sci., 29, 163 (1989)), Broto's fragmentation method (Eur. J. Med. Chem.-Chim. Theor., 19, 71 (1984)) and so on. It is still preferable to employ Crippen's fragmentation method (J. Chem. Inf. Comput. Sci., 27, 21 (1987)). In the case where the log P value of a compound determined by the measurement method differs from its calculated value, it is favorable to judge whether or not the compound falls within the desired range with the use of Crippen's fragmentation method. The log P values given in the present specification are determined by Crippen's fragmentation method (J. Chem. Inf. Comput. Sci., 27, 21 (1987)).

[Physical Properties of Compound Capable of Lowering Optical Anisotropy]

The compound having the ability to lower the optical anisotropy of film may have or may not have an aromatic group. Preferably, the compound having the ability to lower the optical anisotropy of film has a molecular weight of from 150 to 3000, more preferably from 170 to 2000, further more preferably from 200 to 1000. So far as having a molecular weight that falls within the range, the compound may have a specific monomer structure or may have an oligomer structure or a polymer structure with a plurality of such monomer units bonding to each other.

Preferably, the compound having the ability to lower the optical anisotropy of film is liquid at 25° C., or is a solid having a melting point of from 25 to 250° C., more preferably it is liquid at 25° C., or is a solid having a melting point of from 25 to 200° C. Preferably, the compound having the ability to lower the optical anisotropy of film does not evaporate away in the dope-casting and drying process of cellulose acylate film formation.

The amount of the compound capable of lowering optical anisotropy to be added to the film-forming dope in the invention is preferably from 0.01 to 30% by mass of cellulose acylate, more preferably from 1 to 25% by mass, even more preferably from 5 to 20% by mass.

One or more different types of compounds capable of lowering optical anisotropy may be used herein either singly or as combined in any desired ratio.

The time when the compound capable of lowering optical anisotropy is added to the film-forming dope may be any one during the process of dope preparation, and the compound may be added to the done in the final step of the dope preparation.

Regarding the content of the compound capable of lowering optical anisotropy in the cellulose acylate film in the invention, the mean content of the compound in the part of up to 10% of the overall thickness of the film from at least one surface side of the film is from 80 to 99% of the mean content of the compound in the center part of the film. The amount of the compound in the film in the invention may be determined by measuring the amount thereof in the surface part of the film and that in the center part thereof through IR absorption spectrometry as in JP-A 8-57879.

As specific examples of the compound capable of lowering optical anisotropy of the cellulose acylate film to be preferably used in the invention, a compound represented by any one of the following formulae (13), (18) and (19) may be cited, though the invention is not restricted thereto.

Formula (13)

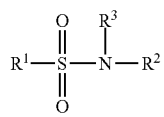

In the formula (13), $R^1$ represents an alkyl group or an aryl group; and $R^2$ and $R^3$ each independently represents a hydrogen atom, an alkyl group or an aryl group, provided that the sum of the carbon atoms in $R^1$, $R^2$ and $R^3$ is 10 or more.

Formula (18)

In the formula (18), $R^1$ represents an alkyl group or an aryl group; and $R^2$ and $R^3$ each independently represents a hydrogen atom, an alkyl group or an aryl group.

Formula (19)

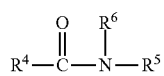

In the formula (19), $R^4$, $R^5$ and $R^6$ each independently represents an alkyl group or an aryl group.

Now, the compounds of the formulae (13) and (14) will be described.

In the above formula (13), $R^1$ represents an alkyl group or an aryl group. $R^2$ and $R^3$ independently represent each a hydrogen atom, an alkyl group or an aryl group. It is especially preferable that the sum of the carbon atoms in $R^1$, $R^2$ and $R^3$ is 10 or more. $R^1$, $R^2$ and $R^3$ may be substituted and preferable examples of the substituent include a fluorine atom, alkyl groups, aryl groups, alkoxy groups, sulfone group and sulfonamido group. Among all, alkyl groups, aryl groups, alkoxy groups, sulfone group and sulfonamido group are particularly preferable. The alkyl group may be either chain type, branched or cyclic. It is preferable that the alkyl group has from 1 to 25 carbon atoms, more preferably from 6 to 25 carbon atoms and especially preferably from 6 to 20 carbon atoms (for example, methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nonadecyl and didecyl). The aryl group preferably has from 6 to 30 carbon atoms, more preferably from 6 to 24 carbon atoms (for example, phenyl, biphenyl, terphenyl, naphthyl, binaphthyl and triphenylphenyl). Next, preferable examples of the compounds represented by the formula (13) will be presented, though the invention is not restricted to these specific examples.

A-1

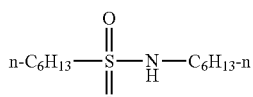

A-2

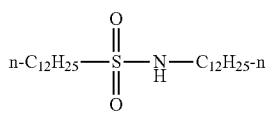

A-3

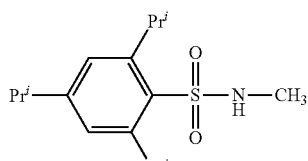

A-4

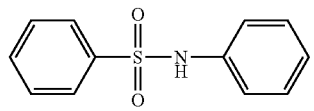

A-5

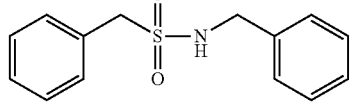

A-6

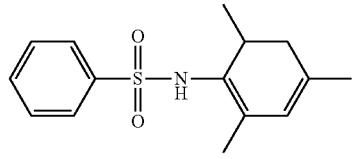

A-7

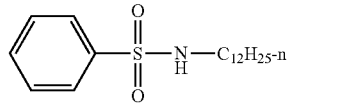

A-8

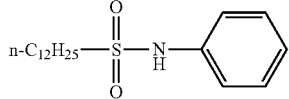

A-9

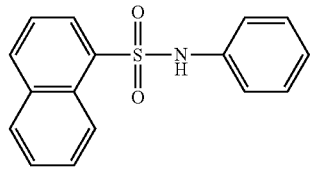

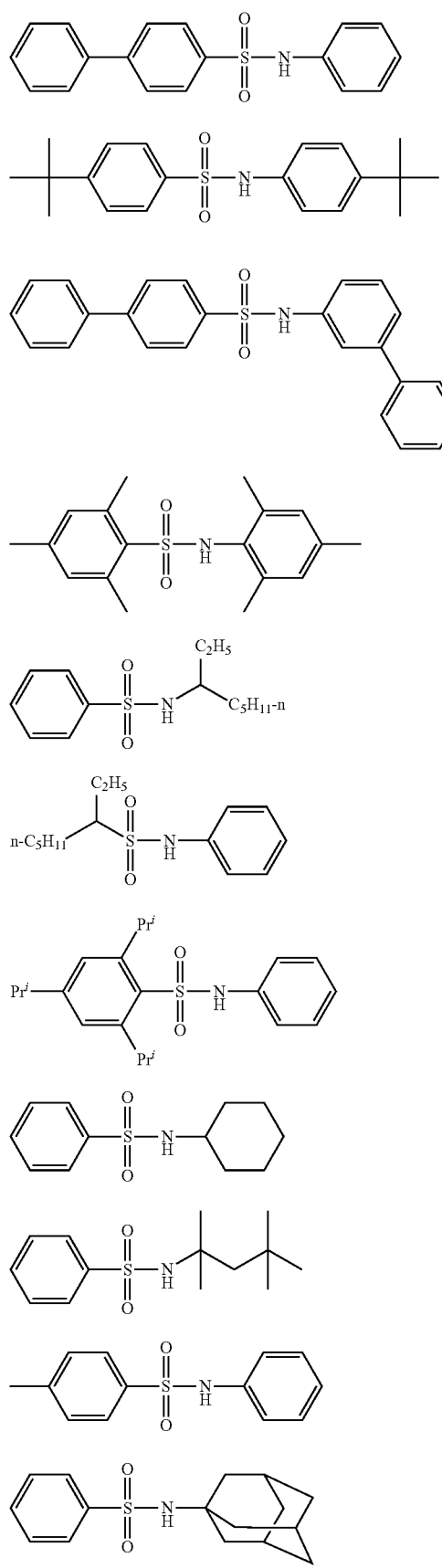

-continued
A-31
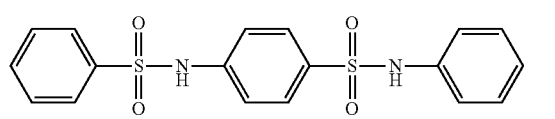
A-32
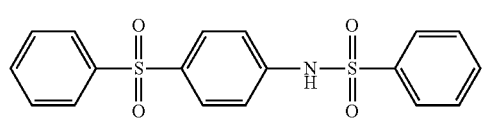
A-33
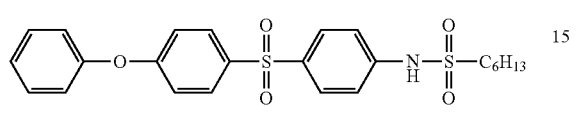
A-34
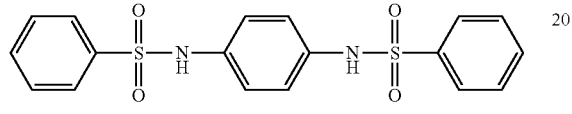
A-35
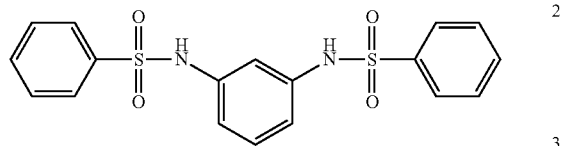
A-36
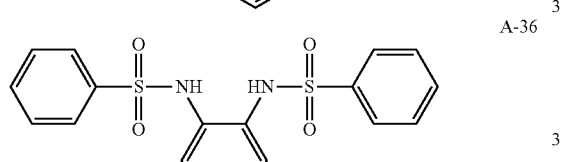
A-37
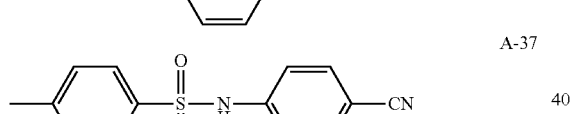
A-38
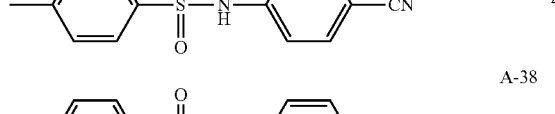
A-39
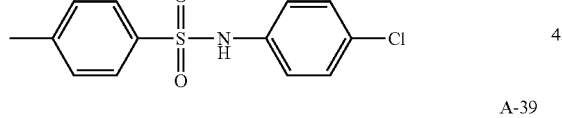
A-40
A-41
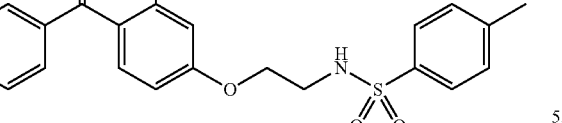
-continued
A-42
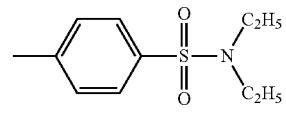
A-43
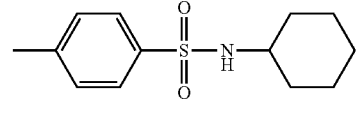
A-44
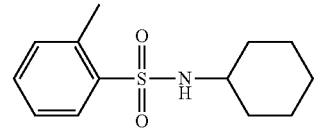
A-45
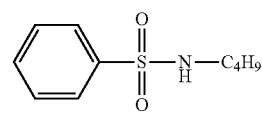
A-46
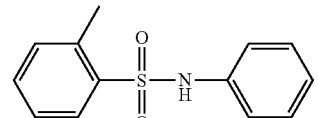
A-47
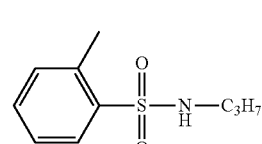
A-48
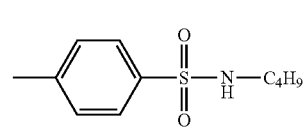
A-49
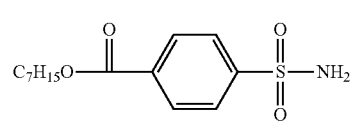
A-50
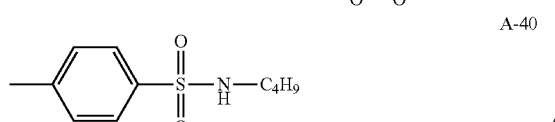
A-51
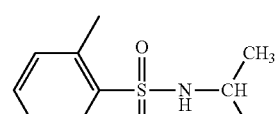
Next, the compounds represented by the formula (18) or the formula (19) will be described, though the invention is not restricted to these specific examples. In the compounds represented by the formula (18) or the formula (19), specific examples of alkyl and aryl groups are the same as in the formula (13).

FA-1
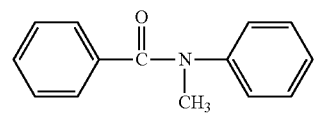
FA-2
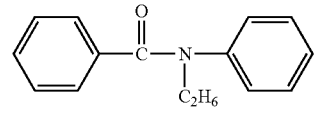
FA-3
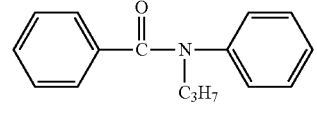
FA-4
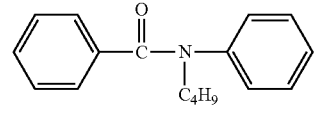
FA-5
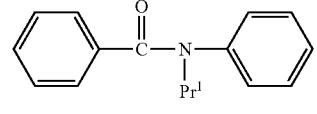
FA-6
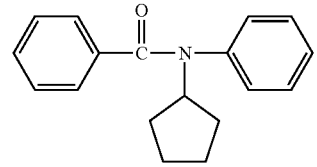
FA-7
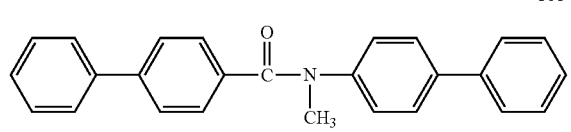
FA-8
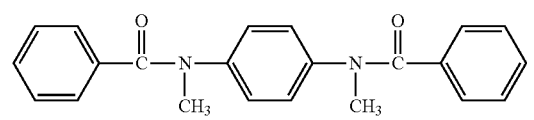
FA-9
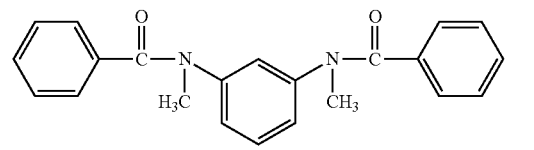
FA-10
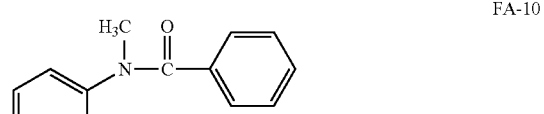
FA-11
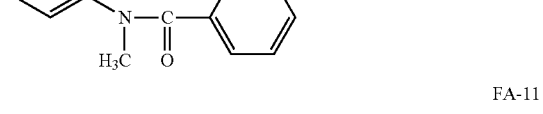
-continued
FA-12
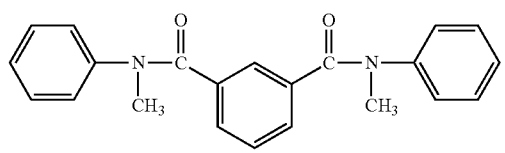
FA-13
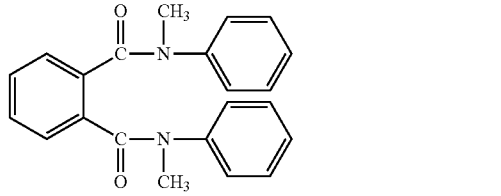
FA-14
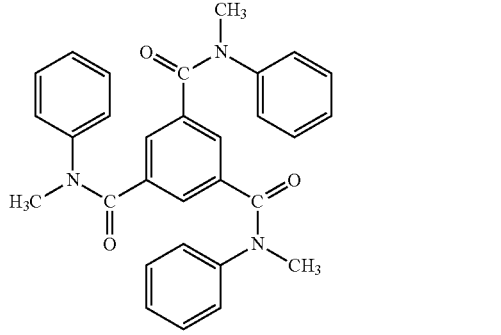
FA-15
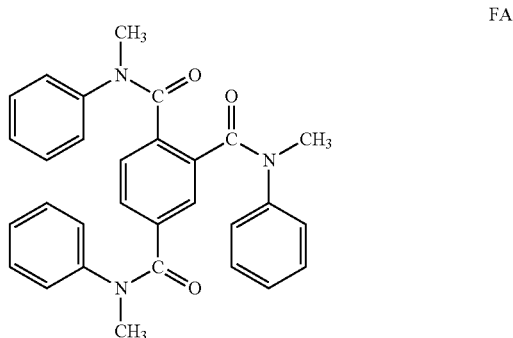
FA-16
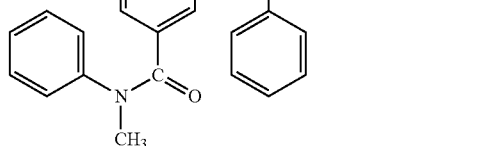
FA-17
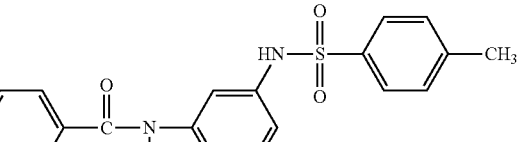
FA-18
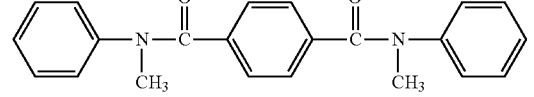

FA-19
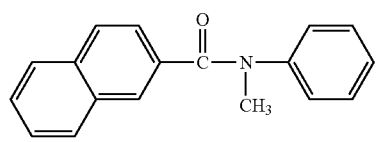
FA-20
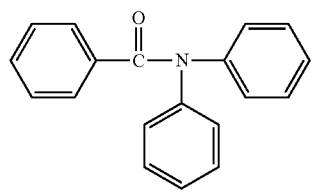
FA-21
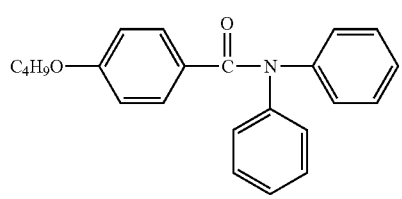
FA-22
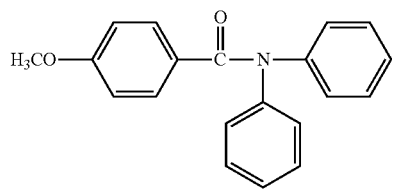
FA-23
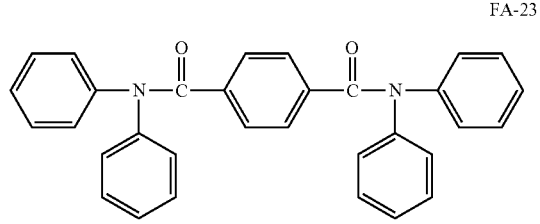
FA-24
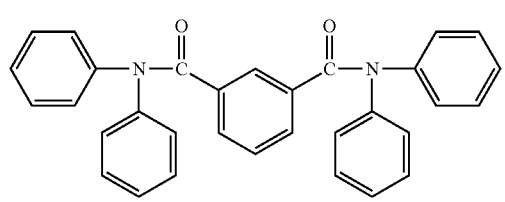
FA-25
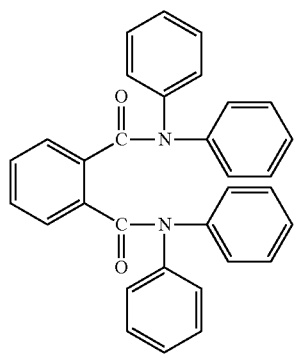
FA-26
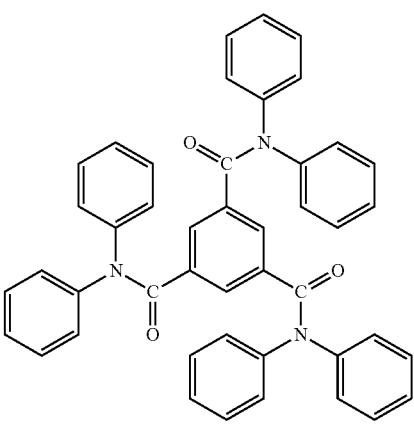
FA-27
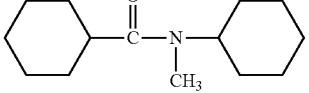
FA-28
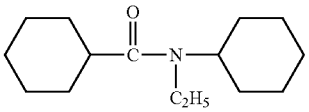
FB-1
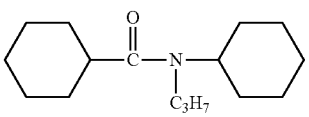
FB-2
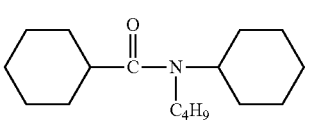
FB-3
FB-4

FB-5
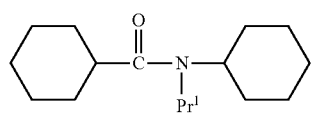
FB-6
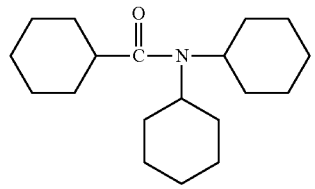
FB-7
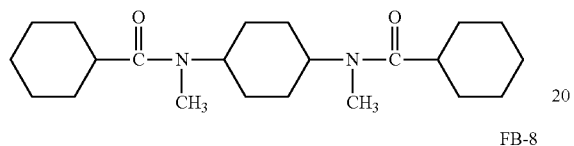
FB-8
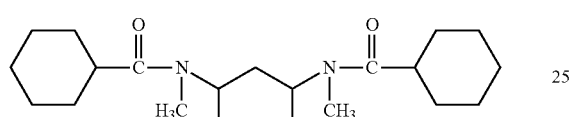
FB-9
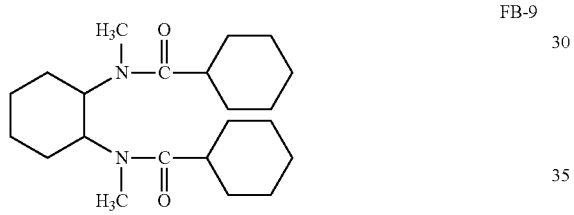
FB-10
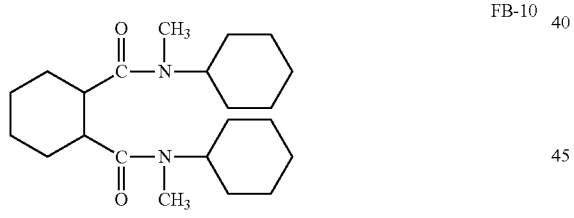
FB-11
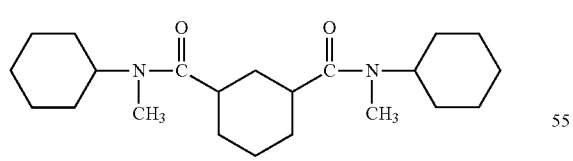
FB-12
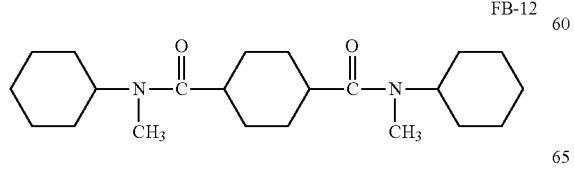
In the above formulae, Pr$^i$ represents an isopropyl group.
FB-13
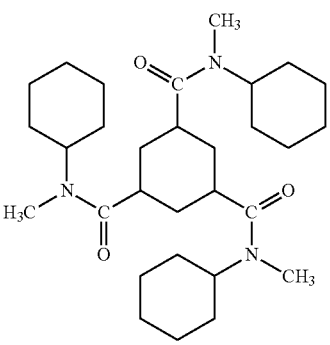
FB-14
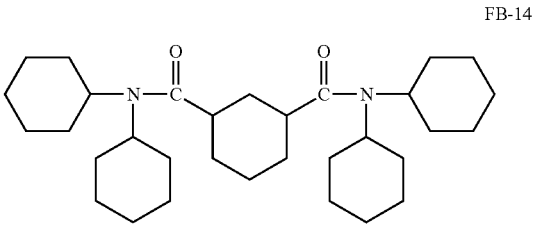
FB-15
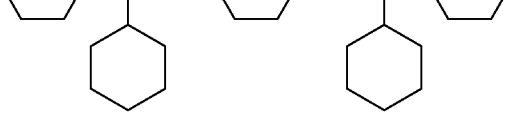
FB-16
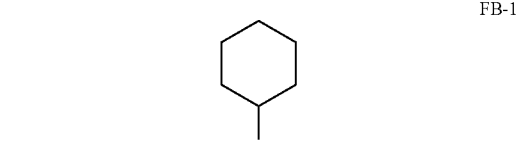
FB-17
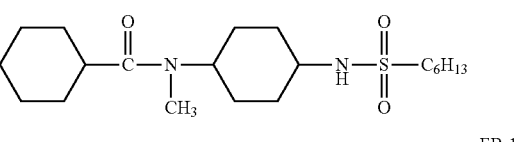
FB-18
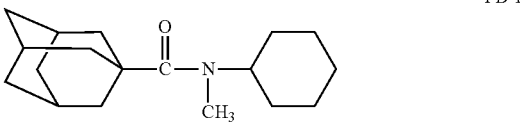
FB-19
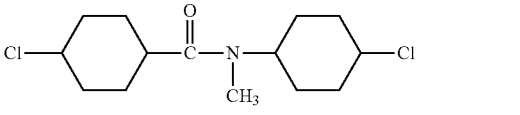
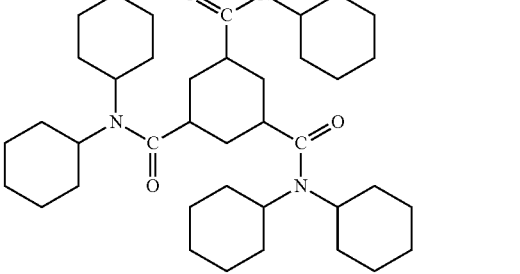

FB-20
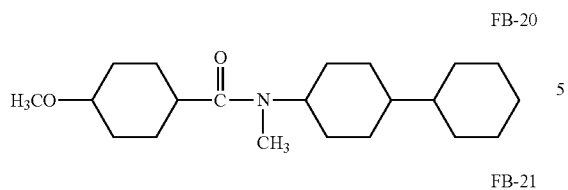
FB-21
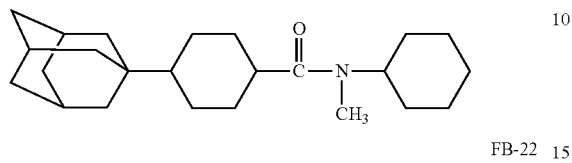
FB-22
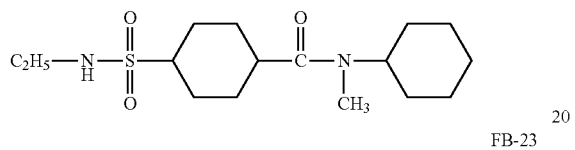
FB-23
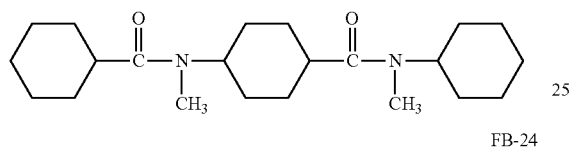
FB-24
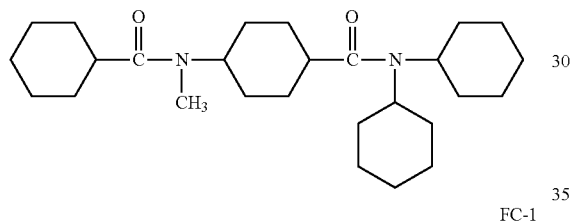
FC-1
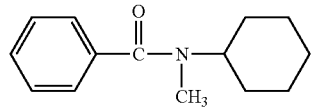
FC-2
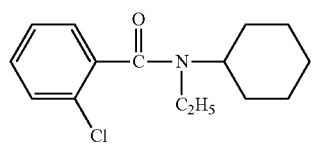
FC-3
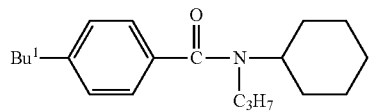
FC-4
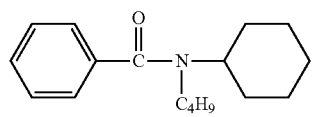
FC-5
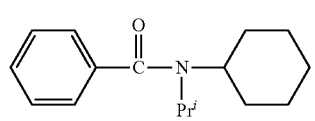
FC-6
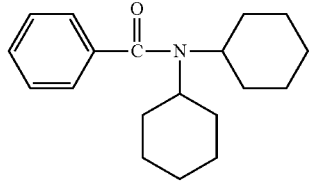
FC-7
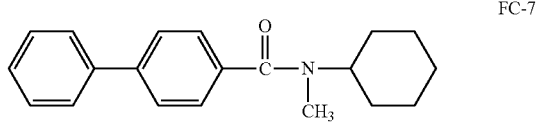
FC-8
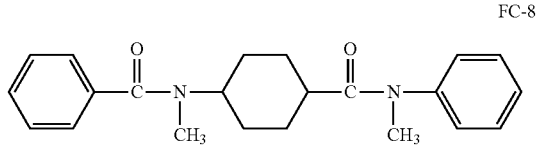
FC-9
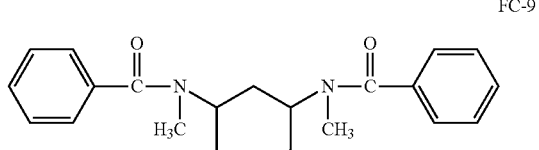
FC-10
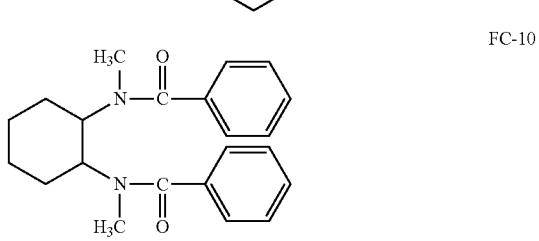
FC-11
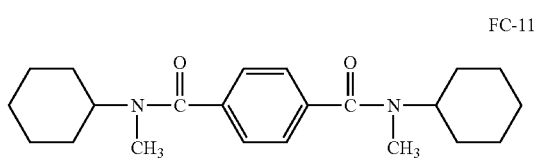
FC-12
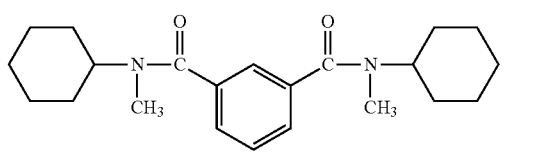
FC-13
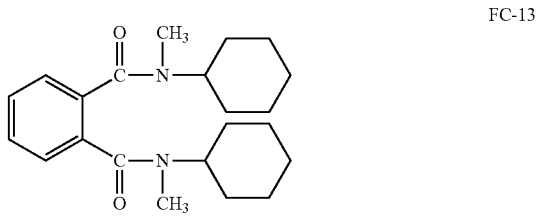

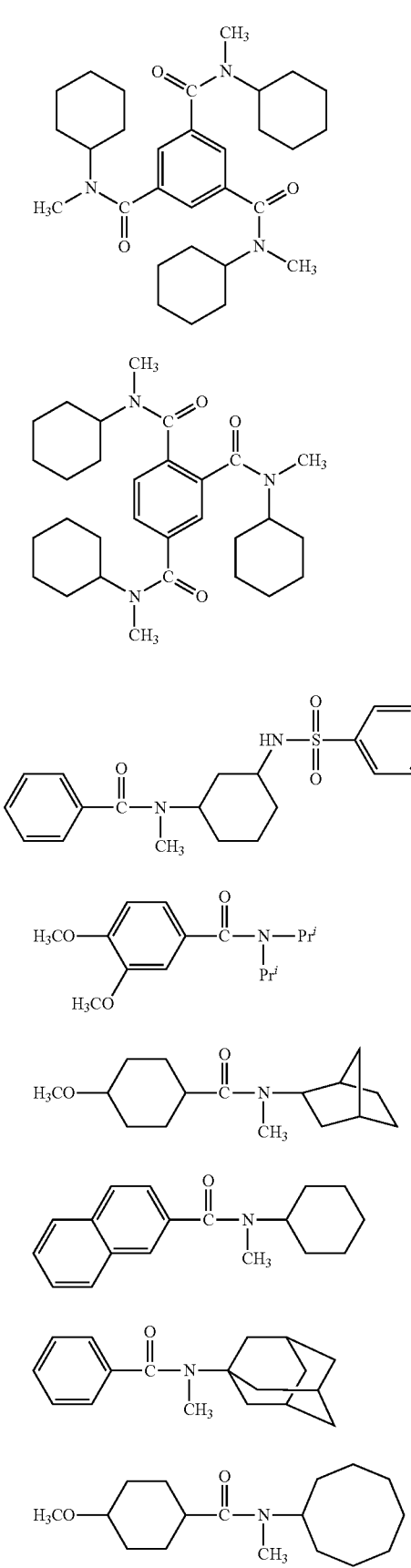
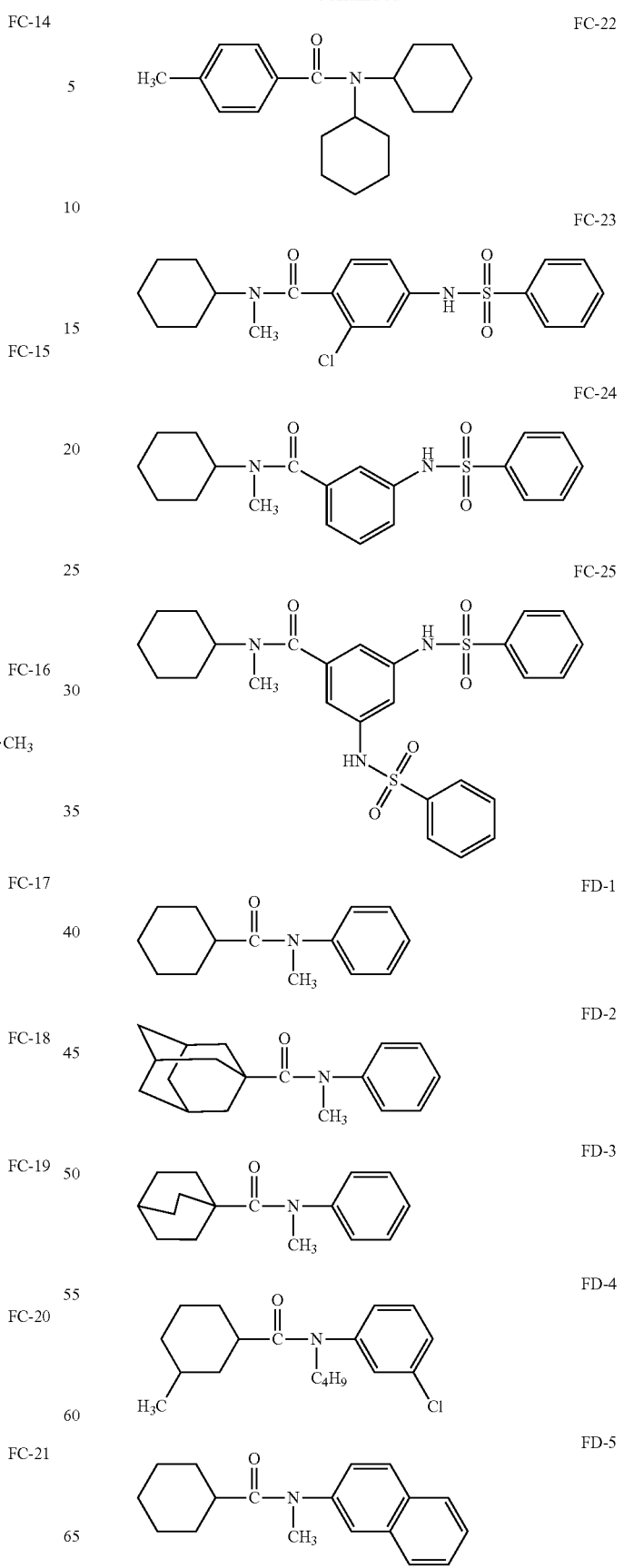

FD-6
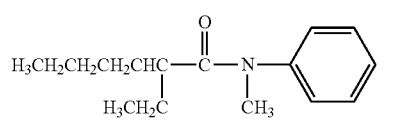
FD-7
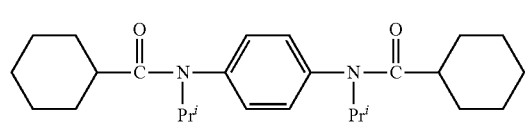
FD-8
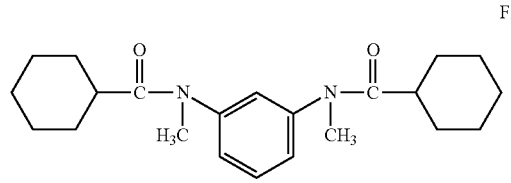
FD-9
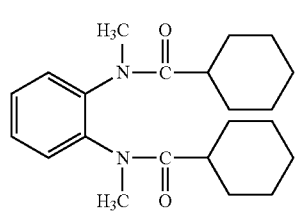
FD-10
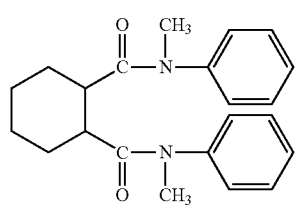
FD-11
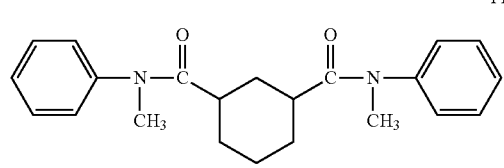
FD-12
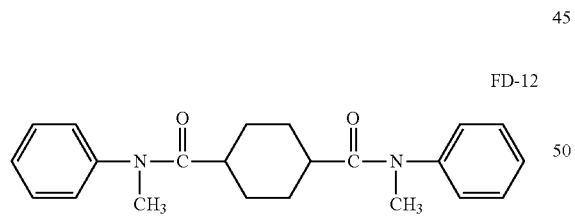
FD-13
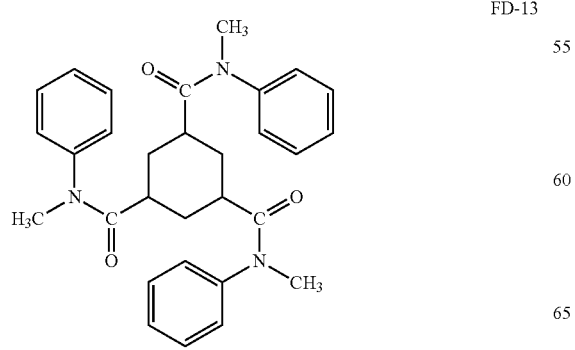
FD-14
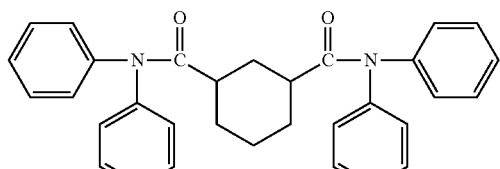
FD-15
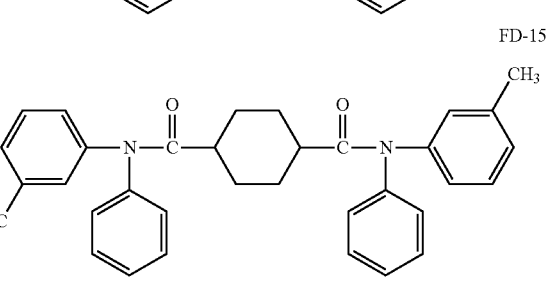
FD-16
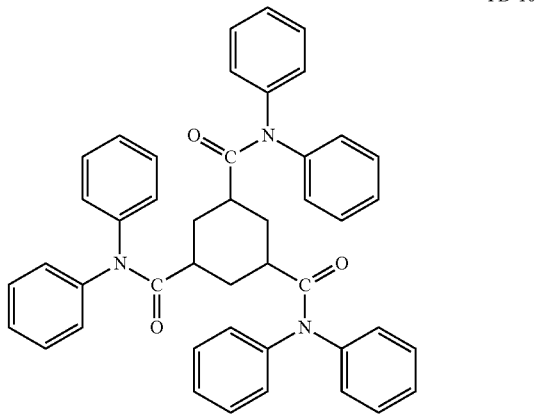
FD-17
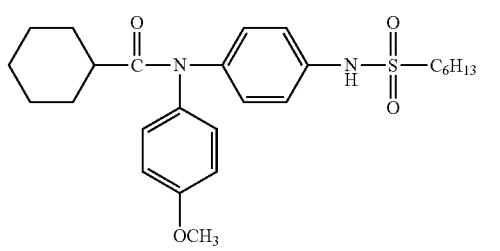
FD-18
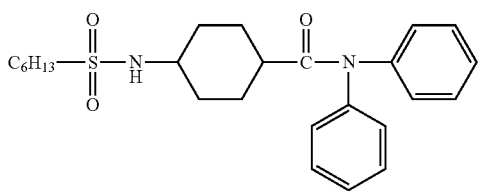
FD-19
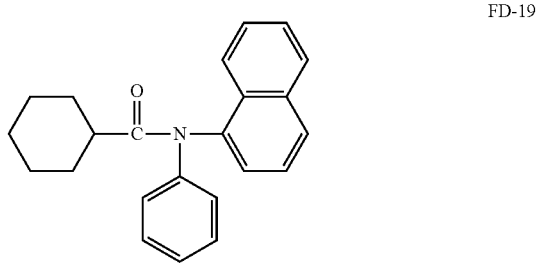

-continued

FD-20
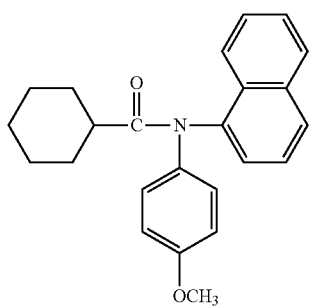

FD-21
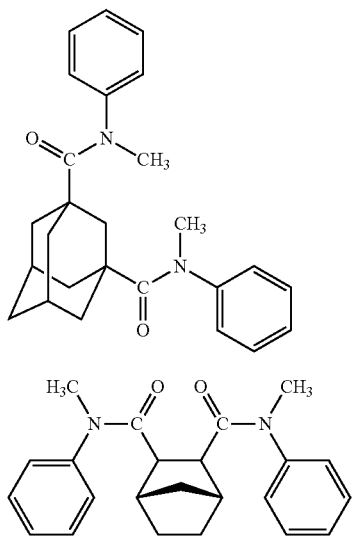

FD-22
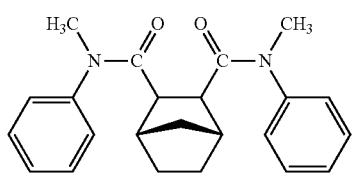

[Wavelength Dispersion Regulator]

Next, a compound lessening wavelength dispersion of the cellulose acylate film (hereinafter referred to as a wavelength dispersion regulator) will be illustrated. It is preferable that the cellulose acylate film of the invention contains at least one compound capable of lowering the wavelength dispersion of Rth represented by the following formula (iii) $\Delta Rth= |Rth_{(400)}-Rth_{(700)}|$ within a range of satisfying the following formulae (iv) and (v):

$$\Delta Rth = |Rth_{(400)} - Rth_{A(700)}| \quad (iii)$$

$$(\Delta Rth(B) - \Delta Rth(0))/B \leq -2.0; \quad (iv)$$

$$0.01 \leq B \leq 30: \quad (v)$$

wherein $\Delta Rth(B)$ is $\Delta Rth$ (nm) of a film containing B % of the compound capable of lowering wavelength dispersion of Rth; $\Delta Rth(0)$ is $\Delta Rth$ (nm) of a film containing no compound capable of lowering wavelength dispersion of Rth; and B is the mass (%) of the compound referring the mass of the cellulose acylate as to 100.

Concerning the above formulae (iv) and (v), it is preferable that:

$$(\Delta Rth(B) - \Delta Rth(0))/B - 3.0 \quad (iv)$$

$$0.05 \leq B \leq 25: \quad (v)$$

still preferably:

$$(\Delta Rth(B) - \Delta Rth(0))/B - 4.0 \quad (iv)$$

$$0.1 \leq B \leq 20. \quad (v)$$

As the wavelength dispersion regulator as described above, it is preferable to use a compound having an absorption in the ultraviolet region of 200 to 400 nm and being capable of lowering both of |Re(400)−Re(700)| and |Rth(400)−Rth(700)|. It is advantageous to use such a compound in an amount of from 0.01 to 30% by mass based on the solid content of cellulose acylate.

Regarding the wavelength-dependent distribution thereof, the values of Re and Rth of cellulose acylate film are generally larger in a short wavelength range than in a long wavelength range. Therefore, it is desired that the small values of Re and Rth in a short wavelength range are increased to thereby reduce the wavelength-dependent Re and Rth distribution. On the other hand, the wavelength-dependent characteristic distribution of compounds having an absorption in a UV range of from 200 to 400 nm is such that the absorbance of the compound is larger in a long wavelength range than in a short wavelength range. When a compound of the type is isotropically inside cellulose acylate film, then the birefringence and therefore the wavelength-dependent Re and Rth distribution of the compound may be larger in the short wavelength range like the wavelength-dependent absorbance distribution thereof.

Accordingly, when a compound having an absorption in a UV range of from 200 to 400 nm and probably having a larger wavelength-dependent Re and Rth distribution in a short wavelength range, such as that mentioned above, is used in a cellulose acylate film, then the wavelength-dependent Re and Rth distribution the film could be controlled. For this, the compound having the ability to control the wavelength-dependent anisotropy distribution of cellulose acylate film must be satisfactorily and uniformly miscible with cellulose acylate. Preferably, the compound of the type has a UV absorption range of from 200 to 400 nm, more preferably from 220 to 395 nm, even more preferably 240 to 390 nm.

In recent liquid-crystal display devices for televisions, notebook-size personal computers and mobile display terminals, the optical members are required to have a high transmittance in order that the display devices can have a high brightness at a smaller power. In this point, when a compound having an absorption in a UV region of from 200 to 400 nm and having the ability to reduce |Re(400)−Re(700)| and |Rth(400)−Rth(700)| of cellulose acylate film is added to the film, it is desired that the film with the compound added thereto could have a high spectral transmittance. Preferably, the cellulose acylate film in the invention has a spectral transmittance at a wavelength of 380 nm of from 45% to 95%, and has a spectral transmittance at a wavelength of 350 nm of at most 10%.

From the viewpoint of the vaporization thereof, it is desirable that the wavelength-dependent anisotropy distribution improver preferred for use in the invention such as that mentioned hereinabove has a molecular weight of from 250 to 1000, more preferably from 260 to 800, even more preferably from 270 to 800, still more preferably from 300 to 800. Having a molecular weight that falls within the range, the improver may have a specific monomer structure or may have an oligomer structure or a polymer structure that comprises plural monomer units bonding to each other.

It is desirable that the wavelength-dependent anisotropy distribution improver does not evaporate away during the process of dope-casting and drying in cellulose acylate film formation.

(Amount of Compound to be Added)

It is desirable that the amount of the above-mentioned wavelength-dependent anisotropy distribution improver preferable for use in the invention is from 0.01 to 30% by mass of cellulose acylate, more preferably from 0.1 to 20% by mass, even more preferably from 0.2 to 10% by mass.

(Method of Addition of Compound)

One or more different types of such wavelength-dependent anisotropy distribution improvers may be used herein either singly or as combined.

Regarding its addition, the wavelength-dependent anisotropy distribution improver may be added to the film-forming dope in any stage of dope preparation or in the last step of dope preparation.

Specific examples of the wavelength-dependent anisotropy distribution improver preferred for use in the invention are benzotriazole compounds, benzophenone compounds, cyano group-containing compounds, oxybenzophenone compounds, salicylate compounds and nickel complex salt compounds, to which, however, the invention should not be limited. Hereafter, preferred compounds are exemplified.

Preferred examples of benzotriazole compounds for use as the wavelength-dependent anisotropy distribution improver in the invention are those of the following formula (101):

$Q^1$-$Q^2$-OH wherein $Q^1$ represents a nitrogen-containing aromatic hetero ring; and $Q^2$ represents an aromatic ring.

$Q^1$ is a nitrogen-containing aromatic hetero ring, preferably a 5- to 7-membered nitrogen-containing aromatic hetero ring, more preferably a 5- or 6-membered nitrogen-containing aromatic hetero ring, including, for example, imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthoxazole, azabenzimidazole, purine, pyridine, pyrazine, pyrimidine, pyridazine, triazine, triazaindene, tetrazaindene. More preferably, $Q^1$ is a 5-membered nitrogen-containing aromatic hetero ring, concretely including imidazole, pyrazole, triazole, tetrazole, thiazole, oxazole, benzotriazole, benzothiazole, benzoxazole, thiadiazole, oxadiazole, and is especially preferably benzotriazole.

The nitrogen-containing aromatic hetero ring for $Q^1$ is may have a substituent. For the substituent, the substituents T mentioned below are applicable. Plural substituents, if any, may be condensed to form a condensed ring.

The aromatic ring for $Q^2$ may be an aromatic hydrocarbon ring or an aromatic hetero ring. This may be a single ring or may form a condensed ring with any other ring.

The aromatic hydrocarbon ring is preferably a monocyclic or bicyclic aromatic hydrocarbon ring having from 6 to 30 carbon atoms (e.g., benzene ring, naphthalene ring), more preferably an aromatic hydrocarbon ring having from 6 to 20 carbon atoms, even more preferably from 6 to 12 carbon atoms. Still more preferably, it is a benzene ring.

The aromatic hetero-ring is preferably one that contains a nitrogen atom or a sulfur atom. Examples of the hetero-ring are thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene. The aromatic hetero-ring is preferably pyridine, triazine or quinoline.

The aromatic ring for $Q^2$ is preferably an aromatic hydrocarbon ring, more preferably a naphthalene ring or a benzene ring, even more preferably a benzene ring. $Q^2$ may have a substituent. For the substituent, preferred are the substituents T mentioned below.

The substituents T include, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from 1 to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenyloxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is any of nitrogen atom, oxygen atom or sulfur atom., e.g., imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. Two or more substituents, if any, may be the same or different. If possible, they may bond to each other to form a ring.

Of the compounds of formula (101), preferred are those of the following formula (101-A):

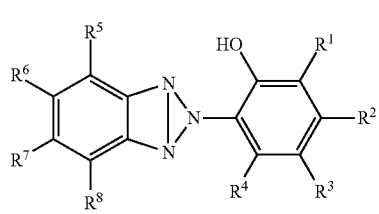

Formula (101-A)

wherein $R^1$, $R^2$, $R^3$, $R^4$, $R^5$, $R^6$, $R^7$ and $R^8$ each independently represents a hydrogen atom or a substituent.

$R^1$, $R^2$, $R^3$, $R^4$, $R^5$, $R^6$, $R^7$ and $R^8$ each independently represents a hydrogen atom or a substituent. For the substituent, referred to are the substituents T mentioned above. These substituents may have any other substituent. The substituents may be condensed to form a condensed cyclic structure.

$R^1$ and $R^3$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably an alkyl group having from 1 to 12 carbon atoms (preferably having from 4 to 12 carbon atoms).

$R^2$ and $R^4$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^5$ and $R^8$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^6$ and $R^7$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom or a halogen atom; still more preferably a hydrogen atom or a chlorine atom.

Of the compounds of formula (101), more preferred are those of the following formula (101-B):

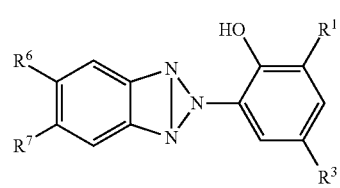

Formula (101-B)

wherein $R^1$, $R^3$, $R^6$ and $R^7$ have the same meanings as those in formula (101-A), and their preferred ranges are also the same as those therein.

Specific examples of the compounds of formula (101) are mentioned below, to which, however, the invention should not be limited.

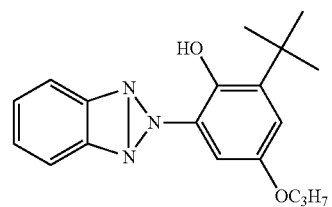

UV-1

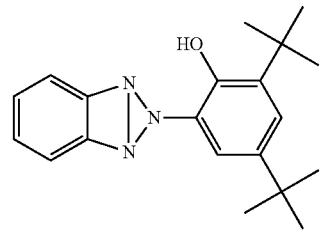

UV-2

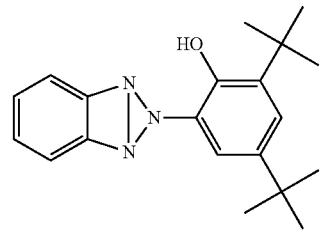

UV-3

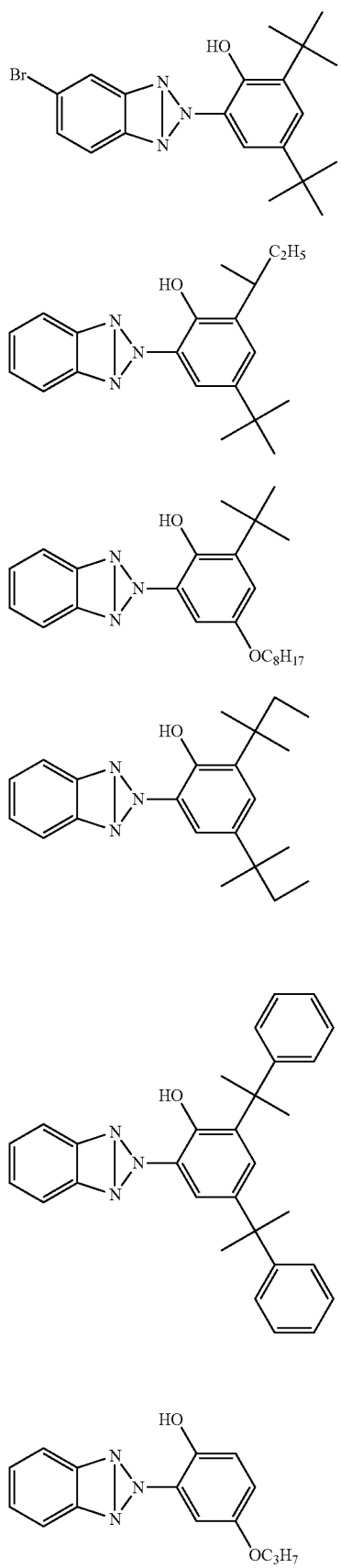
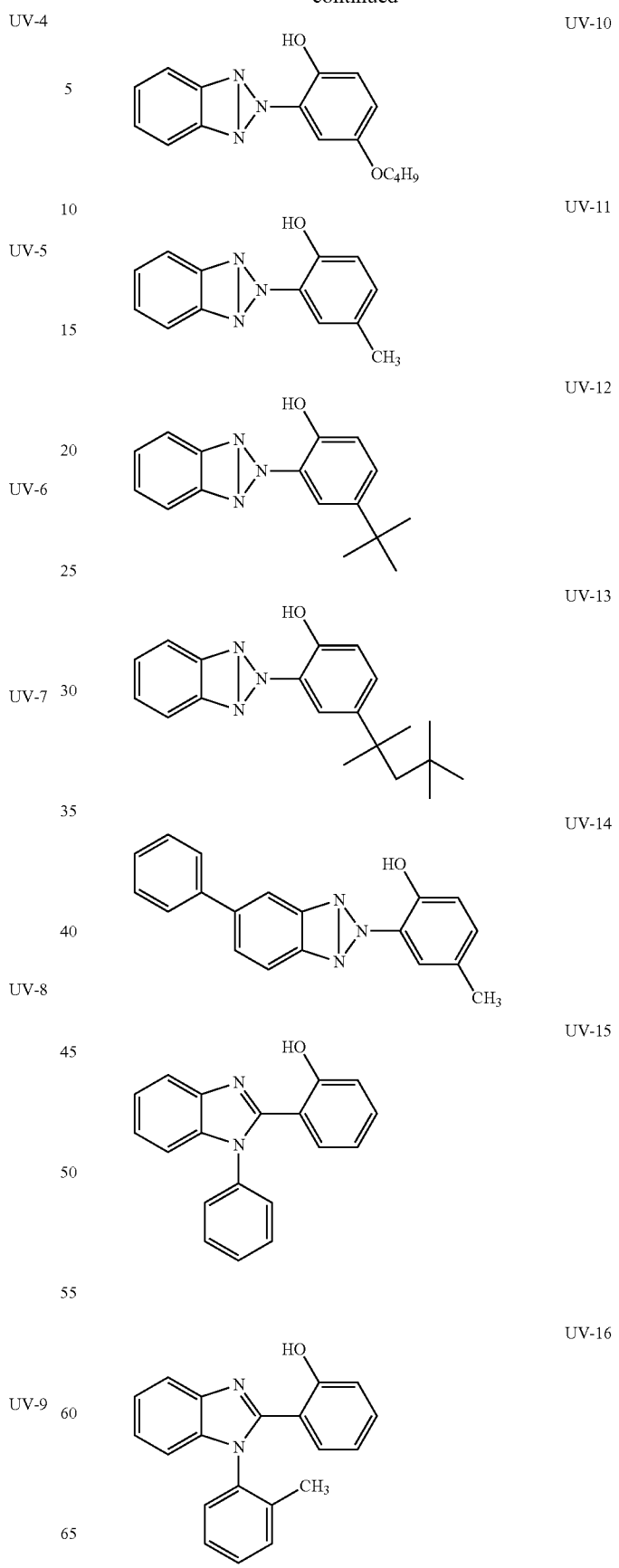

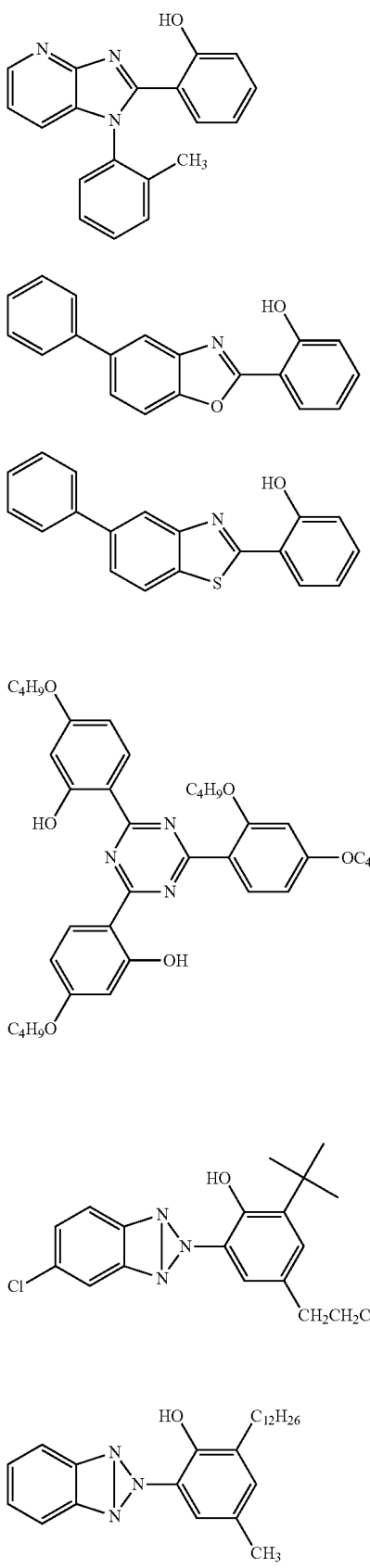
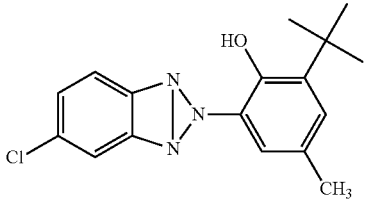

Of the benzotriazole compounds mentioned hereinabove, those having a molecular weight of not smaller than 320 are preferred. We, the present inventors have confirmed that the compounds of the type are advantageous in point of their retentiveness in cellulose acylate films formed with them.

Preferred examples of benzophenone compounds for use as the wavelength-dependent anisotropy distribution improver in the invention are those of the following Formula (102):

Formula (102)

$$Q^1\overset{O}{\underset{\|}{C}}Q^2\text{—XH}$$

wherein $Q^1$ and $Q^2$ each independently represents an aromatic ring; X represents NR (where R represents a hydrogen atom or a substituent), an oxygen atom or a sulfur atom.

The aromatic ring for $Q^1$ and $Q^2$ may be an aromatic hydrocarbon ring or an aromatic hetero ring. It may be a single ring or may form a condensed ring with any other ring.

The aromatic hydrocarbon ring for $Q^1$ and $Q^2$ is preferably a monocyclic or bicyclic aromatic hydrocarbon ring having from 6 to 30 carbon atoms (e.g., benzene ring, naphthalene ring), more preferably an aromatic hydrocarbon ring having from 6 to 20 carbon atoms, even more preferably from 6 to 12 carbon atoms. Still more preferably, it is a benzene ring.

The aromatic hetero ring for $Q^1$ and $Q^2$ is preferably an aromatic hetero ring that contains at least any one of an oxygen atom, a nitrogen atom or a sulfur atom. Examples of the hetero-ring are furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene. The aromatic hetero-ring is preferably pyridine, triazine or quinoline.

The aromatic ring for $Q^1$ and $Q^2$ is preferably an aromatic hydrocarbon ring, more preferably an aromatic hydrocarbon ring having from 6 to 10 carbon atoms, still more preferably a substituted or unsubstituted benzene ring.

$Q^1$ and $Q^2$ may have a substituent, for which preferred are the substituents T mentioned below. However, the substituent does not include a carboxylic acid, a sulfonic acid and a quaternary ammonium salt. If possible, the substituents may bond to each other to form a cyclic structure.

X represents NR (where R represents a hydrogen atom or a substituent, and for the substituent, referred to are the substituents T mentioned below), an oxygen atom or a sulfur atom. X is preferably NR (where R is preferably an acyl group or a sulfonyl group which may be substituted), or O, more preferably O.

The substituents T include, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from 1 to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenyloxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is any of nitrogen atom, oxygen atom or sulfur atom., e.g., imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. Two or more substituents, if any, may be the same or different. If possible, they may bond to each other to form a ring.

Of the compounds of formula (102), preferred are those of the following formula (102-A):

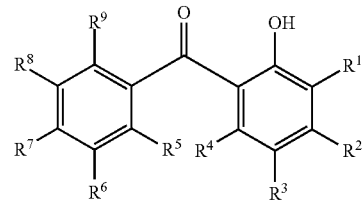

Formula (102-A)

wherein $R^1$, $R^2$, $R^3$, $R^4$, $R^5$, $R^6$, $R^7$, $R^8$ and $R^9$ each independently represents a hydrogen atom or a substituent.

$R^1$, $R^2$, $R^3$, $R^4$, $R^5$, $R^6$, $R^7$, $R^8$ and $R^9$ each independently represents a hydrogen atom or a substituent. For the substituent, referred to are the substituents T mentioned above. These substituents may have any other substituent. The substituents may be condensed to form a condensed cyclic structure.

$R^1$, $R^3$, $R^4$, $R^5$, $R^6$, $R^8$ and $R^9$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^2$ is preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms, or a hydroxyl group; even more preferably an alkoxy group having from 1 to 20 carbon atoms; still more preferably an alkoxy group having from 1 to 12 carbon atoms.

$R^7$ is preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms, or a hydroxyl group; even more preferably a hydrogen atom, or an alkoxy group having from 1 to 20 carbon atoms (preferably having from 1 to 12 carbon atoms, more preferably having from 1 to 8 carbon atoms, still more preferably a methyl group); especially preferably a methyl group or a hydrogen atom.

Of the compounds of formula (102), more preferred are those of the following formula (102-B):

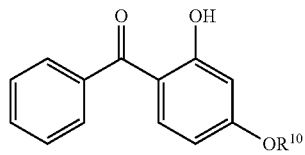

Formula (102-B)

wherein $R^{10}$ represents a hydrogen atom, a substituted or unsubstituted alkyl group, a substituted or unsubstituted alkenyl group, a substituted or unsubstituted alkynyl group, or a substituted or unsubstituted aryl group.

$R^{10}$ is a hydrogen atom, a substituted or unsubstituted alkyl group, a substituted or unsubstituted alkenyl group, a substituted or unsubstituted alkynyl group, or a substituted or unsubstituted aryl group. For the substituent, referred to are the substituents T mentioned above.

$R^{10}$ is preferably a substituted or unsubstituted alkyl group, more preferably a substituted or unsubstituted alkyl group having from 5 to 20 carbon atoms, even more preferably a substituted or unsubstituted alkyl group having from 5 to 12 carbon atoms (e.g., n-hexyl group, 2-ethylhexyl group, n-octyl group, n-decyl group, n-dodecyl group, benzyl group), still more preferably a substituted or unsubstituted alkyl group having from 6 to 12 carbon atoms (e.g., 2-ethylhexyl group, n-octyl group, n-decyl group, n-dodecyl group, benzyl group).

The compounds of formula (102) may be produced according to a known method such as that described in JP-A 11-12219.

Specific examples of the compounds of formula (102) are mentioned below, to which, however, the invention should not be limited.

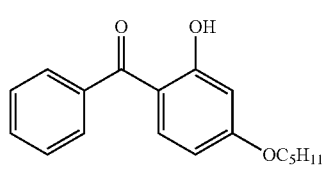

UV-101

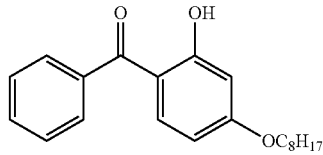

UV-102

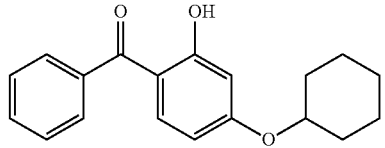

UV-103

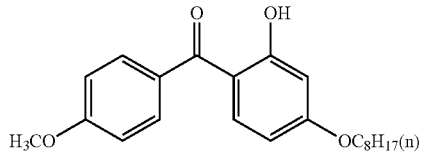

UV-104

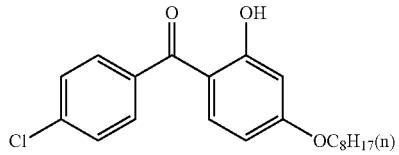

UV-105

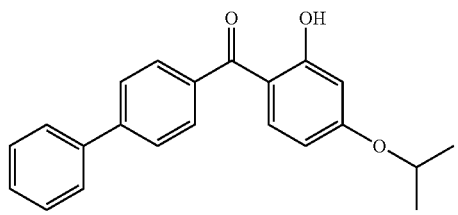

UV-106

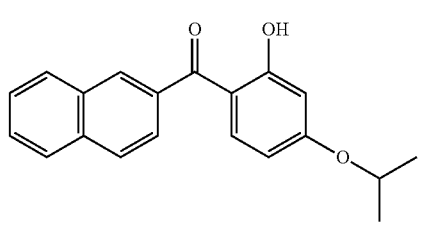

UV-107

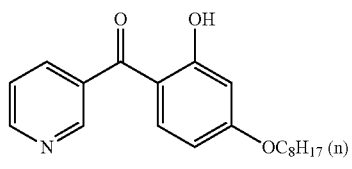

UV-108

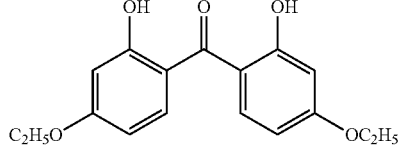

UV-109

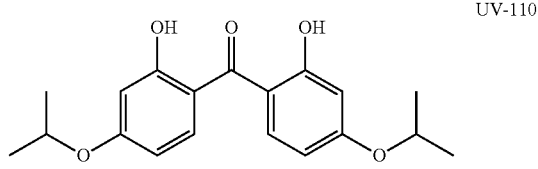

UV-110

UV-111
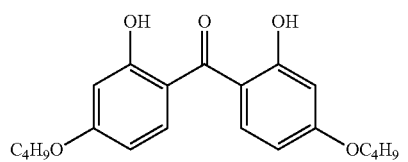

UV-112
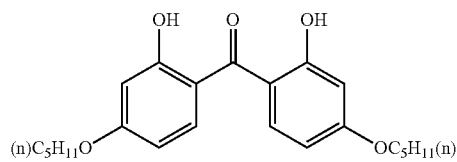

UV-113
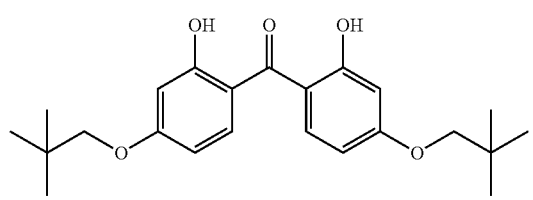

UV-114
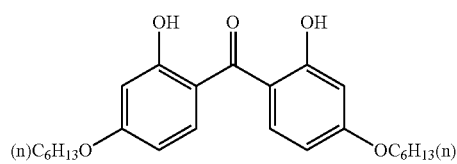

UV-115
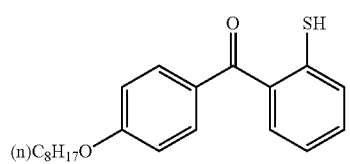

UV-116
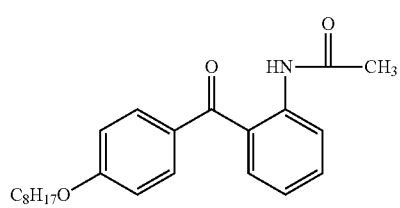

UV-117
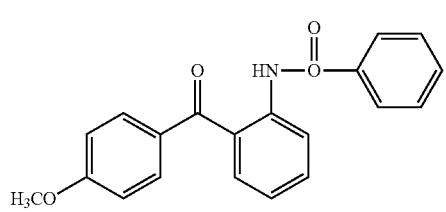

UV-118
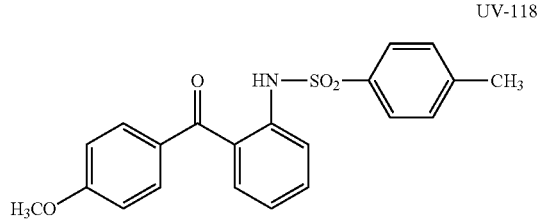

UV-119
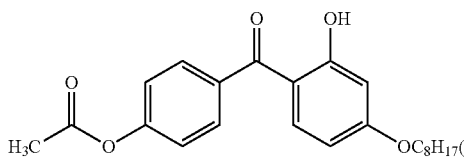

UV-120
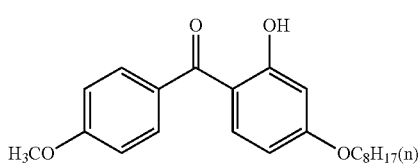

UV-121
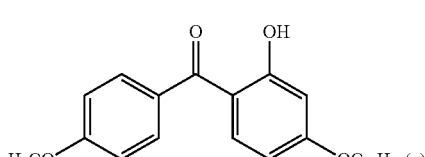

Preferred examples of cyano group-containing compounds for use as the wavelength-dependent anisotropy distribution improver in the invention are those of the following Formula (103):

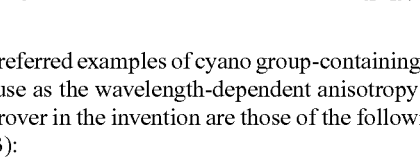

Formula (103)

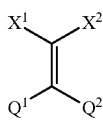

wherein $Q^1$ and $Q^2$ each independently represents an aromatic ring; $X^1$ and $X^2$ each independently represent a hydrogen atom or a substituent, and at least one of these is a cyano group.

The aromatic ring for $Q^1$ and $Q^2$ may be an aromatic hydrocarbon ring or an aromatic hetero ring, and it may be a single ring or may form a condensed ring with any other ring.

The aromatic hydrocarbon ring is preferably a monocyclic or bicyclic aromatic hydrocarbon ring having from 6 to 30 carbon atoms (e.g., benzene ring, naphthalene ring), more preferably an aromatic hydrocarbon ring having from 6 to 20 carbon atoms, even more preferably from 6 to 12 carbon atoms. Still more preferably, it is a benzene ring.

The aromatic hetero-ring is preferably one that contains a nitrogen atom or a sulfur atom as a hetero atom. Examples of the hetero-ring are thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene. The aromatic hetero-ring is preferably pyridine, triazine or quinoline.

The aromatic ring for $Q^1$ and $Q^2$ is preferably an aromatic hydrocarbon ring, more preferably a benzene ring.

$Q^1$ and $Q^2$ may have a substituent, for which referred to are the substituents T mentioned below. The substituents T include, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from 1 to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenyloxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is any of nitrogen atom, oxygen atom or sulfur atom., e.g., imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. Two or more substituents, if any, may be the same or different. If possible, they may bond to each other to form a ring.

$X^1$ and $X^2$ each are a hydrogen atom or a substituent, and at least one of these is a cyano group. For the substituent for $X^1$ and $X^2$, referred to are the substituents T mentioned above. The substituent for $X^1$ and $X^2$ may be substituted with any other substituent, and $X^1$ and $X^2$ may be condensed to form a cyclic structure.

$X^1$ and $X^2$ are preferably a hydrogen atom, an aryl group, a cyano group, a nitro group, a carbonyl group, a sulfonyl group or an aromatic hetero ring; more preferably a cyano group, a carbonyl group, a sulfonyl group or an aromatic hetero ring; even more preferably a cyano group or a carbonyl group; still more preferably a cyano group, or an alkoxycarbonyl group (—C(=O)OR where R represents an alkyl group having from 1 to 20 carbon atoms, an aryl group having from 6 to 12 carbon atoms or their combination).

Of the compounds of formula (103), preferred are those of the following formula (103-A):

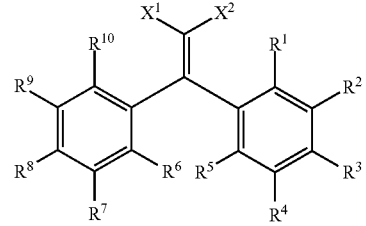

Formula (103-A)

wherein $R^1$, $R^2$, $R^3$, $R^4$, $R^5$, $R^6$, $R^7$, $R^8$, $R^9$ and $R^{10}$ each independently represents a hydrogen atom or a substituent; $X^1$ and $X^2$ have the same meanings as those in formula (103), and their preferred ranges are also the same as those therein.

$R^1$, $R^2$, $R^3$, $R^4$, $R^5$, $R^6$, $R^7$, $R^8$, $R^9$ and $R^{10}$ each independently represents a hydrogen atom or a substituent. For the substituent, referred to are the substituents T mentioned above. These substituents may have any other substituent. The substituents may be condensed to form a condensed cyclic structure.

$R^1$, $R^2$, $R^4$, $R^5$, $R^6$, $R^7$, $R^9$ and $R^{10}$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^3$ and $R^8$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms, or a hydroxyl group; even more preferably a hydrogen atom, or an alkoxy group having from 1 to 12 carbon atoms; still more preferably an alkoxy group having from 1 to 12 carbon atoms; further preferably a hydrogen atom.

Of the compounds of formula (103), more preferred are those of the following formula (103-B):

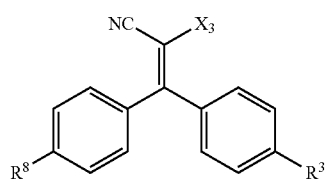

Formula (103-B)

wherein $R^3$ and $R^8$ have the same meanings as those in formula (103-A), and their preferred ranges are also the same as therein; $X^3$ represents a hydrogen atom or a substituent.

$X^3$ represents a hydrogen atom or a substituent. For the substituent, referred to are the substituents T mentioned above. If possible, the substituent may be further substituted with any other substituent. $X^3$ is preferably a hydrogen atom, an alkyl group, an aryl group, a cyano group, a nitro group, a carbonyl group, a sulfonyl group or an aromatic hetero ring; more preferably a cyano group, a carbonyl group, a sulfonyl group or an aromatic hetero ring; even more preferably a cyano group or a carbonyl group; still more preferably a cyano group or an alkoxycarbonyl group (—C(=O)OR where R is an alkyl group having from 1 to 20 carbon atoms, an aryl group having from 6 to 12 carbon atoms or their combination).

Of the compounds of formula (103), even more preferred are those of the following formula (103-C):

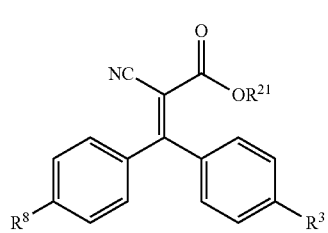

Formula (103-C)

wherein $R^3$ and $R^8$ have the same meanings as those in formula (103-A), and their preferred ranges are also the same as therein; $R^{21}$ represents an alkyl group having from 1 to 20 carbon atoms.

When $R^3$ and $R^8$ are both hydrogen atoms, then $R^{21}$ is preferably an alkyl group having from 2 to 12 carbon atoms, more preferably an alkyl group having from 4 to 12 carbon atoms, even more preferably an alkyl group having from 6 to 12 carbon atoms, still more preferably an n-octyl group, a tert-octyl group, a 2-ethylhexyl group, an n-decyl group or an n-dodecyl group; most preferably a 2-ethylhexyl group.

When $R^3$ and $R^8$ are not hydrogen atoms, then $R^{21}$ is preferably an alkyl group having at most 20 carbon atoms with which the molecular weight of the compound of formula (103-C) could be at least 300.

The compounds of formula (103) for use in the invention can be produced according to the method described in *Journal of American Chemical Society*, Vol. 63, p. 3452 (1941).

Specific examples of the compounds of formula (103) are mentioned below, to which, however, the invention should not be limited.

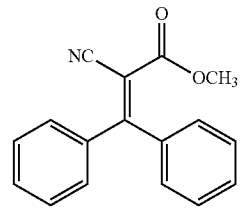

UV-201

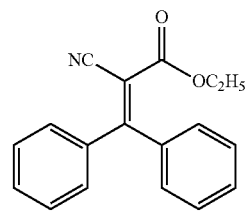

UV-202

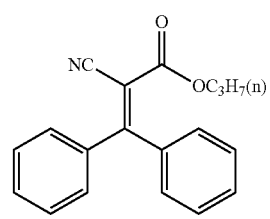

UV-203

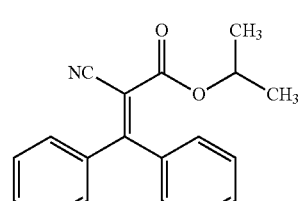

UV-204

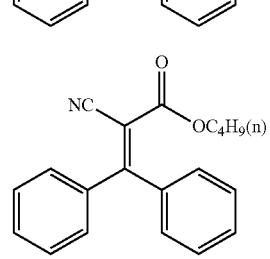

UV-205

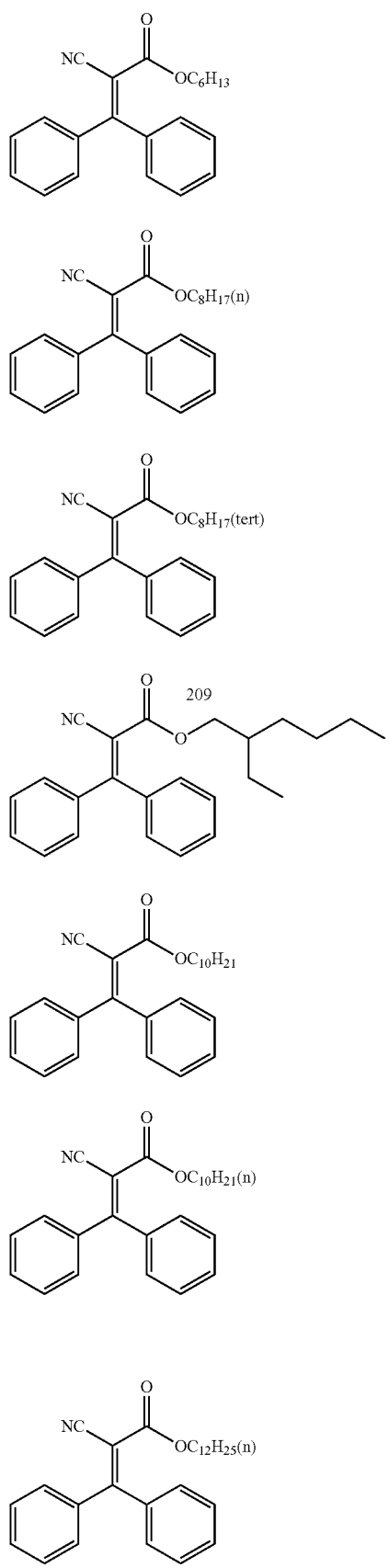
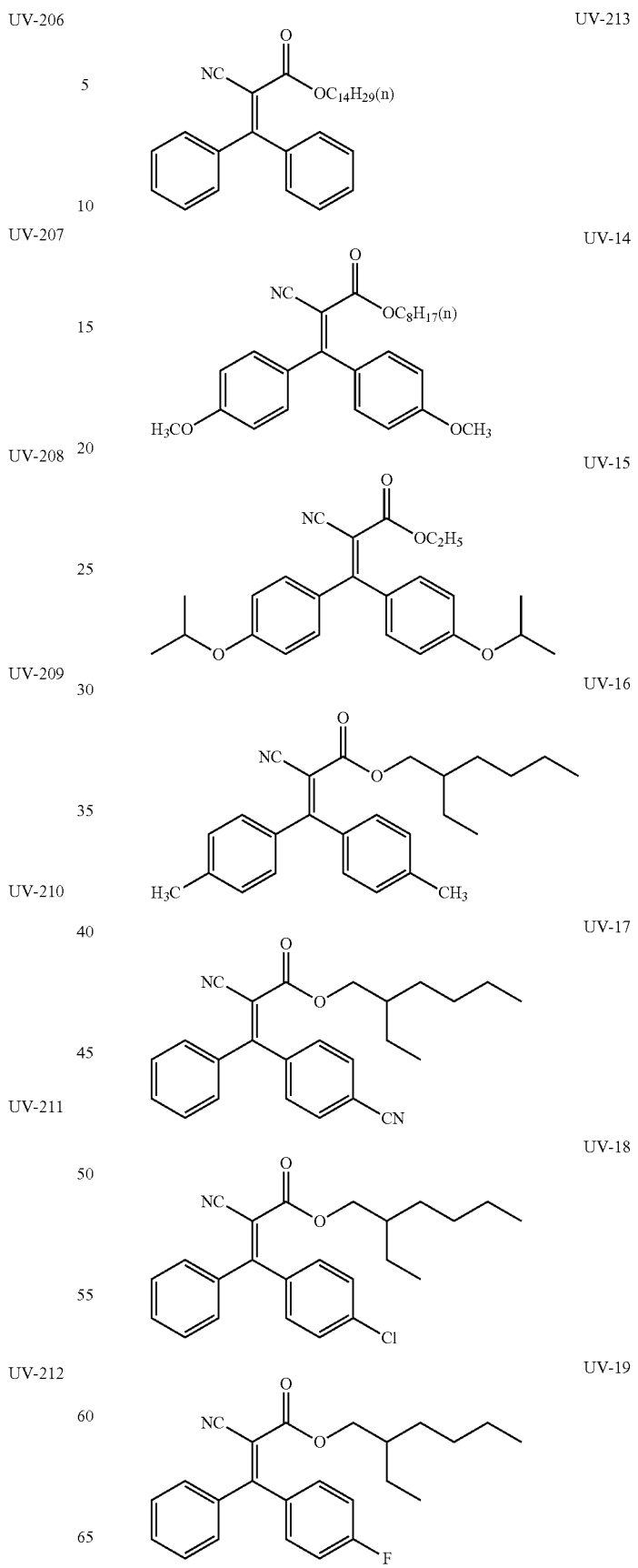

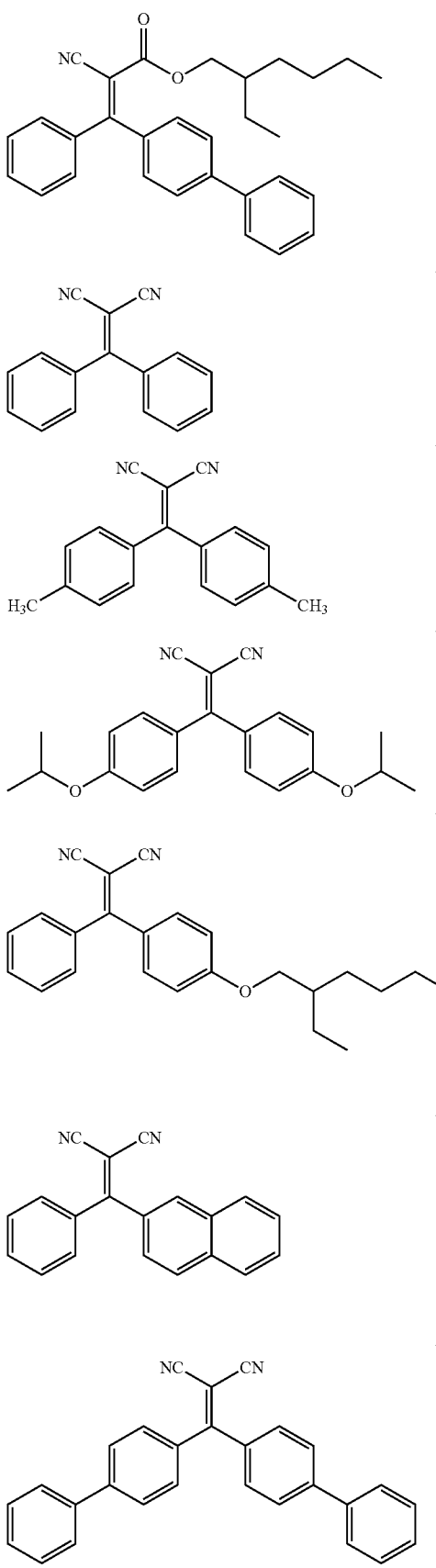

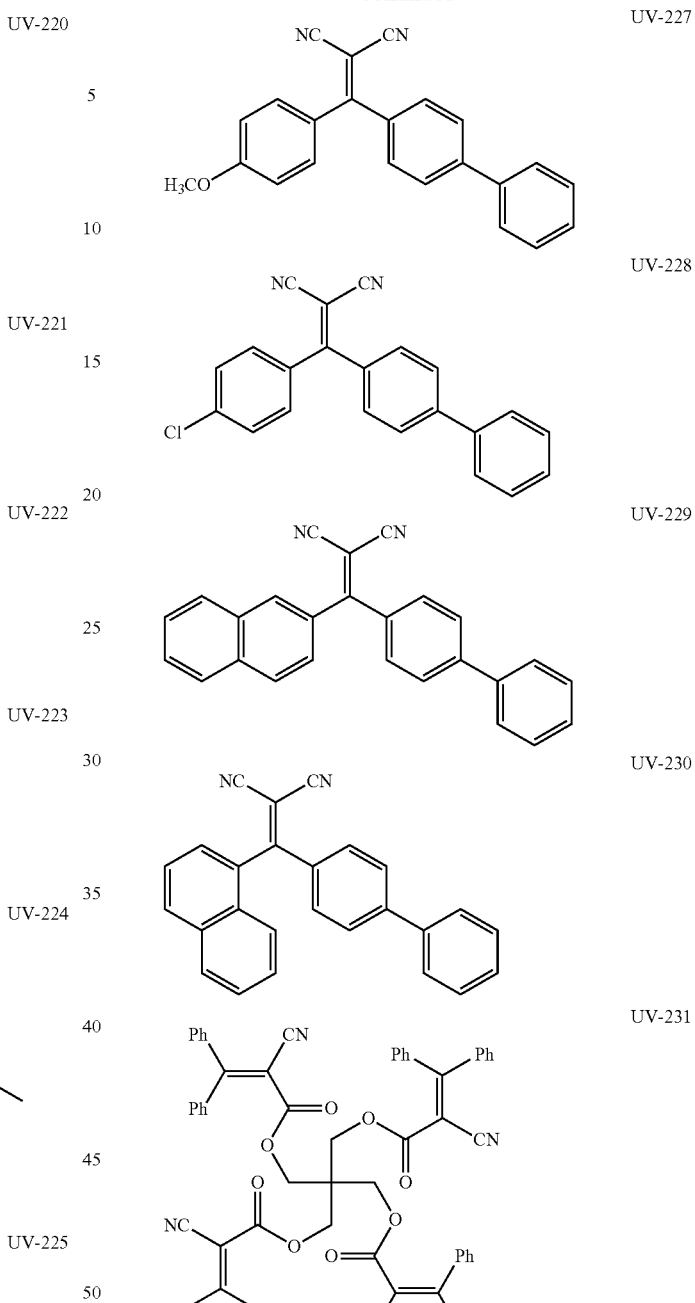

[Mat Agent Particles]

The cellulose acylate film in the invention preferably contains particles serving as a mat agent. The particles for use herein include silicon dioxide, titanium dioxide, aluminium oxide, zirconium oxide, calcium carbonate, talc, clay, calcined kaolin, calcined calcium silicate, calcium silicate hydrate, aluminium silicate, magnesium silicate and calcium phosphate. The particles are preferably silicon-having ones as the haze of the films containing them may be low. Especially preferred is silicon dioxide. Particles of silicon dioxide for use herein preferably have a primary mean particle size of at most 20 nm and have an apparent specific gravity of at least 70 g/liter. More preferred are particles having a small primary mean particle size of from 5 to 16 nm, since the haze of the films containing them is lower. The apparent specific gravity is more preferably from 90 to 200 g/liter, even more preferably from 100 to 200 g/liter. Particles having a larger apparent specific gravity may give a dispersion having a higher concentration, and are therefore preferable since the haze of the films containing them could be lower and since the solid deposits in the film may be reduced.

The particles generally form secondary particles having a mean particle size of from 0.1 to 3.0 µm, and in the film, they exist as aggregates of primary particles, therefore forming protrusions having a size of from 0.1 to 3.0 µm in the film surface. Preferably, the secondary mean particle size is from 0.2 µm to 1.5 µm, more preferably from 0.4 µm to 1.2 µm, most preferably from 0.6 µm to 1.1 µm. The primary and secondary particle sizes are determined as follows: The particles in a film are observed with a scanning electromicroscope, and the diameter of the circle that is circumscribed around the particle is referred to as the particle size. 200 particles are observed at random in different sites, and their data are averaged to give the mean particle size thereof.

For silicon dioxide particles, herein usable are commercial products of Aerosil R972, R972V, R974, R812, 200, 200V, 300, R202, OX50, TT600 (all by Nippon Aerosil). Zirconium oxide particles are also commercially available, for example, as Aerosil R976 and R811 (both by Nippon Aerosil), and are usable herein.

Of those, Aerosil 200V and Aerosil R972V are silicon dioxide particles having a primary mean particle size of at most 20 nm and having an apparent specific gravity of at least 70 g/liter, and these are especially preferred for use herein since they are effective for reducing the friction coefficient of optical films not increasing the haze thereof.

In the invention, for obtaining a cellulose acylate film that contains particles having a small secondary mean particle size, there may be employed some methods for preparing a dispersion of particles. For example, one method for it comprises previously preparing a dispersion of particles by stirring and mixing a solvent and particles, then adding the resulting dispersion to a small amount of a cellulose acylate solution separately prepared, and thereafter further mixing it with a main cellulose acylate dope. This method is desirable since the dispersibility of silicon dioxide particles is good and since the dispersion of silicon dioxide particles prepared hardly reaggregates. Apart from it, also employable herein is a method comprising adding a small amount of a cellulose ester to a solvent, dissolving them with stirring, and fully mixing the resulting dispersion of particles with a dope in an in-line mixer. The invention should not be limited to these methods. When silicon dioxide particles are mixed and dispersed in a solvent, the silicon dioxide concentration in the resulting dispersion is preferably from 5 to 30% by mass, more preferably from 10 to 25% by mass, most preferably from 15 to 20% by mass. Relative to the amount of the particles therein, the dispersion having a higher concentration may have a smaller haze, and is therefore favorable since the haze of the films with it may be lowered and the solid deposits may be reduced in the films. Finally, the amount of the mat agent to be in the cellulose acylate dope is preferably from 0.01 to 1.0 g/m$^2$, more preferably from 0.03 to 0.3 g/m$^2$, most preferably from 0.08 to 0.16 g/m$^2$.

The solvent may be a lower alcohol, preferably methyl alcohol, ethyl alcohol, propyl alcohol, isopropyl alcohol or butyl alcohol. The solvent usable herein except such lower alcohols is not specifically defined, for which, however, preferred are those generally used in cellulose ester film formation.

[Plasticizer, Antioxidant, Release Agent]

In addition to the compound capable of lowering optical anisotropy and the wavelength-dependent anisotropy dispersion improver mentioned above, the cellulose acylate film of the invention may contain various additives (e.g., plasticizer, UV inhibitor, antioxidant, release agent, IR absorbent) added thereto in the process of producing it and in accordance with the use of the film. The additives may be solid or oily. In other words, they are not specifically defined in point of their melting point and boiling point. For example, UV-absorbing materials may be mixed at 20° C. or lower and at 20° C. or higher; and the same may apply to mixing plasticizers. For example, this is described in JP-A 2001-151901. Further, IR-absorbing dyes are described in, for example, JP-A 2001-194522. The time when the additives are added may be anytime in the process of preparing dopes. As the case may be, the additives may be added in the final step of the process of preparing dopes. The amount of each additive to be added is not specifically defined so far as the additive could exhibit its function. When the cellulose acylate film has a multi-layer structure, then the type and the amount of the additives to be added to each layer may differ. For example, this is described in JP-A 2001-151902, and the technique is well known in the art. Its details are described in Hatsumei Kyokai's Disclosure Bulletin No. 2001-1745 (issued Mar. 15, 2001 by Hatsumei Kyokai), pp. 16-12, and the materials described therein are preferably used in the invention.

[Blend Ratio of Compounds]

In the cellulose acylate film of the invention, the overall amount of the compounds having a molecular weight of at most 3000 is preferably from 5 to 45% relative to the mass of cellulose acylate, more preferably from 10 to 40%, even more preferably from 15 to 30%. As so mentioned hereinabove, the compounds include an compound capable of lowering optical anisotropy, a wavelength-dependent anisotropy dispersion improver, a UV inhibitor, a plasticizer, an antioxidant, fine particles, a release agent and an IR absorbent. Preferably, they have a molecular weight of at most 3000, more preferably at most 2000, even more preferably at most 1000. If the overall amount of these compounds is smaller than 5%, then it may be problematic in that the properties of the cellulose acylate alone may be too noticeable in the film and, for example, the optical properties and the physical strength of the film may readily fluctuate depending on the change of the ambient temperature and humidity. If, however, the overall amount of the compounds is larger than 45%, then the compounds will be over the limit of their miscibility in the cellulose acylate film and it may be also problematic in that the excess compounds may deposit in the film surface and the film may be thereby whitened (bleeding out from film).

[Organic Solvent in Cellulose Acylate Solution]

In the invention, the cellulose acylate film is produced preferably according to a solvent-casting method, in which a cellulose acylate is dissolved in an organic solvent to prepare a solution (dope) and the dope is formed into films. The organic solvent preferably used as the main solvent in the invention is selected from esters, ketones and ethers having from 2 to 12 carbon atoms, and halogenohydrocarbons having from 1 to 7 carbon atoms. Esters, ketones and ethers for use herein may have a cyclic structure. Compounds having any two or more functional groups of esters, ketones and ethers (i.e., —O—, —CO— and —COO—) may also be used herein as the main solvent, and for example, they may have any other functional group such as alcoholic hydroxyl group. The number of the carbon atoms that constitute the main solvent having two or more functional groups may fall within the range the compound having any of those functional groups.

For the cellulose acylate film of the invention, chlorine-based halogenohydrocarbons may be used as the main solvent, or non-chlorine solvents as in Hatsumei Kyokai's Disclosure Bulletin 2001-1745 (pp. 12-16) may also be used as the main solvent. Anyhow, the main solvent is not limitative for the cellulose acylate film of the invention.

In addition, the solvents for the cellulose acylate solution and the film and also methods for dissolution therein are disclosed in the following patent publications, and these are preferred embodiments for use in the invention. For example, they are described in JP-A 2000-95876, 12-95877, 10-324774, 8-152514, 10-330538, 9-95538, 9-95557, 10-235664, 12-63534, 11-21379, 10-182853, 10-278056, 10-279702, 10-323853, 10-237186, 11-60807, 11-152342, 11-292988, 11-60752, 11-60752. These patent publications disclose not only the solvents preferred for cellulose acylate for the invention but also the physical properties of their solutions as well as the substances that may coexist along with them, and these are also preferred embodiments for use in the invention.

[Method for Producing Cellulose Acylate Film]
[Dissolution Step]

Preparing the cellulose acylate solution (dope) in the invention is not specifically defined in point of its dissolution process. It may be prepared at room temperature or may be prepared in a mode of cooling dissolution or high-temperature dissolution or in a mode of their combination. A process comprising a step of preparing the cellulose acylate solution for use in the invention and a subsequent step of concentration and filtration of the solution is described in detail in Hatsumei Kyokai's Disclosure Bulletin 2001-1745 (issued Mar. 15, 2001, by Hatsumei Kyokai), pp. 22-25, and this is preferably employed in the invention.

(Transparency of Dope Solution)

Preferably, the dope transparency of the cellulose acylate solution in the invention is at least 85%, more preferably at least 88%, even more preferably at least 90%. We, the present inventors have confirmed that various additives well dissolve in the cellulose acylate dope solution in the invention. A concrete method for determining the dope transparency is described. A dope solution is put into a glass cell having a size of 1 cm$^2$, and its absorbance at 550 nm is measured with a spectrophotometer (UV-3150 by Shimadzu). The solvent alone is measured as a blank, and the transparency of the cellulose acylate solution is calculated from the ratio of the solution absorbance to the blank absorbance.

[Casting, Drying and Winding Step]

Next, a process of forming a film from the cellulose acylate solution in the invention is described. For the method and the equipment for producing the cellulose acylate film in the invention, herein employable are the solvent-casting method and the solvent-casting equipment heretofore generally used in the art for cellulose triacetate film formation. A dope (cellulose acylate solution) prepared in a dissolver (tank) is once stored in a storage tank, in which the dope is defoamed and is thus finally prepared. From the dope take-out mouth of the tank, the dope is taken out and fed into a pressure die via a metering pressure gear pump capable of feeding it with accuracy, for example, based on the revolution number thereof, and then the dope is uniformly cast onto the endlessly-running cast member of a metal support via the slit of the pressure die, and at a peel point to which the metal support makes nearly one revolution, the still wet dope film (this may be referred to as a web) is peeled from the metal support. While both ends of the thus-obtained web are clipped to ensure its width, the web is conveyed with a tenter and dried, and then further conveyed with rolls in a drier in which the web is completely dried, and thereafter this is wound up around a winder to predetermined width. The combination of the tenter and the drier with rolls may vary depending on the object of the film to be produced. When the essential applications of the cellulose acylate film of the invention are for functional protective films for optical structures in electronic displays or for silver halide photographic materials, then additional coating devices may be fitted to the solvent casting apparatus for producing the film. The additional devices are for further processing the surface of the film by forming thereon a subbing layer, an antistatic layer, an antihalation layer and a protective layer. This is described in detail in Hatsumei Kyokai's Disclosure Bulletin 2001-1745 (issued Mar. 15, 2001, by Hatsumei Kyokai), pp. 25-30. It includes casting (including co-casting), metal support, drying and peeling, and these are preferably employed in the invention.

Preferably, the thickness of the cellulose acylate film of the invention is from 10 to 120 μm, more preferably from 20 to 100 μm, even more preferably from 30 to 90 μm.

[Change in Optical Performance of Film after High-Humidity Treatment]
[Evaluation of Physical Properties of Cellulose Acylate Film]

Concerning a change in the optical performance of the cellulose acylate film of the invention due to an environmental change, it is desirable that the film having been treated at 60° C. and 90% RH for 240 hours shows changes in Re(400), Re(700), Rth(400) and Rth(700) of not more than 15 nm, more preferably not more than 12 nm and more preferably not more than 10 nm.

[Change in Optical Performance of Film after High-Temperature Treatment]

Also, it is desirable that the film having been treated at 80° C. for 240 hours shows changes in Re(400), Re(700), Rth(400) and Rth(700) of not more than 15 nm, more preferably not more than 12 nm and more preferably not more than 10 nm.

[Amount of Vaporized Compound after Heat Treatment of Film]

It is desirable that a Rth-lowering compound and a ΔRth-lowering compound preferably in the invention are vaporized at a ratio of not more than 30%, more preferably not more than 25% and more preferably not more than 20%, after treating the film at 80° C. for 240 hours.

The amount of the compounds evaporated from the film is determined by dissolving the film having been treated at 80° C. for 240 hours and the untreated film in a solvent, detecting the compounds from each sample by high-performance liquid chromatography, and calculating in accordance with the following formula by referring the peak area of the compound as the amount thereof remaining in the film.

Vaporization amount(%)={(amount of compound remaining in untreated sample)−(amount of compound remaining in treated sample)}/(amount of compound remaining in untreated sample)×100

[Glass Transition Temperature Tg of Film]

The glass transition temperature Tg of the cellulose acylate film in the invention falls between 80 and 165° C. From the viewpoint of the heat resistance of the film, Tg preferably falls between 100 and 160° C., more preferably between 110 and 150° C. The glass transition temperature Tg is determined as follows: 10 mg of a sample of the cellulose acylate film of the invention is heated from room temperature up to 200° C. at a heating rate of 5° C./min, and the quantity of heat of the sample is measured with a differential scanning calorimeter (DSC 2910 by T.A. Instrument), and the glass transition temperature Tg of the film is calculated from it.

[Haze of Film]

Preferably, the haze of the cellulose acylate film in the invention falls between 0.01 and 2.0%, more preferably between 0.05 and 1.5%, even more preferably between 0.1 and 1.0%. The film transparency is a matter of importance when the film serves as an optical film. The haze may be determined as follows: A sample of the cellulose acylate film of the invention having a size of 40 mm×80 mm is measured with a haze meter (HGM-2DP by Suga Test Instruments) at 25° C. and 60% RH, according to JIS K-6714.

[Humidity-Dependencies of Re and Rth of Film]

It is preferable that both of the in-plane retardation Re(λ) and the thickness-direction retardation Rth(λ) of the cellulose acylate film of the invention show little changes depending on humidity. More specifically speaking, it is preferable that the difference ΔRth(400) between Rth(400) at 25° C. and 10% RH and Rth(400) at 25° C. and 80% RH (i.e., ΔRth(400)=Rth(400)10% RH-Rth(400)80% RH) ranges from 0 to 50 nm, more preferably from 0 to 40 nm and more preferably from 0 to 35 nm. It is also preferable that ΔRth(700) falls within the same range. It is preferable that the difference ΔRe(400) between Re(400) at 25° C. and 10% RH and Re(400) at 25° C. and 80% RH (i.e., ΔRe(400)=Re(400)10% RH−Re(400)80% RH) ranges from 0 to 10 nm, more preferably from 0 to 5 nm and more preferably from 0 to 2 nm. It is also preferable that ΔRe(700) falls within the same range.

[Equivalent Water Content of Film]

The equivalent water content of the cellulose acylate film in the invention is described. When the film is used as a protective film for polarization films, then the equivalent water content thereof at 25° C. and 80% RH is preferably from 0 to 4%, more preferably from 0.1 to 3.5%, even more preferably from 1 to 3% irrespective of the film thickness, in order not to detract from the adhesiveness of the film to water-soluble polymer such as polyvinyl alcohol. If the equivalent water content is higher than 4%, then it is undesirable since the humidity-dependent retardation of the film may be too great when the film is used as a support for optically-compensatory films.

The water content is determined as follows: A sample of the cellulose acylate film of the invention having a size of 7 mm×35 mm is analyzed with a water content analyzer combined with a sample drier (CA-03, VA-05, both by Mitsubishi Chemical), according to a Karl-Fisher method. The amount of water (g) in the sample thus measured is divided by the weight of the sample (g).

[Moisture Permeability of Film]

Preferably, the moisture permeability of the cellulose acylate film to be used for optically-compensatory sheets of the invention, as determined at a temperature of 60° C. and at a humidity of 95% RH according to JIS Z0288 and converted in terms of a standard film thickness of 80 μm, is from 400 to 2000 g/m²·24 h, more preferably from 500 to 1800 g/m²·24 h, even more preferably from 600 to 1600 g/m²·24 h. If it is over than 2000 g/m²·24 h, then the humidity-dependent absolute values Re and Rth of the film may be significantly higher than 0.5 nm/% RH. In addition, it is also unfavorable when an optically-anisotropic layer is laminated on the cellulose acylate film of the type of the invention to fabricate an optically-compensatory film, since the humidity-dependent absolute values Re and Rth of the sheet may also be significantly higher than 0.5 nm/% RH. When the optically-compensatory sheet or the polarization film of the type is built in liquid-crystal display devices, then it may cause discoloration and viewing angle reduction. On the other hand, if the moisture permeability of the cellulose acylate film is smaller than 400 g/m²·24 h, then the film may interfere with drying of adhesive when it is stuck to both faces of a polarizing film to fabricate a polarization film, or that is, the film may cause adhesion failure in the polarization film.

When the thickness of the cellulose acylate film is larger, then the moisture permeability thereof may be smaller; and when the thickness is smaller, then the moisture permeability may be larger. Accordingly, the moisture permeability of every sample having a different thickness must be determined, as converted in terms of a standard film thickness of 80 μm. Depending on the film thickness thereof, the moisture permeability of the film is determined as follows: Moisture permeability as converted in terms of standard film thickness of 80 μm=(measured moisture permeability)×(measured film thickness μm/80 μm). Regarding the method of measuring the moisture permeability, referred to are the methods described in Physical Properties of Polymer II (Polymer Experimental Lecture 4, Kyoritsu Publishing), pp. 285-297, "Determination of Vapor Permeation (mass method, temperature method, vapor pressure method, adsorption method)". Briefly, a sample of the cellulose acylate film having a size of 70 mmφ is conditioned at 25° C. and 90% RH, and at 60° C. and 95% RH both for 24 hours. Using a permeability tester (KK-709007 by Toyo Seiki), the water content per unit area of the sample is measured (g/m²) according to JIS Z-0208, and the moisture permeability of the sample is calculated as follows: Moisture permeability=weight of conditioned sample−weight of unconditioned sample.

[Dimensional Change of Film]

The dimensional stability of the cellulose acylate film of the invention is preferably as follows: The dimensional change of the film after stored at 60° C. and 90% RH for 24 hours (high-humidity storage), and the dimensional change of the film after stored at 90° C. and 5% RH for 24 hours (high-temperature storage) are both at most 0.5%. More preferably, the dimensional change is at most 0.3%, even more preferably at most 0.15%.

A concrete method for the measurement is described. Two samples of the cellulose acylate film of the invention, having a size of 30 mm×120 mm, are prepared and conditioned at 25° C. and 65% RH for 24 hours. Using an automatic pin gauge (by Shinto Kagaku), holes of 6 mmφ are formed on both sides of the samples each at intervals of 100 mm. The original hole-to-hole distance is L0. One sample is processed at 60° C. and 90% RH for 24 hours, and then the hole-to-hole distance is measured (L1); and the other sample is processed at 90° C. and 5% RH for 24 hours, and the hole-to-hole distance is measured (L2). The minimum gauge limit in every measurement is 1/1000 mm. The dimensional change is determined as follows:

Dimensional change at 60° C. and 90% $RH$(high-humidity storage)={|$L0-L1$|/$L0$}×100.

Dimensional change at 90° C. and 5% $RH$(high-temperature storage)={|$L0-L2$|/$L0$}×100.

[Sound Velocity of Film]

Concerning the sound velocity of the cellulose acylate film of the invention, the absolute value is not specifically restricted. However, it is desirable that the ratio R (VT/VM) of the sound velocity in the transverse direction VT to the sound velocity in the machine direction VM is from 1.05 to 1.50.

It is more preferred that the ratio is from 1.06 to 1.45, more preferably from 1.07 to 1.40. When this ratio exceeds 1.50, curling and optical performance are largely changed in a durability test. The sound velocity is measured in practice by a method which comprises conditioning the film in an atmosphere at 25° C. and 55% RH for 6 hours or longer with the use of a sound velocity measurement device SST-110 (manufactured by NOMURA), measuring the sound velocity in the transverse direction and the sound velocity in the machine direction at 25° C. and 55% RH and then determining the ratio.

[Tensile Modulus of Film]

The tensile modulus in the transverse direction of the cellulose acylate film of the invention ranges from 240 to 600 kgf/mm$^2$ (2.35 GPa to 5.88 GPa), preferably from 250 to 580 kgf/mm$^2$ (2.45 GPa to 5.68 GPa). The tensile modulus in the machine direction of the cellulose acylate film of the invention ranges from 230 to 480 kgf/mm$^2$ (2.25 GPa to 4.70 GPa), preferably from 240 to 470 kgf/mm$^2$ (2.35 GPa to 4.61 GPa). It is desirable that a ratio of the former tensile modulus in the transverse direction to the latter tensile modulus in the machine direction (former/latter) of from 1.17 to 1.40.

The tensile is determined in practice by measuring the stress at a 0.5% elongation at a tensile speed of 10%/min in an atmosphere at 23° C. and 70% RH with the use of a multi-purpose tensile test machine STM T50BP (manufactured by TOYO BALDWIN).

[Storage Modulus of Film]

It is desirable that the storage modulus in the transverse direction and the storage modulus in the machine direction of the cellulose acylate film of the invention are both from 15000 to 80000 kfg/cm$^2$ (1.47 GPa to 7.84 GPa) and a ratio of the former storage modulus in the transverse direction to the latter storage modulus in the machine direction (former/latter) of from 1.15 to 1.80.

It is more preferable that the storage modulus in the transverse direction and the storage modulus in the machine direction are both from 18000 to 75000 kfg/cm$^2$ (1.76 GPa to 7.35 GPa) and a ratio of the former storage modulus in the transverse direction to the latter storage modulus in the machine direction (former/latter) of from 1.16 to 1.60. It is further preferable that the storage modulus in the direction orthogonal to the traveling direction in the film plane and the storage modulus in the traveling direction are both from 20000 to 70000 kfg/cm$^2$ (1.96 GPa to 6.86 GPa) and a ratio of the former storage modulus in the transverse direction to the latter storage modulus in the machine direction (former/latter) of from 1.17 to 1.40.

The storage modulus is determined in practice by measuring the dynamic viscoelasticity while changing temperature.

[Photoelasticity Coefficient of Film]

The photoelasticity coefficient in the transverse direction and the photoelasticity coefficient in the machine direction of cellulose acylate film of the invention are both preferably not more than $25\times10^{-13}$ cm$^2$/dyne($2.5\times10^{-13}$N/m$^2$). The ratio of the former coefficient of photoelasticity in the transverse direction to the coefficient of photoelasticity in the machine direction (former/latter) is preferably from 0.60 to 0.97.

It is more preferable that the coefficient of photoelasticity in the direction orthogonal to the traveling direction in the film plane and the coefficient of photoelasticity in the traveling direction are both not more than $22\times10^{-13}$ cm$^2$/dyne($2.2\times10^{-13}$N/m$^2$) and a ratio of the former coefficient of photoelasticity in the transverse direction to the latter coefficient of photoelasticity in the machine direction (former/latter) of from 0.65 to 0.96.

It is more preferable that the coefficient of photoelasticity in the direction orthogonal to the traveling direction in the film plane and the coefficient of photoelasticity in the traveling direction are both not more than $20\times10^{-13}$ cm$^2$/dyne($2.0\times10^{-13}$N/m$^2$) and a ratio of the former coefficient of photoelasticity in the transverse direction to the latter coefficient of photoelasticity in the machine direction (former/latter) of from 0.70 to 0.95.

The coefficient of photoelasticity is measured in practice by applying a tensile stress in the transverse direction or the machine direction to a film sample (12 mm×120 mm) and measuring the retardation with an ellipsometer (M150 manufactured by JASCO ENGINEERING). Then the coefficient of photoelasticity is calculated based on the change in retardation due to the stress.

[In-Plane Retardation Change Before and after Stretching and Detection of Slow Axis]

From a film band, a sample (100 mm in machine direction× 100 mm in transverse direction) is cut out and stretched in parallel to the machine direction (MD) or to the transverse direction (TD) with the use of a fixed monoaxial stretching machine at a temperature of 140° C. The in-plane retardation Re of each sample is measured before and after the stretching with the use of by an automatic birefringence analyzer (KOBRA-21ADH, manufactured by Oji Science Instruments). Slow axis is determined based on the orientation angle obtained in the retardation measurement as described above. It is preferred that a cellulose acylate film to be provided immediately close to a polarization film shows a small change in Re due to stretching. More specifically speaking, it is preferable that the film shows |Re(n)−Re(0)|/n≤1.0 or less and more preferably |Re(n)−Re(0)|n≤0.3 or less, wherein Re(n) means the in-plane retardation (nm) of the film having been stretched by n(%), while Re(0) means the in-plane retardation (nm) of the unstretched film.

[Direction Having Slow Axis]

In the case of using the cellulose acylate film of the invention as a polarization film-protecting film, the polarization film has an absorption axis in the machine direction (MD) and thus it is preferable that the cellulose acylate film has a slow axis in the direction close to the MD or close to the TD. By locating the slow axis in parallel or orthogonal to the polarization film, light-leakage or color change can be lessened. The term "close to" means that the angle between the slow axis and MD or TD is from 0 to 10°, preferably from 0 to 5°.

[Cellulose Acylate Film Having Positive Intrinsic Birefringence]

The cellulose acylate film of the invention shows an increase in the in-plane retardation Re when stretched in the direction having the slow axis in plane, while it shows a decrease in the in-plane retardation Re when stretched in the direction orthogonal to the direction having the slow axis. These facts indicate that this film has a positive intrinsic birefringence. To eliminate Re exhibited in the film, it is effective to stretch the film in the direction orthogonal to the slow axis. This may be achieved by, for example, lowering the in-plane retardation Re by tenter stretching in the direction orthogonal to MD (i.e., TD) in the case where the film has the slow axis in MD. In the case where the film has the slow axis in TD, on the contrary, it may be suggested to lower the in-plane retardation Re by stretching the film while enhancing the tension of a traveling roll in parallel to the MD.

The physical properties as described above can be established each by appropriately controlling the orientation treatment conditions in the stretching treatment, the shrinking treatment, etc. as will be discussed hereinafter.

[Method of Evaluating the Cellulose Acylate Film of the Invention]

The cellulose acylate film of the invention is evaluated by using the following measurement methods.

(In-Plane Retardation Value Re and Thickness-Direction Retardation Value Rth)

$Re(\lambda)$ is measured by the incidence of a ray of $\lambda$ nm in wavelength in the normal direction with the use of an automatic double refractometer KOBRA 21 ADH (manufactured by OJI KEISOKU KIKI). $Rth(\lambda)$ is calculated with KOBRA 21 ADH based on three retardation values measured in three directions, i.e., $Re(\lambda)$ as described above, a retardation value measured by the incidence of a ray of $\lambda$ nm in wavelength in a direction inclining at +40° to the normal direction of the film using the slow axis in the plane as the incline angle and a retardation value measured by the incidence of a ray of $\lambda$ nm in wavelength in a direction inclining at −40° to the normal direction of the film using the slow axis in the plane as the incline angle and a presumptive average refractive index and the film thickness. As the presumptive average refractive index, use can be made of values listed in POLYMER HANDBOOK (JOHN WILEY & SONS, INC) and various optical film catalogs. In the case where the presumptive average refractive index is unknown, it can be measured with the use of an Abbe refractometer. The presumptive average refractive indexes of major optical films are as follows: cellulose acylate (1.48), cycloolefin polymer (1.52), polycarbonate (1.59), polymethyl methacrylate (1.49) and polystyrene (1.59). By inputting such an presumptive average refractive index and a film thickness, nx, ny and nz can be calculated with KOBRA 21 ADH.

(Transmittance)

By using a transparency meter (AKA phototube chronometer, manufactured by KOTAKI SEISAKUSHO), the visible light (615 nm) transmittance of a sample (20 mm×70 mm) is measured at 25° C. and 60% RH.

[Surface Property of Film]

(Surface Shape)

The surface property of the cellulose acylate film of the invention is described. Preferably, the arithmetic mean roughness (Ra) of the surface roughness of the film, according to JIS B0601-1994, is at most 0.1 µm, and the maximum height (Ry) thereof is at most 0.5 µm. More preferably, the arithmetic mean roughness (Ra) is at most 0.05 µm, and the maximum height (Ry) is at most 0.2 µm. The profile of the recesses and the projections of the film surface may be analyzed with an atomic force microscope (AFM).

(Surface Energy)

The surface energy of the cellulose acylate film of the invention is measured as follows: A sample of the film is put on a horizontal bed horizontally thereto, and a predetermined amount of water and methylene iodide are applied onto the surface of the sample. After a predetermined period of time, the contact angle of the film surface with water and with methylene iodide is measured. From the data of the thus-measured contact angle, the surface energy of the sample is derived according to an Owens method.

[In-Plane Retardation Scattering of Cellulose Acylate Film]

It is desirable that the cellulose acylate film of the invention satisfies the following formulae.

$$|Re(\text{Max})-Re(\text{MIN})|\leq 3 \text{ and } |Rt(\text{MAX})-Rth(\text{MIN})|\leq 5$$

wherein Re(MAX) and Rth(MAX) mean each the maximum retardation of a film piece (1 m×1 m) cut out at random, while Re(MIN) and Rth(MIN) mean each the minimum retardation thereof.

[Additive Retentiveness in Film]

The cellulose acylate film of the invention is required to well retain various compounds added thereto. Concretely, when the cellulose acylate film is stored at 80° C. and 90% RH for 48 hours, the mass change of the film is preferably from 0 to 5%, more preferably from 0 to 3%, even more preferably from 0 to 2%.

<Method of Evaluation of Additive Retentiveness in Film>

A sample is cut into a size of 10 cm×10 cm, and stored at 23° C. and 55% RH for 24 hours, and its mass is measured. Then, this is stored at 80±5° C. and 90±10% RH for 48 hours. After processed, the surface of the sample is gently wiped, and then further stored at 23° C. and 55% RH for 1 day, and the mass of the sample is again measured. The additive retentiveness in the sample is calculated as follows:

Additive Retentiveness(mass %)=

{(mass before storage−mass after storage)/(mass before storage)}×100.

[Mechanical Characteristics of Film]

(Curl)

The curl value in the width direction of the cellulose acylate film of the invention is preferably from −10/m to +10/m. The cellulose acylate film is subjected to surface treatment as will be mentioned hereinunder, or rubbed before coated with an optically-anisotropic layer, or coated or laminated with an orientation layer or an optically-anisotropic layer. For these treatments, the film is processed while it is a long film. If the curl value of the long, cellulose acylate film in the width direction thereof falls outside the scope as above, then the film may be difficult to handle and it may be cut or broken. If so, in addition, the edges and the center part of the film may be strongly contacted with conveyor rolls to give dust, and, as a result, much impurity may deposit on the film. In that condition, the frequency of spot defects and coating streaks may be over the acceptable level. In addition, when the curl value is controlled to fall within the defined range, then it is favorable since a trouble of color mottles that may often occur when coated with an optically-anisotropic layer may be reduced, and, in addition, the film may be prevented from catching bubbles when laminated with a polarizing film.

The curl value may be determined according to the method defined by the American National Standard Institute (ANSI/ASCPH1.29-1985).

(Tear Strength)

Preferably, the cellulose acylate film of the invention having a thickness of from 20 to 80 µm has a tear strength of at least 2 g, measured according to the tear test method of JISK7128-2:1998 (Elmendorf tear test method), more preferably from 5 to 25 g, even more preferably from 6 to 25 g. Also preferably, the tear strength of the film having a thickness of 60 µm is at least 8 g, more preferably from 8 to 15 g. Concretely, a sample piece having a size of 50 mm×64 mm is conditioned at 25° C. and 65% RH, and then tested with a light load tear strength tester to measure its tear strength.

[Solvent Remaining in Film]

It is desirable that the cellulose acylate film of the invention is dried under the condition under which the solvent amount remaining in the film could be from 0.01 to 1.5% by mass, more preferably from 0.01 to 1.0% by mass. The solvent amount to remain in the transparent support for use in the invention is controlled to at most 1.5%, whereby the film curling may be reduced. More preferably, it is at most 1.0%. The essential reason for it may be because, since the solvent amount to remain in the film formed according to the above-mentioned solvent casting method is reduced, the free volume of the film could be reduced.

[Moisture-Absorbing Expansion Coefficient of Film]

Preferably, the moisture-absorbing expansion coefficient of the cellulose acylate film of the invention is at most $30\times10^{-5}$/% RH, more preferably at most $15\times10^{-5}$/% RH, even more preferably at most $10\times10^{-5}$/% RH. The moisture-absorbing expansion coefficient of the film is preferably smaller, but in general, it may be at least $1.0\times10^{-5}$/% RH. The moisture-absorbing expansion coefficient means the change of the length of a sample when the relative humidity around the sample is changed at a constant temperature. When the moisture-absorbing expansion coefficient is controlled as above and when the cellulose acylate film of the invention is used as a support for optically-compensatory films, then frame-like transmittance increase, or that is, strain-caused light leakage can be prevented while the optically-compensatory function of the optically-compensatory films is kept as such.

[Functional Layer]

The applications of the cellulose acylate film of the invention include optical applications and photographic materials. The optical applications of the film are especially preferably for liquid-crystal display devices, more preferably those that comprise a liquid-crystal cell carrying liquid crystal between two electrode substrates, two polarization films disposed on both sides thereof, and at least one optically-compensatory sheet disposed between the liquid-crystal cell and the polarization film. For the liquid-crystal display devices, preferred are TN, IPS, FLC, AFLC, OCB, STN, ECB, VA and HAN. Particularly, IPS and VA are preferred.

When the cellulose acylate film of the invention is used for these optical applications, various functional layers may be added to it. The layers are, for example, antistatic layer, cured resin layer (transparent hard coat layer), antireflection layer, easily-adhesive layer, antiglare layer, optically-compensatory layer, orientation layer, liquid-crystal layer. These functional layers and their materials that may be used for the cellulose acylate film of the invention include surfactant, lubricant, mat agent, antistatic layer and hard coat layer, and they are described in detail in Hatsumei Kyokai's Disclosure Bulletin 2001-1745 (issued Mar. 15, 2001, by Hatsumei Kyokai), pp. 32-45, and are preferably used also in the invention.

[Usage (Polarizing Plate)]

Next, the usage of the cellulose acylate film of the invention will be described.

The cellulose acylate film of the invention is particularly useful as a protective film for polarizing plates. A polarizing plate is composed of a polarization film and protecting films protecting both faces thereof. It further has a protect film on one face of the polarizing plate and a separate film on the opposite face. The protect film and the separate film are employed in order to protect the polarizing plate during shipment, product inspection and other steps. In this case, the protective film, which aims at protecting the surface of the polarizing plate, is bonded to the face opposite to the face to be bonded to a liquid crystal plate. On the other hand, the separate film, which aims at covering the adhesive layer to be bonded to the liquid crystal plate, is bonded to the face of the polarizing plate to be bonded to the liquid crystal face. As the protect film, use may be made of the cellulose acylate film of the invention.

As the polarization film, it is preferred to employ a coating type polarization film typified by products of OPTIVA or a polarization film comprising a binder with iodine or a dichroic dye.

In a polarization film, iodine and a dichroic dye are oriented in a binder to exhibit polarization performance. It is preferable that iodine and the dichroic dye are oriented along a binder molecule or the dichroic dye is oriented in a single direction through self-organization as in liquid crystals.

Polarization films commonly employed in these days are usually produced by dipping a stretched polymer in a solution of iodine or a dichroic dye contained in a tank so as to allow iodine or the dichroic dye to penetrate into a binder. In a polarization film commonly employed, iodine or a dichroic dye is distributed in a depth of 4 μm (i.e., 8 μm in total in both sides) from the surface. To establish a sufficient polarization performance, a thickness of at least 10 μm is required. The penetration degree can be regulated by appropriately controlling the concentration of the solution of iodine or the dichroic dye, the tank temperature and the dipping time.

The binder of the polarization film may be crosslinked. As a crosslinked binder, it is possible to use a polymer crosslinkable per se. Due to light, heat or pH change, a polymer having a functional group or a binder obtained by introducing a functional group into a polymer undergoes a crosslinkage reaction among the molecules thereof and thus a polarization film can be formed.

Alternatively, a crosslinked structure may be introduced into a polymer by using a crosslinking agent. By using a crosslinking agent which is a highly reactive compound, a linking group originating in the crosslinking group is introduced into binder molecules. Thus, a crosslinked structure can be formed among the binder molecules.

Crosslinkage is generally performed by coating a coating solution containing a polymer or a mixture of a polymer with a crosslinking agent on a transparent support and then heating. Since it is sufficient that the durability is ensured in the step of providing a final product, the crosslinkage treatment may be carried out at any step for constructing the polarizing plate as the final product.

As the binder of the polarization film, it is possible to use any of polymers crosslinkable per se or polymers capable of undergoing crosslinkage by using a crosslinking agent. Examples of the polymers include polymethyl methacrylate, polyacrylic acid, polymethacrylic acid, polystyrene, gelatin, polyvinyl alcohol, denatured polyvinyl alcohol, poly(N-methylolacrylamide), polyvinyltoluene, chlorosulfonated polyethylene, nitrocellulose, chlorinated polyolefins (for example, polyvinyl chloride), polyester, polyimide, polyvinyl acetate, polyethylene, carboxymethylcellulose, polypropylene, polycarbonate and copolymers thereof (for example, acrylic acid/methacrylic acid copolymer, styrene/maleimide copolymer, styrene/vinyltoluene copolymer, vinyl acetate/vinyl chloride copolymer, ethylene/vinyl acetate copolymer). It is preferable to use water-soluble polymers (for example, poly(N-methylolacrylamide), carboxymethylcellulose, gelatin, polyvinyl alcohol and denatured polyvinyl alcohol), gelatin, polyvinyl alcohol and denatured polyvinyl alcohol are more preferable and polyvinyl alcohol and denatured polyvinyl alcohol are most preferable.

The saponification degrees of polyvinyl alcohol and denatured polyvinyl alcohol preferably ranges from 70 to 100%, more preferably from 80 to 100% and most preferably from 95 to 100%. The polymerization degree of polyvinyl alcohol preferably ranges from 100 to 5000.

A denatured polyvinyl alcohol is obtained by introducing a denaturing group into polyvinyl alcohol by copolymerization denaturing, chain-transfer denaturing or block polymerization denaturing. In the copolymerization denaturing, it is possible to introduce, as a denaturing group, COONa, $Si(OH)_3$, $N(CH_3)_3Cl$, $C_9H_{19}COO$, $SO_3Na$ or $C_{12}H_{25}$. In the chain transfer denaturing, it is possible to introduce, as a denaturing group, COONa, SH or $SC_{12}H_{25}$. The polymerization degree of denatured polyvinyl alcohol preferably ranges from 100 to 3000. Denatured polyvinyl alcohols are described in JP-A-8-338913, JP-A-9-152509 and JP-A-9-316127.

It is especially preferred to use undenatured polyvinyl alcohol and alkylthio-denatured polyvinyl alcohol having a saponification degree of 85 to 95%.

Use may be made of a combination of two or more of polyvinyl alcohols and denatured polyvinyl alcohols.

By adding a crosslinking agent for the binder in a large amount, the moisture/heat resistance of the polarization film can be improved. In the case where the crosslinking agent is added in an amount of 50% by mass or more based on the binder, however, the orientation properties of iodine or a dichroic dye are worsened. It is preferable to add the crosslinking agent in an amount of from 0.1 to 20% by mass, more preferably from 0.5 to 15% by mass, based on the binder.

After the completion of the crosslinkage, the binder still contains the unreacted crosslinking agent in a certain amount. However, it is preferable that the amount of the crosslinking agent remaining in the binder is not more than 1.0% by mass, more preferably not more than 0.5% by mass. In the case where the binder layer contains more than 1.0% by mass of the crosslinking agent, there sometimes arises a problem in durability. That is to say, in the case where a polarization film having a large amount of a crosslinking agent remaining therein is applied to a liquid-crystal display device which is then operated over a long time or allowed to stand in an atmosphere at a high temperature and a high humidity over a long time, the polarization degree is lowered in some cases. Crosslinking agents are described in U.S. Reissue Pat. No. 23,297. Moreover, it is also possible to use boron compounds (for example, boric acid and borax) as the crosslinking agent.

As the dichroic dye, use can be made of azo-based dyes, stilbene based dyes, pyrazolone based dyes, triphenyl-methane based dyes, quinoline based dyes, oxazine based dyes, thiazine based dyes or anthraquinone based dyes. It is preferable that the dichroic dye is soluble in water. It is also preferable that the dichroic dye has a hydrophilic substituent (for example, sulfo, amino or hydroxyl). Examples of the dichroic dye include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59 and C.I. Acid Red 37. Dichroic dyes are described in JP-A-1-161202, JP-A-1-172906, JP-A-1-172907, JP-A-1-183602, JP-A-1-248105, JP-A-1-265205 and JP-A-7-261024. The dichroic dye is employed in the form of a free acid, an alkali metal salt, an ammonium salt or an amine salt, By blending dichroic dye of two or more types, polarization films having various color hues can be produced. It is preferable to use a polarization film having a compound (a dye) showing a black color or a polarization film or a polarizing plate wherein multiple dichroic molecules are blended so as to show a black color when two polarization axes are orthogonalized, since such a polarization film is excellent in single plate transmittance and polarizing ratio.

(Constitution of Liquid Crystal Display Device)

In a common liquid-crystal display device, a liquid-crystal cell is provided between a pair of polarizing plates. A protecting film with the use of the cellulose acylate film of the invention may be provided at any part to give excellent display performance. Since a protecting film for the outermost face of the polarizing plate in the display side of a liquid-crystal display device has a transparent hard coat layer, an antiglare layer, an antireflection layer, etc., it is particularly preferable to use the above protecting film in this part.

To use the cellulose acylate film of the invention as a polarization film-protecting film (a polarizing plate-protecting film) in constructing the polarizing plate of the invention, it is necessary to achieve favorable adhesiveness between the surface in the side to be bonded to the polarization film and the polarization film comprising polyvinyl alcohol as the main component. When the adhesiveness is insufficient, there arise some problems, for example, the workability of the polarizing plate in using a panel of a liquid-crystal display device or the like becomes poor or the durability is insufficient, thereby inducing some troubles such as peeling in prolonged use. For the adhesion, use may be made of a pressure-sensitive adhesive. As the pressure-sensitive adhesive, use can be made of, for example, polyvinyl alcohol based pressure-sensitive adhesives containing polyvinyl alcohol or polyvinyl butyral, and vinyl based latexes containing butyl acrylate, etc. The adhesiveness may be considered by using surface energy as an indication. In the case where the surface energy of polyvinyl alcohol serving as the main component of the polarization film or the pressure-sensitive layer comprising a pressure-sensitive agent containing polyvinyl alcohol or vinyl based latex as the main component is close to the surface energy of the protecting film to be bonded thereto, the bonding properties as well as the workability and durability of the polarizing plate thus bonded can be improved. These facts indicate that a sufficient adhesiveness to the polarization film comprising polyvinyl alcohol as the main component can be obtained by controlling the surface energy in the side to be bonded to the polarization film or the pressure-sensitive adhesive layer within a desired range by a surface treatment such as hydrophilication.

Since the cellulose acylate film of the invention usually contains additives such as a compound capable of lowering optical anisotropy and a wavelength dispersion regulator, the film face becomes more hydrophobic. It is therefore needed to improve the bonding properties by the above-described hydrophilication to impart favorable workability and durability to the polarizing plate.

Due to the addition of the additives as described above, the film after the film formation has a hydrophobic nature before the surface treatment such as hydrophilication. From the viewpoints of the humidity-dependence of the optical characteristics or mechanical characteristics of the film and easiness in the treatment for improving the bonding properties as discussed above, it is preferable that the surface energy of the film is 30 mN/m or more but not more than 50 mN/m, more preferably 40 mN/m or more but not more than 48 mN/m. In the case where the surface energy before the treatment is less than 30 mN/m, much energy is needed to achieve favorable bonding properties by the hydrophilication as will be described hereinafter. In this case, as a result, the film properties are worsened or the favorable properties and a high productivity can be hardly established at the same time. When the surface energy before the treatment exceeds 50 mN/m, the hydrophilic nature of the film per se becomes too high and, in its turn, the optical performance and mechanical properties of the film excessively depend on humidity to thereby cause some problems.

The surface energy of polyvinyl alcohol face ranges from 60 mN/m to 80 mN/m, though it varies depending on the additives to be used together, the extent of drying and the pressure-sensitive additive employed. Thus, it is preferable that the surface energy of the face of the film of the invention in the side to be bonded to the polarization film after the surface treatment such as hydrophilication is 50 mN/m or more but not more than 80 mN/m, more preferably 60 mN/m or more but not more than 75 mN/m and more preferably 65 mN/m or more but not more than 75 mN/m.

[Surface Treatment such as Hydrophilication]

The hydrophilication of the film face of the invention can be carried out by a publicly known method. For example, the film face can be modified by corona discharge treatment, glow discharge treatment, ultraviolet irradiation treatment, flame treatment and acid- or alkali-treatment. The glow discharge treatment as used herein may be either low-temperature plasma treatment under a low gas pressure of $10^{-3}$ to 20 Torr (0.133 to 2660 Pa) or plasma treatment under atmospheric pressure. Examples of a plasma excitation gas, which is a gas plasma excited under the above conditions, include argon, helium, neon, krypton, xenon, nitrogen, carbon dioxide, chlorofluorocarbons such as tetrafluoromethane and mixtures thereof. These gases which are described in detail in Japan Institute of Invention and Innovation Journal of Technical Disclosure No. 2001-1745 (2001.03.15, Japan Institute of Invention and Innovation), p. 30 to 32 are preferably usable in the invention.

[Alkali Saponification Treatment]

Among these methods, alkali saponification treatment is especially preferred and highly effective for the surface treatment of the cellulose acylate film. The treatment can be carried out by the following methods.

(1) Dipping Method

This method comprises dipping a film in an alkali solution under appropriate conditions to thereby saponify all of the faces in the entire film surface reactive with the alkali. Because of needing no special apparatus, this method is preferable from the viewpoint of cost. As the alkali solution, an aqueous sodium hydroxide solution may be preferably employed. The concentration thereof preferably ranges from 0.5 to 3 mol/l, especially preferably from 1 to 2 mol/l. The alkali solution temperature is preferably from 25 to 70° C., especially preferably from 30 to 60° C.

After dipping in the alkali solution, it is preferable to sufficiently wash the film with water or neutralize the alkali component by dipping the film in a dilute acid so that no alkali component remains in the film.

Due to the saponifying treatment, both film faces become hydrophilic. The polarizing plate-protecting film is used in such a manner that the hydrophilicated face is in contact with the polarization film.

The hydrophilicated face is effective in improving the adhesiveness to the polarization film comprising polyvinyl alcohol as the main component.

In the case where the protective film has an antireflection layer, on the other hand, the main face thereof is also damaged by the alkali. It is therefore important to employ the necessary and minimum conditions for the reaction. When the contact angle to water of the main face in the opposite side of the support is employed as an indication of the damage of the antireflection layer by the alkali, it preferably ranges from 20° to 50°, more preferably from 30° to 50° and more preferably from 40° to 50° particularly in the case where the support is cellulose triacetate. So long as it falls within this range, favorable adhesiveness to the polarization film can be maintained without practically damaging the antireflection film.

(2) Coating Method with Alkali Solution

For preventing the antireflection film from being damaged in the above-mentioned dipping method, preferably used is a method of coating the film with an alkali solution by applying an alkali solution to the main surface alone of the polymer film opposite to the main surface thereof having an antireflection film thereon, then heating it, washing it with water and drying it. The details of the alkali solution and the treatment with it are described in JP-A 2002-82226 and pamphlet of Laid-Open No. 2002/46809. However, the method requires additional equipment and step for coating the film with alkali solution, and is therefore inferior to the above-mentioned dipping method (1) in point of its cost.

[Plasma Treatment]

The plasma treatment employable in the invention includes vacuum glow discharge treatment and atmospheric pressure glow discharge treatment, as well as flame plasma treatment. These are described, for example, in JP-A 6-123062, 11-293011 and 11-5857, which are applicable to the invention.

According to the plasma treatment, the surface of a plastic film is treated in plasma and thus the treated surface can be highly hydrophilicated. For example, in a glow-discharge plasma generation device, the film to be hydrophilicated is put between a pair of facing electrodes, and a plasma-excitable vapor is introduced into the device. Then, a high-frequency voltage is applied to the electrodes, whereby the vapor is excited by the generated plasma and glow discharge is effected between the electrodes for attaining the intended surface treatment. In particular, atmospheric glow discharge treatment is preferred.

[Corona Discharge Treatment]

For the surface treatment, corona discharge treatment is the most popular method, and it may be attained by any known method, for example, as in JP-B 48-5043 and 47-51905, JP-A 47-28067, 49-83767, 51-41770 and 51-131576. The corona generator for use in the corona treatment may be any commercially-available corona processor generally employed in the current art for surface modification of plastic films. In particular, a corona processor equipped with multi-knife electrodes by Softal comprises a large number of electrodes and is so designed that air is fed between the electrodes. This is effective for preventing overheating of films and for removing low-molecular substances that may deposit on films, and therefore its energy efficiency is extremely high and it enables high-efficiency corona treatment. Accordingly, the corona processor of the type is especially useful in the invention.

When the polymer film of the invention is used as a protective film for polarizing plates, then the surface energy of at least one surface of the polymer film must be controlled to fall with a suitable range. For this, the above-mentioned surface treatment of the film is effected. On the other hand, when the polymer film of the invention is subjected to such surface treatment, then there may be a possibility of vaporization/dissolution/decomposition of the additives in the polymer film, whereby the optical characteristics and the film properties of the polymer film as well as the durability thereof may worsen or lower. In the case where the additives vaporize or dissolve, then they may contaminate the processing system and may therefore lower the workability of the system, and, after all, continuous treatment would be impossible. Accordingly, the reduction in the amount of the additives in the film must be inhibited. Concretely, it is desirable that the change of the additive amount through the surface treatment is at most 0.2% of the overall amount of the additives, more preferably at most 0.1%, even more preferably at most 0.01%.

[Use (Optically-Compensatory Film)]

The polymer film of the invention has many applications. When it is used for an optically-compensatory film in liquid-crystal display devices, it is especially effective. An optically-compensatory film is generally used in liquid-crystal display devices, and this is an optical member for compensating retardation. The optically-compensatory film has the same meaning as that of a phase retarder and an optically-compensatory sheet. The optically-compensatory film has a property of birefringence, and it is used for the purpose of removing coloration of display panels of liquid-crystal display devices and for improving the viewing angle characteristics of the devices. The polymer film of the invention has a small optical anisotropy in such that its Re(630) and Rth(630) satisfy $0 \leq Re \leq 10$ nm and $|Rth(630)| \leq 25$ nm; and it has a reduced wavelength-dependent anisotropy distribution in such that $|Re(400)-Re(700)| \leq 10$ and $|Rth(400)-Rth(700)| \leq 35$. Accordingly, the film does not have any superfluous anisotropy. When the film is combined with an optically-anisotropic layer having a birefringence, then it may exhibit the optical characteristics of the optically-anisotropic layer.

Accordingly, when the polymer film of the invention is used as an optically-compensatory film in liquid-crystal display devices, Re(630) and Rth(630) of the optically-anisotropic layer combined with it are preferably as follows: Re(630)=0 to 200 nm; and $|Rth(630)|=0$ to 400 nm. Within these ranges, any and every optically-anisotropic layer may be combined with the film of the invention. Specifically, the film of the invention may be combined with an optically-anisotropic layer of any type required in optically-compensatory films, not limited by the optical characteristics and the driving system of the liquid-crystal cell in the liquid-crystal display device in which the film is to be used. The optically-anisotropic layer to be combined with the film may be formed of a composition containing a liquid-crystal compound, or may be formed of a polymer film having a property of birefringence.

The liquid-crystal compound is preferably a discotic liquid-crystal compound or a rod-shaped liquid-crystal compound.

(Discotic Liquid-Crystal Compound)

Examples of the discotic liquid-crystal compound usable in the invention are described in various references (C. Destrade et al., *Mol. Cryst. Liq. Cryst.*, Vol. 71, p. 111 (1981); *Quarterly Journal of Outline of Chemistry*, by the Chemical Society of Japan, No. 22, Chemistry of Liquid Crystal, Chap. 10, Sec. 2 (1994); B. Kohne et al., *Angew. Chem. Soc. Chem. Comm.*, p. 1794 (1985); J. Zhang et al., *J. Am. Chem. Soc.*, Vol. 116, p. 2655 (1994)).

Preferably, the discotic liquid-crystal molecules are fixed as aligned in the optically-anisotropic layer in the invention, most preferably fixed therein through polymerization. The polymerization of discotic liquid-crystal molecules is described in JP-A 8-27284. For fixing discotic liquid-crystal molecules through polymerization, a polymerizable group must be bonded to the disc core of each discotic liquid-crystal molecule as a substituent thereto. However, if such a polymerizable group is directly bonded to the disc core, then the molecules could hardly keep their orientation during polymerization. Accordingly, a linking group is introduced between the disc core and the polymerizable group to be bonded thereto. Such polymerizable group-having discotic liquid-crystal molecules are disclosed in JP-A 2001-4387.

(Rod-Shaped Liquid-Crystal Compound)

Examples of the rod-shaped liquid-crystal compound usable in the invention are azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans, and alkenylcyclohexylbenzonitriles. Not only such low-molecular liquid-crystal compounds, but also high-molecular liquid-crystal compounds may also be usable herein.

In the optically-anisotropic layer, it is desirable that the rod-shaped liquid-crystal molecules are fixed in an aligned state, most preferably they are fixed through polymerization. Examples of the polymerizable rod-shaped liquid-crystal compound usable in the invention are described in *Macromol. Chem.*, Vol. 190, p. 2255 (1989); *Advanced Materials*, Vol. 5, p. 107 (1993); U.S. Pat. Nos. 4,683,327, 5,622,648, 5,770, 107; pamphlets of International Laid-Open Nos. 95/22586, 95/24455, 97/00600, 98/23580, 98/52905; JP-A 1-272551, 6-16616, 7-110469, 11-80081, 2001-328973.

(Optically-Anisotropic Layer of Polymer Film)

The optically-anisotropic layer may be formed of a polymer film. The polymer film is formed from a polymer capable of expressing optical anisotropy. Examples of the polymer are polyolefin (e.g., polyethylene, polypropylene and norbornene-based polymer), polycarbonate, polyarylate, polysulfone, polyvinyl alcohol, polymethacrylate, polyacrylate and cellulose ester (e.g., cellulose triacetate and cellulose diacetate). Copolymers or mixtures of these polymers may also be usable herein.

The optical anisotropy of the polymer film is preferably generated by an extension treatment such as stretching. The stretching is preferably monoaxial stretching or biaxial stretching. Concretely, preferred is machine-direction monoaxial stretching to be attained by utilizing the peripheral speed difference between two or more rolls; or tenter stretching to be attained by clipping both sides of a polymer film and stretching it in the width direction; or biaxial stretching comprising a combination of these. From the viewpoint of the productivity of polarizing plates as will be described hereinafter, tenter stretching or biaxial stretching is preferred. If desired, two or more polymer films may be used so that the overall optical characteristics of these two or more films may satisfy the above-mentioned conditions. Preferably, the polymer film is produced according to a solvent casting method in order that the birefringence unevenness of the film is reduced as much as possible. Preferably, the thickness of the polymer film falls between 20 and 500 µm, most preferably between 40 and 100 µm.

[Formation of Optically-Anisotropic Layer by Applying Polymer]

In the invention, the optically-anisotropic layer is formed by spreading a polymer having been liquefied in a solvent on the polymer film of the invention, drying it, and then carrying out an orientation treatment on the layered matter thus obtained to give an optically-compensatory film having desired optical characteristics imparted thereto. As the molecular orientation treatment, a stretching treatment, a shrinking treatment and both of them may be cited. From the viewpoints of the productivity and easiness in controlling, the stretching treatment is preferable. In this case, the polymer film of the invention would show a low optical anisotropy after the molecular orientation treatment and, therefore, a uniformly stretched film can be formed. Thus, the optically compensatory effect by the optically anisotropic layer is not affected, thereby facilitating optical design and the like.

The polymer as described above is not particularly restricted and one or more polymers having appropriate light transmission properties may be employed. It is preferable to use a polymer capable of forming a film with favorable light transmission properties, i.e., having a light transmittance of 75% or more, still preferably 85% or more. Considering stable mass productivity of the film, it is preferable to use a solid polymer showing positive birefringence and thus giving a large retardation in the stretching direction.

Examples of the above-described solid polymer include polyamide, polyimide and polyester (see, for example, International Patent Publication No. 508048/1998), polyimide (see, for example, International Patent Publication No. 2000-511296), polyether ketone, in particular, polyaryl ether ketone (JP-A-2001-49110), polyamide imide (see, for example, JP-A-61-162512), polyester imide (see, for example, JP-A-64-38472) and so on. To form a birefringent film, use can be made of one of these solid polymers or a mixture of two or more thereof. Although the molecular weight of the solid polymer is not particularly restricted, it is generally favorable from the viewpoint of, for example, handling properties in film formation that the mass-average molecular weight thereof is from 2000 to 1000000, still preferably from 1500 to 750000 and still preferably from 1000 to 500000.

In forming the polymer film, various additives such as a stabilizer, a plasticizer or metals may be added, if necessary. The solid polymer can be liquefied by an appropriate method, for example, melting a thermoplastic solid polymer by heating or dissolving a solid polymer in a solvent to give a solution.

The polymer spread on the polymer film (the spread layer) can be fixed by cooling the spared layer (in the former case of using the molten liquid) or removing the solvent from the spread layer and drying (in the latter case of using the solution). Drying can be performed by appropriately employing one or more methods from among spontaneous drying (air-drying), thermal drying (in particular, thermal drying at 40 to 200° C.), reduced-pressure drying and so on. From the viewpoints of the production efficiency and prevention of the occurrence of optical anisotropy, it is favorable to employ the method of applying a polymer solution.

As the solvent as described above, use can be made of one or more members appropriately selected from among methylene chloride, cyclohexanone, trichloroethylene, tetrachloroethane, N-methylpyrrolidone, tetrahydrofuran, etc. Taking the viscosity appropriate for the film formation into consideration, the solution is preferably prepared by dissolving form 2 to 100 parts by mass, more preferably from 5 to 50 parts by mass and more preferably from 10 to 40 parts by mass, of the solid polymer in 100 parts by mass of the solvent.

The liquefied polymer may be spread by using an appropriate film-forming method such as spin coating, roll coating, flow coating, printing, dip coating, cast film-forming, casting such as bar coating and gravure printing, extruding and so on. From the viewpoint of the mass production of a film having little irregularities in thickness and orientation, it is preferable to employ a solution film-forming method such as the casting method. It is especially preferred to layer the liquefied polymer dissolved in the solvent on a polymer film by the co-casting method and form a film. In such a case, it is favorable to use a polyimide which is prepared from an aromatic dianhydride and an aromatic polydiamine and soluble in a solvent (International Patent Publication No. 511812/1996).

The production method of the invention wherein the above-described polymer is liquefied, spread on the polymer film and then stretched or shrunk, Rth is controlled in the course of forming the spread layer on the polymer film while Re is controlled by molecular orientation by stretching or shrinking the laminate. Owing to this system of assigning functions, the desired object can be established at a lower stretching rate compared with the existing method of simultaneously controlling Rth and Re as in, for example, the biaxial stretching method. Thus, a biaxial birefringent film having excellent Rth and Re characteristics and optical axial accuracy can be advantageously obtained, thereby bringing merits in design and production.

The molecular orientation treatment can be carried out by extending and/or shrinking the film. Extension can be made by, for example, a stretching treatment. As the stretching method, use can be made of one or more methods appropriately selected from among biaxially stretching methods such as successive stretching and simultaneous stretching and monoaxially stretching methods such as free-end stretching and fixed-end stretching. From the viewpoint of preventing the bowing phenomenon, the monoaxially stretching method is preferred.

The stretching temperature may be determined in accordance with the conventional methods. In general, use is made of a temperature close to the glass transition temperature of the solid polymer as described, and a temperature not lower than the glass transition temperature. In order to achieve lower retardation of the stretched film of the invention, it is preferred that the stretching temperature is close to the glass transition temperature Tg of the polymer film, more preferably stretching is performed at a temperature not lower than Tg-20° C., more preferably stretching is performed at a temperature not lower than Tg-10° C. and especially preferably stretching is performed at a temperature not lower than Tg.

Concerning the preferable range of the stretching rate, the stretching rate is preferably 1.03 fold or more but not more than 2.50 fold, more preferably 1.04 fold or more but not more than 2.20 fold and more preferably 1.05 fold or more but not more than 1.80 fold, based on the unstretched film length. In the case where the stretching rate is less than 1.05 fold, the stretching rate is insufficient in forming the above-described optically-anisotropic layer. In the case where the stretching ratio exceeds 2.50 fold, on the other hand, there arise serious curling and large changes in optical characteristics after the durability test on the film.

On the other hand, the shrinking treatment can be carried out by, for example, performing the application and film-formation of the polymer film on the base material and then inducing shrinkage by taking advantage of the dimensional change in the base material due to a temperature change or the like. In such a case, use may be also made of a base material having shrinking ability such as a heat shrinkable film. It is favorable to control the shrinkage rate by using, for example, a stretcher.

The birefringent film produced by the above method is appropriately usable as an optically-compensatory film for improving the viewing angle characteristics of liquid-crystal display devices. To construct thinner liquid-crystal display devices and elevate the productivity by lessening production stages, it is more preferable that the birefringent film is directly bonded to a polarizer as a protecting film for a polarizing plate. In this case, it is required to provide the above-described polarizing plate with the use of the optically-compensatory film at a lower cost and a higher productivity. Namely, it is desired to construct the polarizing plate at a higher productivity and a lower cost. Thus, the optically-compensatory film of the invention is used in the state of being bonded to a polarizer in such a manner that the in-plane Re expression direction is orthogonal to the absorption axis of the polarizing plate. A polarizer of commonly employed constitution that comprises iodine and PVA is produced by monoaxial stretching and has the absorption axis in the machine direction. In order to provide a polarizing plate having the cellulose acylate with the use of the above-described birefringent film at a high productivity and a low cost, it is required to carry out the above-described construction step continuously (i.e., roll to roll). Considering these factors (in particular, productivity), it is preferable to produce the optically-compensatory film with the use of the above-described birefringent film by laminating a spread layer comprising the above-described polymer on the polymer film and then stretching or shrinking it so that the polymer in the spread layer is oriented in the transverse direction and exhibits Re in the transverse direction. By employing the rolled optically-compensatory film thus produced as a polarizer-protecting film, a polarizing plate having an effective optically-compensatory function can be produced as such (i.e., roll to roll).

The term "rolled film" as used herein means a film that has a length of 1 m or longer in the machine direction and is wound at least three turns in the machine direction. The term "roll to roll" means that such a rolled film is subjected to any available treatment (for example, film-forming, lamination/bonding to another rolled film, surface treatment, heating/cooling or stretching/shrinking) while maintaining it in the rolled state before and after the treatment. From the viewpoints of productivity, cost and handling properties, a roll to roll treatment is especially preferred.

Rth and Re of the birefringent film thus obtained can be controlled depending on the type of the solid polymer, the method of forming the spread layer (for example, the method of coating the liquefied matter), the method of solidifying the spread layer (for example, drying conditions), the thickness of the transparent film thus formed, and so on. The thickness of the transparent film is generally from 0.5 to 100 µm, preferably from 1 to 50 µm and more preferably from 2 to 20 µm.

In the birefringent film thus obtained, the ratios of physical parameters such as sound velocity, tensile modulus, storage modulus and photoelasticity coefficient) in direction orthogonal to the traveling direction in plane/the traveling direction fall within the scopes as specified above.

The birefringent film thus produced may be used either as such or bonded to another film with the use of a pressure-sensitive adhesive or the like.

To satisfy the requirement for the ratio R of the sound velocity in the transverse direction VT to the sound velocity in the machine direction VM or the tensile modulus in the transverse direction, the tensile in the machine direction and the ratio thereof as specified above, a polymer film is usually stretched in the transverse direction and shrunk in the machine direction in the invention. In the case of a laminate comprising a polymer film and a spread layer, the laminate is similarly stretched in the transverse direction and shrunk in the machine direction. The requirements as described above can be individually fulfilled by controlling the stretching or shrinking conditions.

(Constitution of General Liquid-Crystal Display Device)

In the case of using a polymer film as an optically-compensatory film, the transmission axis of the polarizing plate for it may be at any angle to the slow axis of the optically-compensatory film comprising the polymer film. A liquid-crystal display device comprises a liquid-crystal cell that carries a liquid crystal between two electrode substrates, two polarizing plates disposed on both sides of the cell, and at least one optically-compensatory film disposed between the liquid-crystal cell and the polarizing plate.

The liquid-crystal layer of the liquid-crystal cell is generally formed by introducing a liquid crystal into the space formed by two substrates via a spacer put therebetween, and sealed up in it. A transparent electrode layer is formed on a substrate as a transparent film that contains a conductive substance. The liquid-crystal cell may further have a gas barrier layer, a hard coat layer or an undercoat layer (for adhesion to transparent electrode layer). These layers are generally formed on a substrate. The substrate of the liquid-crystal cell generally has a thickness of from 50 µm to 2 mm.

(Type of Liquid-Crystal Display Device)

The polymer film of the invention may be used for liquid-crystal cells of various display modes. Various display modes such as TN (twisted nematic), IPS (in-plane switching), FLC (ferroelectric liquid-crystal), AFLC (anti-ferroelectric liquid-crystal), OCB (optically-compensatory bent), STN (super-twisted nematic), VA (vertically aligned), ECB (electrically-controlled birefringence) and HAN (hybrid aligned nematic) modes have been proposed. Also proposed are other display modes with any of the above-mentioned display modes aligned and divided. The polymer film of the invention is effective in liquid-crystal display devices of any display mode. Further, it is also effective in any of transmission-type, reflection-type and semitransmission-type liquid-crystal display devices.

(TN-Mode Liquid-Crystal Display Device)

The polymer film of the invention may be used as a support of the optically-compensatory film in TN-mode liquid-crystal cell-having TN-mode liquid-crystal display devices. TN-mode liquid-crystal cells and TN-mode liquid-crystal display devices are well known from the past. The optically-compensatory film to be used in TN-mode liquid-crystal display devices is described in JP-A 3-9325, 6-148429, 8-50206 and 9-26572. In addition, it is also described in Mori et al's reports (*Jpn. J. Appl. Phys.*, Vol. 36 (1997), p. 143; and *Jpn. J. Appl. Phys.*, Vol. 36 (1997), p. 1068).

(STN-Mode Liquid-Crystal Display Device)

The polymer film of the invention may be used as a support of the optically-compensatory film in STN-mode liquid-crystal cell-having STN-mode liquid-crystal display devices. In general, the rod-shaped liquid-crystal molecules in the liquid-crystal cell in an STN-mode liquid-crystal display device are twisted at an angle within a range of from 90 to 360 degrees, and the product of the refractivity anisotropy ($\Delta n$) of the rod-shaped liquid-crystal molecules and the cell gap (d), And falls between 300 and 1500 nm. The optically-compensatory film to be used in STN-mode liquid-crystal display devices is described in JP-A 2000-105316.

(VA-Mode Liquid-Crystal Display Device)

The polymer film of the invention is especially favorable for a support of the optically-compensatory film in VA-mode liquid-crystal cell-having VA-mode liquid-crystal display devices. Preferably, the optically-compensatory film for use in VA-mode liquid-crystal display devices has a retardation Re(630) of from 0 to 150 nm and a retardation |Rth(630)| of from 70 to 400 nm. More preferably, the retardation Re(630) is from 20 to 70 nm. In the case where two optically-anisotropic polymer films are used in a VA-mode liquid-crystal display device, then the retardation |Rth(630)| of the films preferably falls between 70 and 250 nm. In the case where one optically-anisotropic polymer film is used in a VA-mode liquid-crystal display device, then the retardation |Rth(630)| of the film preferably falls between 150 and 400 nm. The VA-mode liquid-crystal display devices may have an orientation-divided system, for example, as in JP-A 10-123576.

(IPS-Mode Liquid-Crystal Display Device, and ECB-Mode Liquid-Crystal Display Device)

The polymer film of the invention is also favorable for a support of the optically-compensatory film and for a protecting film of the polarizing plate in IPS-mode or ECB-mode liquid-crystal cell-having IPS-mode liquid-crystal display devices and ECB-mode liquid-crystal display devices. In these modes, the liquid-crystal material is aligned nearly in parallel to the film face in black display, and the liquid-crystal molecules are aligned in parallel to the surface of the substrate when no voltage is applied to the device for black display. In these embodiments, the polarizing plate that comprises the polymer film of the invention contributes to enlarging the viewing angle and to improving the image contrast. In these embodiments, the retardation value of the optically-anisotropic layer disposed between the protecting film of the polarizing plate and the liquid crystal cell is preferably at most 2 times the value of Δn·d of the liquid-crystal layer. Also preferably, |Rth(630)| is at most 25 nm, more preferably at most 20 nm, even more preferably at most 15 nm. Accordingly, the polymer film of the invention is favorably used.

(OCB-Mode Liquid-Crystal Display Device, and HAN-Mode Liquid-Crystal Display Device)

The polymer film of the invention is also favorable for a support of the optically-compensatory film in OCB-mode liquid-crystal cell-having OCB-mode liquid-crystal display devices and HAN-mode liquid-crystal cell-having HAN-mode liquid-crystal display devices. Preferably, the optically-compensatory film for use in OCB-mode liquid-crystal display devices and HAN-mode liquid-crystal display devices is so designed that the direction in which the absolute value of the retardation of the film is the smallest does not exist both in the in-plane direction and in the normal line direction of the optically-compensatory film. The optical characteristics of the optically-compensatory film for use in OCB-mode liquid-crystal display devices and HAN-mode liquid-crystal display devices are determined, depending on the optical characteristics of the optically-anisotropic layer, the optical characteristics of the support and the positional relationship between the optically-anisotropic layer and the support. The optically-compensatory film for use in OCB-mode liquid-crystal display devices and HAN-mode liquid-crystal display devices is described in JP-A 9-197397. It is described also in Mori et al's reports (*Jpn. J. Appl. Phys.*, Vol. 38 (1999), p. 2837).

(Reflection-Type Liquid-Crystal Display Device)

The polymer film of the invention is also favorably used for an optically-compensatory film in TN-mode, STN-mode, HAN-mode or GH (guest-host)-mode reflection-type liquid-crystal display devices. These display modes are well known from the past. TN-mode reflection-type liquid-crystal devices are described in JP-A 10-123478, pamphlet of International Laid-Open No. 98/48320, and Japanese Patent 3022477. The optically-compensatory film for use in reflection-type liquid-crystal display devices is described in pamphlet of International Laid-Open No. 00/65384.

(Other Liquid-Crystal Display Devices)

The polymer film of the invention is also favorably used as a support of the optical compensatory film in ASM (axially symmetric aligned microcell)-mode liquid-crystal cell-having ASM-mode liquid-crystal display devices. The liquid-crystal cell in ASM-mode devices is characterized by being supported by a resin spacer capable of controlling and varying the thickness of the cell. The other properties of the cell are the same as those of the liquid-crystal cell in TN-mode devices. ASM-mode liquid-crystal cells and ASM-mode liquid-crystal display devices are described in Kume et al's report (Kume et al., *SID 98 Digest* 1089 (1998)).

(Self Luminous Display Device)

The optically-compensatory film, the polarizing plate and so on of the invention can also contribute to the improvement in the display qualities in self luminous display devices. These self luminous display devices are not particularly restricted and examples thereof include organic EL, PDP and FED. By using a birefringent film with Re(630) of ¼ wavelength in a flat panel display of a self luminous type, linear polarization can be converted into circular polarization to give an antireflective filter.

In the above-described systems, the members constituting display devices such as a liquid crystal display device may be either integrated via lamination or separated. In constructing the display devices, it is also possible to provide appropriate optical elements such as a prism array sheet, a lens array sheet, a light diffusion plate or a protective plate. In constructing display devices, these elements are also usable in the form of an optical member laminated on the birefringent film.

(Hard Coat Film, Antiglare Film, Antireflection Film)

The polymer film of the invention is favorably applied to hard coat films, antiglare films and antireflection films. For the purpose of improving the visibility of flat panel displays such as LCD, PDP, CRT, EL, any or all of a hard coat layer, an antiglare layer and an antireflection layer may be fitted to one or both faces of the polymer film of the invention. Preferred embodiments of such antiglare films and antireflection films are described in Japan Institute of Invention and Innovation Journal of Technical Disclosure No. 2001-1745 (2001.03.15, Japan Institute of Invention and Innovation), pp. 54-57, and the polymer film of the invention may be favorably used in these.

(Photographic Film Support)

The polymer film usable in the invention is applicable to supports of silver halide photographic materials. Regarding the techniques, JP-A 2000-105445 has detailed descriptions of color negative films, and the polymer film of the invention is favorably used in these. Also preferably, the film of the invention is applicable to supports of color reversal silver halide photographic materials, and various materials and formulations and methods for processing them described in JP-A 11-282119 are applicable to the invention.

(Transparent Substrate)

Since the polymer film of the invention has nearly zero optical anisotropy and has good transparency, it may be substitutable for the glass substrate for liquid-crystal cells in liquid-crystal display devices, or that is, it may be usable as a transparent support for sealing up the driving liquid crystals in the devices.

Since the transparent substrate for sealing up liquid crystal must have a good gas-barrier property, a gas-barrier layer may be optionally fitted to the surface of the cellulose acylate film of the invention, if desired. The morphology and the material of the gas-barrier layer are not specifically defined. For example, $SiO_2$ may be deposited on at least one face of the polymer film of the invention, or a polymer coating layer of a vinylidene chloride-based polymer or a vinyl alcohol-based polymer having a relatively higher gas-barrier property may be formed on the film of the invention. These techniques may be suitably selected for use in the invention.

When the film of the invention is used as a transparent substrate for sealing up liquid crystal, a transparent electrode may be fitted to it for driving liquid crystal through voltage application thereto. The transparent electrode is not specifically defined. For example, a metal film or a metal oxide film may be laminated on at least one surface of the polymer film of the invention so as to form a transparent electrode on it. Above all, a meal oxide film is preferred in view of the transparency, the electroconductivity and the mechanical characteristics of the film; and a thin film of indium oxide essentially comprising tin oxide and containing from 2 to 15% of zinc oxide is more preferred. These techniques are described in detail, for example, in JP-A 2001-125079 and 2000-22760.

Example

Examples of the invention are mentioned below, to which, however, the invention should not be limited.

<Preparation of Cellulose Acylate Solutions>

A composition described in Table 1 was put into a mixing tank, and stirred therein with stirring to dissolve the constitutive component, thereby preparing cellulose acylate solutions T-1 to T-3.

TABLE 1

Components of Cellulose Acylate Solution (unit: part by mass)

| Cellulose Acylate Solution | Methylene Chloride | Methanol | 1-Butanol | Cellulose Acylate Degree of substitution | Cellulose Acylate Amount added | TPP | BDP |
|---|---|---|---|---|---|---|---|
| T-1 | 300 | 54 | 11 | 2.86 (acetyl) | 100 | 7.8 | 3.9 |
| T-2 | 300 | 54 | 11 | 2.86 (acetyl) | 100 | no | no |
| T-3 | 300 | 54 | 11 | 2.92 (acetyl) | 100 | no | no |

TPP: triphenyl phosphate
BDP: biphenyldiphenyl phosphate

<Preparation of Additive Solutions>

A composition described in Table 2 was put into a mixing tank and heated with stirring to dissolve the components, thereby preparing additive solutions U-1 to U-7.

TABLE 2

| Additive Solution | Methylene Chloride Amount added (part by mass) | Methanol Amount added (part by mass) | Optical Anisotropy-lowering Agent Designation | Optical Anisotropy-lowering Agent Amount added (part by mass) | Wavelength-Dispersion Regulator Designation | Wavelength-Dispersion Regulator Amount added (part by mass) |
|---|---|---|---|---|---|---|
| U-1 | 80 | 20 | no | — | — | — |
| U-2 | 80 | 20 | A-19 | 50 | — | — |
| U-3 | 80 | 20 | A-19 | 68 | UV-102 | 5 |
| U-4 | 80 | 20 | A-19 | 83 | UV-102 | 10 |
| U-5 | 80 | 20 | A-19 | 25 | — | — |
| U-6 | 80 | 20 | A-19 | 35 | UV-102 | 5 |
| U-7 | 80 | 20 | A-19 | 50 | UV-102 | 10 |

<Fabrication of Cellulose Acylate Film Sample 001>

44 parts by mass of the additive solution U-1 was added to 477 parts by mass of the cellulose acylate solution T-1, and well stirred to prepare a dope. The dope was cast onto a drum cooled at 0° C., through a casting slit. The film formed was peeled off from the drum, having a solvent content of 70% by mass, and with its both sides in the transverse direction (the direction orthogonal to the casting direction) thereof being fixed to a pin tenter (as in FIG. 3 in JP-A 4-1009), this was dried to have a solvent content of from 3 to 5% by mass in such a manner that the stretching rate in the transverse direction could be 2%. Next, the film was conveyed between rolls in a heat treatment device and was further dried therein. Thus, a cellulose acylate film sample 001 having a thickness of 80 μm was produced in a size of 100 m in the machine direction (the casting direction)×1 m in the transverse direction.

<Fabrication of Cellulose Acylate Film Sample 101>

44 parts by mass of the additive solution U-2 was added to 455 parts by mass of the cellulose acylate solution T-2, and well stirred to prepare a dope. In the same manner as that for producing the cellulose acylate film sample 001, the dope was formed into a cellulose acylate film sample 101 having a thickness of 80 μm.

<Fabrication of Cellulose Acylate Film Samples 102 to 106>

Cellulose acylate film samples 102 to 106 each having a thickness of about 80 μm were produced in the same manner as that for producing the cellulose acylate film sample 101, for which, however, a combination of the cellulose acylate solution and the additive solution as in Table 3 was used in place of those in the cellulose acylate film sample 101.

TABLE 3

| Cellulose Acylate Film Sample | Cellulose Acylate Solution Designation | Cellulose Acylate Solution Amount Added (part by mass) | Additive Solution Designation | Additive Solution Amount Added (part by mass) |
|---|---|---|---|---|
| 001 | T-1 | 477 | U-1 | 44 |
| 101 | T-2 | 455 | U-2 | 44 |
| 102 | T-2 | 455 | U-3 | 44 |
| 103 | T-2 | 455 | U-4 | 44 |
| 104 | T-3 | 455 | U-5 | 44 |
| 105 | T-3 | 455 | U-6 | 44 |
| 106 | T-3 | 455 | U-7 | 44 |

<Preparation of Cellulose Acylate Solution T-4>

The following composition was put into a mixing tank and stirred to dissolve the components, thereby preparing a cellulose acylate solution T-4.

<Composition of Cellulose acylate Solution T-4>

| | |
|---|---|
| Cellulose acylate having a degree of acetylation of 2.94 | 100.0 mas. pts. |
| Methylene chloride (first solvent) | 402.0 mas. pts. |
| Methanol (second solvent) | 60.0 mas. pts. |

<Preparation of Mat Agent Solution>

20 parts by mass of silica particles having a mean particle size of 16 nm (Aerosil R972 by Nippon Aerosil) and 80 parts by mass of methanol were well stirred and mixed for 30 minutes to prepare a dispersion of silica particles. The dispersion was put into a disperser along with the following composition thereinto, and further stirred therein for at least 30 minutes to dissolve the components, thereby preparing a mat agent solution.

(Composition of Mat Agent Solution)

| | |
|---|---|
| Dispersion of silica particles having a mean particle size of 16 nm | 10.0 mas. pts. |
| Methylene chloride (first solvent) | 76.3 mas. pts. |
| Methanol (second solvent) | 3.4 mas. pts. |
| Cellulose acylate solution (T-6) | 10.3 mas. pts. |

<Preparation of Additive Solution U-8>

The following composition was put into a mixing tank, and heated with stirring to dissolve the components, thereby preparing an additive solution U-8.

(Composition of Additive Solution U-8)

| | |
|---|---|
| Compound capable of lowering optical anisotropy (A-19) | 90.0 mas. pts. |
| Wavelength-distribution regulator (UV-102) | 9.0 mas. pts. |
| Methylene chloride (first solvent) | 58.4 mas. pts. |
| Methanol (second solvent) | 8.7 mas. pts. |
| Cellulose acylate solution (T-4) | 12.8 mas. pts. |

<Fabrication of Cellulose Acylate Film Sample 107>

94.6 parts by mass of the cellulose acylate solution (T-4), 1.3 parts by mass of the mat agent solution, and 4.1 parts by mass of the additive solution (U-8) were separately filtered, and then mixed. Using a band caster, the mixture was cast on a band. In the above-mentioned composition, the ratio by mass of the compound capable of lowering optical anisotropy and the wavelength distribution regulator to cellulose acylate was 12% and 1.2% by mass, respectively. The film having a remaining solvent content of 30% was peeled away from the band, and dried at 140° C. for 40 minutes to give a cellulose acylate film sample 107. The remaining solvent content of the thus-produced cellulose acylate film was 0.2%, and the thickness of the film was 80 μm.

[Fabrication of Norbornene-Based Polymer Sample 301]

Fine needle crystals of calcium carbonate (Maruo Calcium Co., Ltd.) were uniformly dispersed in THF by ultrasonic irradiation. Further Arton pellets (JSR) were added as a polymer and dissolved by stirring for about 30 hours. Concerning the mixing ratio, tetrahydrofuran was employed in an amount 5 times as much as Arton, while calcium carbonate was employed in the amount of 1.1 mass % based on Arton. The polymer solution thus obtained was spread on a glass plate with the use of a knife coater and the solvent was evaporated. Then the filmy sample (thickness: about 80 μm) was peeled off from the glass plate and dried at 82° C. for 2 hours to give a norbornene-based polymer sample 301.

<Measurement of Glass Transition Temperatures (Tg) of Film Samples>

The glass transition temperatures (Tg) of the samples thus fabricated were measured in accordance with the method as described in the present specification.

<Stretching Treatment>

The cellulose acylate sample 001 thus fabricated was stretched. By cutting the film sample in an adequate size, the stretching treatment was carried out monoaxially in the transverse direction with the use of a multipurpose testing machine Tensilon (manufactured by ORIENTEC, Co.). The stretching temperature was 150° C., the stretching speed was 15%/min against the film width and the stretching rate was 1.18 fold. Thus, a stretched film sample 001A was obtained.

(Stretching Treatment on Samples 101 to 107 and 301)

The cellulose acylate samples 101 to 107 and 301 fabricated above were similarly stretched as in the sample 001 to give stretched film samples 101A to 107A and 301A.

(Fabrication of Samples Changing Stretching Temperature)

The cellulose acylate samples 102 and 105 fabricated above were stretched in the same manner but at a stretching temperature of 120° C. to give stretched film samples 201A and 202A.

(Fabrication of Samples with Different Stretching Rate)

The cellulose acylate samples 102 and 105 fabricated above were stretched in the same manner but at a stretching rate of 1.55 fold to give stretched film samples 203A and 204A.

<Surface Treatment>

Next, the stretched cellulose acylate film sample 001A fabricated above was subjected to the following surface treatment.

The stretched cellulose acylate film sample 001A was dipped in an aqueous 1.5 N sodium hydroxide solution at 55° C. for 2 minutes. Then, it was washed in a wash water bath at room temperature, and neutralized with 0.1 N sulfuric acid at 30° C. Again, it was washed in a wash water bath at room temperature, and dried with a hot air stream at 100° C. In that manner, the surface of the cellulose acylate film was alkali-saponified to give a saponified film sample 001B.

(Surface Treatment on Stretched Film Samples 101A to 107A, 201A to 204A and 301A)

The stretched film samples 101A to 107A, 201A to 204A and 301A were surface-treated as in the stretched film sample 001A to give surface-treated samples 101B to 107B, 201B to 204B and 301B.

<Evaluation of Optical Performance>

The surface-treated and surface-untreated film samples produced herein were evaluated in their optical properties of Re(630), |Rth(630)|, |Re(400)−Re(700)| and |Rth(400)−Rth(700)| in accordance with the method described in the present specification.

<Evaluation of Film Performance>

The surface-treated film samples produced herein were evaluated in tensile moduli, sound velocities and photoelasticity coefficients in the machine direction and in the transverse direction in accordance with the method described in the present specification.

<Determination of Surface Energy>

The surface energies of the surface-treated and surface-untreated film samples produced herein were determined as follows. Concretely, a film sample (30 mm×40 mm) taken from the center was conditioned at 25° C. and 60% RH for 2 hours and then put on a horizontal bed horizontally. Next, a predetermined amount (20 μl) of water and methylene iodide were applied onto the surface of the sample. After a predetermined period of time (30 seconds), the contact angle of the sample surface with water and with methylene iodide was measured. From the data of the thus-measured contact angle, the surface energy (surface E) of the sample was derived according to an Owens method.

<Evaluation of Durability of Polarizing Plate>

[Lamination Test of Polarizing Plate]

The polarizing plate described below was fabricated using surface-treated and surface-untreated film samples described above. Namely, a rolled polyvinyl alcohol film having a thickness of 80 μm was continuously stretched 5-fold in an aqueous iodine solution, and dried to obtain a polarizing film. The surface treated film sample 001B and a surface treated commercially available cellulose acylate film (Fujitak TD80UF, FUJI PHOTOFILM Co., Ltd.; Re(630) 3 nm, |Rth(630)|50 nm), which had been surface-treated in the same manner as in sample 001B, were bonded to the polarization film with its surface (surface-treated surface) towards the polarization film side as sandwiching the polarization film located therebetween from both side by using polyvinyl alcohol based pressure-sensitive adhesives, thereby giving a polarizing plate sample 001C, which both sides were protected with the cellulose acetate film 001B and the commercially available cellulose acylate film (Fujitak TD80UF, FUJI PHOTOFILM Co., Ltd.).

The surface-treated samples 101B to 107B, 201B to 204B and 301B were treated in the same manner to thereby give polarizing plate samples 101C to 107C, 201C to 204C. Similarly, the surface-untreated samples 001A, 101A to 107A, 201A to 204A and 301A were treated in the same manner to thereby give polarizing plate samples 001D, 101D to 107D, 201D to 204D and 301D.

(Adhesiveness)

The thus-fabricated polarizing plate samples were tested for their adhesiveness, according to the method mentioned below. Concretely, each polarizing plate sample was folded at 90 degrees repeatedly for five times all at a predetermined site thereof, and the adhesiveness of each sample was evaluated in point of the presence or absence of delamination of the folded part of the sample.

A: No delamination found.
B: Delamination found.

(Workability)

The polarizing plate samples fabricated herein were tested for their workability, according to the method mentioned below. Concretely, the polarizing plate sample was cut with a single-edged cutter knife, and its workability was evaluated in point of the presence or absence of delamination around the cut part of the sample.
A: No delamination found.
B: Delamination found.
(Adhesiveness Durability 1)

The polarizing plate samples fabricated herein were tested for their adhesiveness durability, according to the method mentioned below. Concretely, the polarizing plate sample was kept under a condition of 60° C./90% RH for 200 hours, and then its adhesiveness durability was evaluated in point of the presence or absence of delamination of the sample after stored.
<Delamination>
A: No delamination found.
B: Delamination found.

<Adhesiveness Durability 2>

The polarizing plate samples fabricated herein were tested for their adhesiveness durability, according to the method mentioned below. Concretely, the polarizing plate sample was kept at 80° C. for 200 hours, and then its adhesiveness durability was evaluated in point of the presence or absence of delamination of the sample after stored.
<Delamination>
A: No delamination found.
B: Delamination found.

Tables 4 to 6 show the evaluation data of the fabricated samples. In Table 4, Re(20 stands for Re(630), Rth(λ) stands for |Rth(630)|, ΔRe(2) stands for |Re(400)−Re(700)| and ΔRth(λ) stands for 1 Rth(400)−Rth(700)|.

TABLE 4

| | Film (unsaponified sample: indicated in A) | | | | | | | | | | | | | | | |
|---|---|---|---|---|---|---|---|---|---|---|---|---|---|---|---|---|
| | Optical performance | | | | | Sound velocity ratio | | | Tensile modulus | | | | Photoelasticity coefficient | | | |
| Film | Re (λ) | Rth (λ) | ΔRth (λ) | ΔRe (λ) | Tg | TD | MD | R TD/MD | TD | | MD | | R TD/MD | TD | MD | R TD/MD | Remark |
| | | | | | | | | | | Unit | | | | | | | |
| Sample | nm | nm | nm | nm | ° C. | | | | kgf/mm² | GPa | kgf/mm² | GPa | | ×10⁻¹³M/m² | | | Comp. |
| 001A | 1 | 42 | 27 | 2 | 180 | 2.41 | 2.20 | 1.10 | 455 | 4.46 | 375 | 3.68 | 1.21 | 14.3 | 15.8 | 0.91 | Ex. |
| 101A | 2 | 1 | 20 | 1 | 146 | 2.43 | 2.22 | 1.09 | 475 | 4.66 | 389 | 3.81 | 1.22 | 12.2 | 13.2 | 0.92 | Ex. |
| 102A | 1 | 0 | 14 | 1 | 132 | 2.40 | 2.19 | 1.10 | 480 | 4.70 | 395 | 3.87 | 1.22 | 12.1 | 12.9 | 0.94 | Ex. |
| 103A | 1 | 0 | 8 | 2 | 122 | 2.39 | 2.20 | 1.09 | 469 | 4.60 | 387 | 3.79 | 1.21 | 12.0 | 12.9 | 0.93 | Ex. |
| 104A | 1 | 1 | 20 | 1 | 161 | 2.44 | 2.21 | 1.10 | 473 | 4.64 | 390 | 3.82 | 1.21 | 11.8 | 12.9 | 0.91 | Ex. |
| 105A | 1 | 0 | 13 | 1 | 153 | 2.46 | 2.22 | 1.11 | 461 | 4.52 | 385 | 3.77 | 1.20 | 11.7 | 12.5 | 0.94 | Ex. |
| 106A | 1 | 0 | 7 | 2 | 141 | 2.44 | 2.21 | 1.10 | 453 | 4.44 | 377 | 3.69 | 1.20 | 11.4 | 12.2 | 0.93 | Ex. |
| 107A | 1 | 0 | 13 | 1 | 154 | 2.43 | 2.21 | 1.10 | 463 | 4.54 | 384 | 3.76 | 1.21 | 11.5 | 12.3 | 0.93 | Ex. |
| 201A | 1 | 8 | 15 | 2 | 132 | 2.39 | 2.20 | 1.09 | 475 | 4.66 | 393 | 3.85 | 1.21 | 12.3 | 13.1 | 0.94 | Ex. |
| 202A | 1 | 7 | 14 | 2 | 153 | 2.44 | 2.21 | 1.10 | 464 | 4.55 | 378 | 3.70 | 1.23 | 11.9 | 12.6 | 0.94 | Ex. |
| 203A | 5 | 12 | 17 | 1 | 132 | 2.75 | 2.13 | 1.29 | 533 | 5.22 | 379 | 3.71 | 1.41 | 11.7 | 13.4 | 0.87 | Ex. |
| 204A | 4 | 11 | 16 | 1 | 153 | 2.71 | 2.11 | 1.28 | 541 | 5.30 | 386 | 3.78 | 1.40 | 11.5 | 13.8 | 0.83 | Ex. |
| 301A | 24 | 45 | 2 | 0 | 148 | 2.01 | 1.81 | 1.11 | 298 | 2.92 | 245 | 2.40 | 1.22 | 2.0 | 3.0 | 0.67 | Comp. |

TABLE 5

| | Unsaponified sample (indicated in A) Surface energy (unsaponified) | | | Saponified sample (indicated in B) Surface energy (saponified) | | | |
|---|---|---|---|---|---|---|---|
| Film | Surface E | H₂O | Methylene iodide | Surface E | H₂O | Methylene iodide | |
| | | | Unit | | | | |
| Sample | mN/m | ° | ° | mN/m | ° | ° | Remark |
| 001 | 46 | 73 | 28 | 62 | 37 | 33 | Comp. |
| 101 | 47 | 75 | 27 | 66 | 30 | 32 | Ex. |
| 102 | 47 | 73 | 27 | 62 | 39 | 31 | Ex. |
| 103 | 47 | 73 | 27 | 62 | 39 | 31 | Ex. |
| 104 | 46 | 75 | 28 | 62 | 39 | 32 | Ex. |
| 105 | 47 | 75 | 27 | 64 | 35 | 32 | Ex. |
| 106 | 47 | 74 | 27 | 63 | 33 | 32 | Ex. |
| 107 | 47 | 75 | 27 | 64 | 35 | 32 | Ex. |
| 201 | 46 | 75 | 28 | 62 | 38 | 31 | Ex. |
| 202 | 47 | 74 | 27 | 63 | 34 | 32 | Ex. |
| 203 | 46 | 75 | 27 | 62 | 39 | 31 | Ex. |
| 204 | 47 | 76 | 27 | 64 | 36 | 32 | Ex. |
| 301 | 40 | 96 | 40 | 39 | 91 | 42 | Comp. |

TABLE 6

| | Polarizing plate | | | | | | | | |
|---|---|---|---|---|---|---|---|---|---|
| | Unsaponified polarizing plate (indicated in D) | | | | Saponified polarizing plate (indicated in C) | | | | |
| | Having polarizing plate | | Durability 1 | Durability 2 | Having polarizing plate | | Durability 1 | Durability 2 | |
| Sample | Adhesive-ness | Work-ability | Delami-nation | Delami-nation | Adhesive-ness | Work-ability | Delami-nation | Delami-nation | Remark |
| 001 | B | B | B | B | A | A | A | A | Comp. |
| 101 | B | B | B | B | A | A | A | A | Ex. |
| 102 | B | B | B | B | A | A | A | A | Ex. |
| 103 | B | B | B | B | A | A | A | A | Ex. |
| 104 | B | B | B | B | A | A | A | A | Ex. |
| 105 | B | B | B | B | A | A | A | A | Ex. |
| 106 | B | B | B | B | A | A | A | A | Ex. |
| 107 | B | B | B | B | A | A | A | A | Ex. |
| 201 | B | B | B | B | A | A | A | A | Ex. |
| 202 | B | B | B | B | A | A | A | A | Ex. |
| 203 | B | B | B | B | A | A | A | A | Ex. |
| 204 | B | B | B | B | A | A | A | A | Ex. |
| 301 | B | B | B | B | B | B | B | B | Comp. |

(Formation of Optically-Anisotropic Layer)
<Direct Stretching Method>

On the cellulose acetate film sample 001 obtained above, a 17% by mass cyclohexanone solution of polyimide (mass-average molecular weight (Mw): 60000) synthesized from 2,2'-bis(3,4-dicarboxyphenyl)hexafluoropropane with 2,2'-bis(trifluoromethyl)-4,4'-diaminobiphenyl was applied. After drying at 95° C. for 12 minutes, a transparent film containing 6% by mass of the remaining solvent, having a thickness of 6 µm, |Rth(630)| of 233 nm and Re(630) of 0 was obtained. In the state of laminated on the film sample 001, the obtained polymer film was monoaxially stretched in the transverse direction at the glass transition temperature (Tg)-5° C. to give an optically-compensatory film 001E having Re(630) of 55 nm and |Rth(630)| of 238 nm and showing optical anisotropy.

(Fabrication of Samples 101E to 107E and 301E)

The cellulose acylate film samples 101 to 107 and 301 were treated in the same manner to give optically-compensatory film samples 101E to 107E and 301E.

(Fabrication of Samples 201E and 202E)

The cellulose acylate film samples 102 and 105 were treated in the same manner as in the direct stretching method described above but at a stretching temperature of 120° C. to thereby give optically-compensatory film samples 201E and 202E.

(Fabrication of Samples 203E and 204E)

The cellulose acylate film samples 102 and 105 were treated in the same manner as in the direct stretching method described above but substituting the polymer employed by a polyimide of the following formula PI-1 (weight average molecular weight (Mw): 50000) and at a stretching rate of 1.60 to thereby give optically-compensatory film samples 203E and 204E.

<Alkali-Saponification Treatment>

The optically-compensatory film sample 001E was alkali-saponified as described above to give a surface-treated sample 001F.

(Fabrication of Samples 101F to 107F, 201F to 204F and 301F)

The optically-compensatory film samples 101E to 107E, 201E to 204E and 301E were treated in the same manner to thereby give surface-treated samples 101F to 107F, 201F to 204F and 301F.

(Fabrication of Polarizing Plate)

Using the surface-treated samples 001F, 101F to 107F, 201F to 204F and 301F, polarizing plate samples 001G, 101G to 107G, 201G to 204G and 301G were fabricated as in the fabrication of the polarizing plate sample 001C. Concerning the bonding faces of each surface-treated sample, an adhesive layer was provided on the cellulose acylate film face of the surface-treated film in the side having no optically-anisotropic layer and the face having the adhesive layer was bonded to a polarization film. Further, a commercially available cellulose acylate film (Fujitak TD80UF, FUJI PHOTOFILM Co., Ltd.; Re(630) 3 nm, |Rth(630)|50 nm), which had been alkali-saponified in the same manner as described above, was bonded to the other side of the polarization film via an adhesive layer, thereby giving a polarizing plate sample C.

Further, two sheets of a commercially available cellulose acylate film (Fujitak TD80UF, FUJI PHOTOFILM Co., Ltd.; Re 3 nm, Rth 50 nm), which had been alkali-saponified in the same manner as described above and on which adhesive layers had been formed, were bonded in both sides of the polarization film to thereby give a polarizing plate sample 301B.

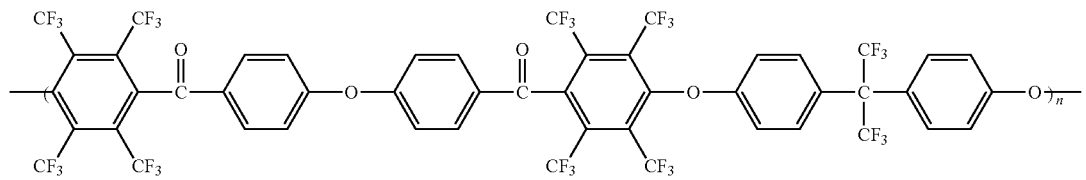

<Polarizing Plate Evaluation>

The polarizing plate samples 001G, 101G to 107G, 201G to 204G and 301G were evaluated in adhesiveness, workability and adhesiveness durability each in the same manner as described above.

(Evaluation of Mounting on VA Type Liquid Crystal Display Device)

<Construction of Perpendicularly Oriented Liquid Crystal Cell>

To a 3% by mass aqueous solution of polyvinyl alcohol, 1% by mass of octadecyldimethylammonium chloride (a coupling agent) was added. The mixture was spin-coated on a glass substrate provided with an ITO electrode and heated at 160° C. Next, it was rubbed to give a perpendicularly oriented film. The rubbing treatment was carried out in opposite directions to each other on two glass substrates. The glass substrates were faced to each other to give a cell gap (d) of about 4.3 µm. A liquid crystal compound mainly comprising an ester and ethane (Δn:0.06) was injected into the cell gap to give a perpendicularly orientated liquid crystal cell. The product Δn{fourth root}d was 260 nm. To this liquid crystal cell, the above-described polarizing plate sample 001G was bonded with a pressure-sensitive adhesive in such a manner that the optically-anisotropic layer was located in the liquid crystal cell side. Further, the polarizing plate 301B was bonded to the other side of the liquid crystal cell with a pressure-sensitive adhesive so that the opposite polarizing plate and the absorption axis were at right angles to one another. Thus, a VA type liquid crystal display device was constructed.

Separately, VA type liquid crystal display devices were fabricated in the same manner but using the polarizing plate samples 101G to 107G, 201G to 204G and 301G.

<Evaluation Test>

[Panel Evaluation]

<Evaluation of Optically-Compensatory Films and Measurement of Light Leakage of Liquid Crystal Display Devices>

The viewing angle dependency of each of the liquid crystal display devices thus constructed was measured. The elevation angles were measured up to 80° at intervals of 10° from the front face direction toward an oblique direction. Azimuthal angles were measured up to 360° C. at intervals of 10° by using the horizontal direction (0°) as the standard. Thus, it was clarified that light leakage in the luminance in black display increased with an increase in the elevation angle from the front face direction and attained the maximum level at around the elevation angle 70°. It was also found out that contrast was worsened with an increase in the black display transmittance. Thus, the viewing angle characteristics were evaluated based on the black display transmittance in the front face direction and the maximal light leakage in the range of 0 to 360° at the elevation angle of 60°.

In a durability test, display light leakages were observed after treating at 60° C. and 90% RH for 150 hours. Light leakages occurred mainly in the four corners of the panel.

Table 7 summarizes the obtained results.

TABLE 7

| Polarizer Sample | Having optically-anisotropic layer (indicated in G) | | | | | | | |
|---|---|---|---|---|---|---|---|---|
| | Bonding polarizing plate | | Durability 1 | Durability 2 | Panel evaluation | | | |
| | Adhesiveness | Workability | Delamination | Delamination | Contrast change | Color change | Irregularities | Remark |
| 001G | B | B | B | B | D | D | C | Comp. |
| 101G | B | B | B | B | A | B | A | Ex. |
| 102G | B | B | B | B | A | A | A | Ex. |
| 103G | B | B | B | B | A | A | A | Ex. |
| 104G | B | B | B | B | A | B | A | Ex. |
| 105G | B | B | B | B | A | A | A | Ex. |
| 106G | B | B | B | B | A | A | A | Ex. |
| 107G | B | B | B | B | A | A | A | Ex. |
| 201G | B | B | B | B | B | B | A | Ex. |
| 202G | B | B | B | B | B | B | A | Ex. |
| 203G | B | B | B | B | B | B | A | Ex. |
| 204G | B | B | B | B | B | B | A | Ex. |
| 301G | D | D | D | D | D | D | C | Comp. |

From the results in Table 7, it can be understood that the invention samples had favorable viewing angle characteristics of liquid crystal display and showed little irregularities on panels.

<Evaluation of Changes in Display Characteristics>

<Change in Viewing Angle Contrast>

A: Excellent with little difference in viewing angle characteristics.

B: Good with a slight difference in viewing angle characteristics.

C: A slight difference in viewing angle characteristics.

D: A large difference in viewing angle characteristics.

<Evaluation of Viewing Angle-Dependent Color Change>

A: Excellent with little difference in viewing angle dependent color change.

B: Good with a slight difference in viewing angle dependent color change.

C: A slight difference in viewing angle-dependent color change.

D: A large difference in viewing angle-dependent color change.

<Evaluation of Display Irregularities>

A: Good with slight irregularities.

B: Slight irregularities.

C: Serious irregularities.

According to the invention, it is found that a polymer film showing small retardation after a stretching treatment and having a high durability in the case of employed as a protecting film for polarizing plates can be obtained. It is also found that, by using the polymer film of the invention as a support and providing an optically-anisotropic layer thereon by coating and stretching, it is possible to provide a product that is excellent in viewing angle characteristics and durability as an optically-compensatory film for panels in liquid-crystal display devices, etc.

INDUSTRIAL APPLICABILITY

According to the invention, it is possible to provide a polymer film which has a low optical anisotropy (i.e., being substantially optically isotropic), even optical characteristics without irregularities (preferably having a small wavelength dispersion in the optical anisotropy) and controlled bonding properties so that it is appropriately usable in image display devices such as liquid-crystal display devices.

According to the invention, it is also possible to provide an optically-compensatory film using the above polymer film, a process for producing the same, a polarizing plate having excellent viewing angle characteristics and a liquid-crystal display device using the above polarizing plate.

The entire disclosure of each and every foreign patent application from which the benefit of foreign priority has been claimed in the present application is incorporated herein by reference, as if fully set forth.

The invention claimed is:

1. A polymer film comprising a cellulose acylate which is a protecting film for a polarizing plate and that has: a ratio R (VT/VM) of a sound velocity in a transverse direction VT to a sound velocity in a machine direction VM of from 1.05 to 1.50;
   a tensile modulus in a transverse direction of from 453 to 600 kgf/mm$^2$ (4.44 GPa to 5.88 GPa), a tensile modulus in the machine direction of from 230 to 480 kgf/mm$^2$ (2.25 GPa to 4.70 GPa); a ratio of a tensile modulus in a transverse direction to a tensile modulus in a machine direction of from 1.15 to 1.22;
   an in-plane retardation Re($\lambda$) and a thickness-direction retardation Rth($\lambda$) satisfying formula (I):

$0 \leq Re(630) \leq 10$, and $|Rth(630)| \leq 25$      (I)

wherein Re($\lambda$) represents an in-plane retardation at a wavelength of $\lambda$ (nm); and Rth($\lambda$) represents a thickness-direction retardation at a wavelength of $\lambda$ (nm); and
   an in-plane retardation Re($\lambda$) and a thickness-direction retardation Rth($\lambda$) satisfying formula (II):

$|Re(400)-Re(700)| \leq 10$, and $|Rth(400)-Rth(700)| \leq 14$;      (II)

wherein Re($\lambda$) represents an in-plane retardation at a wavelength of $\lambda$ (nm); and Rth($\lambda$) represents a thickness-direction retardation at a wavelength of $\lambda$ (nm), and
   wherein an acyl substituent in the cellulose acylate is substantially an acetyl group alone, and a total degree of substitution thereof is from 2.80 to 2.99.

2. The polymer film according to claim 1, which has a slow axis in a direction close to the machine direction or close to the transverse direction.

3. The polymer film according to claim 2, which has at least one surface-treated surface,
   wherein the at least one surface-treated surface has a surface energy of 30 mN/m or more but not more than 50 mN/m before a surface treatment, and has a surface energy of 50 mN/m or more but not more than 80 mN/m after a surface treatment.

4. The polymer film according to claim 1, which has at least one surface having a surface energy of 50 mN/m or more but not more than 80 mN/m.

5. The polymer film according to claim 1, which is a polymer film comprising at least a cellulose acylate and a compound having a molecular weight of not more than 3000.

6. The polymer film according to claim 1, which has a photoelasticity coefficient of not more than $25 \times 10^{-13}$ cm$^2$/dne ($2.5 \times 10^{-13}$ N/m$^2$).

7. A polarizing plate comprising a polymer film according to claim 1 as a protecting film for a polarization film.

8. The polarizing plate according to claim 7, which has at least one layer selected from the group consisting of a hard coat layer, an antiglare layer and an antireflection layer provided on a surface of the polarizing plate.

9. The polarizing plate according to claim 7, which has an absorption axis in the machine direction.

10. A liquid-crystal display device, which comprises a polymer film according to claim 1.

11. The liquid-crystal display device according to claim 10, which is a VA or IPS liquid-crystal display device.

12. The polymer film according to claim 1, which has a $\Delta$Rth(400)=Rth(400)10% RH−Rth(400)80% RH) that ranges from 0 to 50 nm.

13. The polymer film according to claim 1, which has a $\Delta$Re(400)=Re(400)10% RH−Re(400)80% RH) that ranges from 0 to 10 nm.

14. The polymer film according claim 1, wherein the polymer film is a rolled film.

15. A polymer film comprising a cellulose acylate and mat agent particles which is a protecting film for a polarizing plate and that has: a ratio R (VT/VM) of a sound velocity in a transverse direction VT to a sound velocity in a machine direction VM of from 1.05 to 1.50;
   a tensile modulus in a transverse direction of from 453 to 600 kgf/mm$^2$ (4.44 GPa to 5.88 GPa), a tensile modulus in the machine direction of from 230 to 480 kgf/mm$^2$ (2.25 GPa to 4.70 GPa); a ratio of a tensile modulus in a transverse direction to a tensile modulus in a machine direction of from 1.15 to 1.22;
   an in-plane retardation Re($\lambda$) and a thickness-direction retardation Rth($\lambda$) satisfying formula (I):

$0 \leq Re(630) \leq 10$, and $|Rth(630)| \leq 25$      (I)

wherein Re($\lambda$) represents an in-plane retardation at a wavelength of $\lambda$ (nm);
   and Rth($\lambda$) represents a thickness-direction retardation at a wavelength of $\lambda$ (nm); and
   an in-plane retardation Re($\lambda$) and a thickness-direction retardation Rth($\lambda$) satisfying formula (II):

$|Re(400)-Re(700)| \leq 10$, and $|Rth(400)-Rth(700)| \leq 14$;      (II)

wherein Re($\lambda$) represents an in-plane retardation at a wavelength of $\lambda$ (nm);
   and Rth($\lambda$) represents a thickness-direction retardation at a wavelength of $\lambda$ (nm); and
   wherein an acyl substituent in the cellulose acylate is substantially an acetyl group alone, and a total degree of substitution thereof is from 2.80 to 2.99.

16. The polymer film according to claim 15, which has a slow axis in a direction close to the machine direction or close to the transverse direction.

17. A polarizing plate comprising a polymer film according to claim 15 as a protecting film for a polarization film.

18. A liquid-crystal display device, which comprises a polymer film according to claim 15.

19. The polymer film according claim 15, wherein the polymer film is a rolled film.

* * * * *